US010183563B2

(12) United States Patent
Rayner et al.

(10) Patent No.: US 10,183,563 B2
(45) Date of Patent: Jan. 22, 2019

(54) APPARATUS AND SYSTEM FOR PROVIDING A SECONDARY POWER SOURCE FOR AN ELECTRIC VEHICLE

(71) Applicant: Dignan Herbert Rayner, Eight Mile Plains, Queensland (AU)

(72) Inventors: Dignan Herbert Rayner, Eight Mile Plains (AU); Ivan Herbert Godfrey Rayner, Eight Mile Plains (AU)

(73) Assignee: ITC IP HOLDINGS NO 1 PTY LTD, Eight Mile Plains, Queensland (AU)

( * ) Notice: Subject to any disclaimer, the term of this patent is extended or adjusted under 35 U.S.C. 154(b) by 0 days.

(21) Appl. No.: 15/532,622

(22) PCT Filed: Dec. 4, 2015

(86) PCT No.: PCT/AU2015/050767
§ 371 (c)(1),
(2) Date: Jun. 2, 2017

(87) PCT Pub. No.: WO2016/086274
PCT Pub. Date: Jun. 9, 2016

(65) Prior Publication Data
US 2017/0349039 A1    Dec. 7, 2017

(30) Foreign Application Priority Data

Dec. 4, 2014    (AU) ................................ 2014904968

(51) Int. Cl.
*B60K 1/04*    (2006.01)
*B60L 11/18*    (2006.01)

(52) U.S. Cl.
CPC ............ *B60K 1/04* (2013.01); *B60L 11/1801* (2013.01); *B60L 11/1877* (2013.01); *B60L 11/1879* (2013.01); *B60K 2001/0411* (2013.01); *B60K 2001/0416* (2013.01); *B60K 2001/0422* (2013.01); *B60K 2001/0444* (2013.01); *B60K 2001/0455* (2013.01); *B60K 2001/0466* (2013.01); *B60K 2001/0472* (2013.01);
(Continued)

(58) Field of Classification Search
CPC .............. B60K 1/04; B60K 2001/0466; B60K 2001/0444; B60K 2001/0411; B60L 11/1877; B60L 11/1801; B60L 11/1879
See application file for complete search history.

(56) References Cited

U.S. PATENT DOCUMENTS 6,562,504 B2    5/2003    Faris et al.
6,800,393 B2    10/2004    Faris
(Continued)

FOREIGN PATENT DOCUMENTS

CN        2199080 Y    *    5/1995
JP        2010200393 A    *    9/2010
(Continued)

*Primary Examiner* — Jacob B Meyer
(74) *Attorney, Agent, or Firm* — Epstein Drangel LLP; Robert L. Epstein

(57) ABSTRACT

An apparatus for providing a secondary power source for an electric vehicle and having at least one secondary electrical power storage unit for storing electrical energy for delivery to the electric vehicle as required to replace the primary power source, a power connection assembly to connect the at least one secondary power source to the electric vehicle and a control system to control supply to the electric vehicle.

28 Claims, 30 Drawing Sheets

(52) U.S. Cl.
CPC ... *B60K 2001/0477* (2013.01); *B60Y 2200/12* (2013.01); *Y02P 90/60* (2015.11); *Y02T 10/7005* (2013.01); *Y02T 10/7088* (2013.01)

(56) References Cited

U.S. PATENT DOCUMENTS

| | | | | |
|---|---|---|---|---|
| 8,314,587 | B2 * | 11/2012 | White | B60L 11/1816 320/103 |
| 8,941,463 | B2 * | 1/2015 | Rovik | B60L 3/12 320/127 |
| 2007/0229026 | A1 | 10/2007 | Morioka et al. | |
| 2011/0084664 | A1 * | 4/2011 | White | B60L 11/1816 320/134 |
| 2011/0084665 | A1 * | 4/2011 | White | B60L 11/1822 320/134 |
| 2013/0249276 | A1 * | 9/2013 | Rovik | B60L 3/12 307/9.1 |
| 2014/0368156 | A1 | 12/2014 | Aloe | |
| 2015/0249353 | A1 | 9/2015 | Hamilton, IV et al. | |

FOREIGN PATENT DOCUMENTS

| | | |
|---|---|---|
| WO | 2004051781 A2 | 6/2004 |
| WO | 2016086274 A1 | 6/2016 |

* cited by examiner

APPARATUS AND SYSTEM FOR PROVIDING A SECONDARY POWER SOURCE FOR AN ELECTRIC VEHICLE

CROSS-REFERENCE TO RELATED APPLICATIONS

Priority is claimed on PCT/AU2015/050767, filed Dec. 4, 2015.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

(1) Field of the Invention

The present invention relates broadly to electrically powered vehicles and in particular to a system to be used in the alternative to recharging on-board batteries of electrically powered vehicles in situ.

(2) Description of Related Art

Oil will cease to be an option in 30 years. Electricity and particularly electrically powered and energised cars, tractors and transport vehicles provides a system for solving the shortage of petroleum soon to occur.

At present the difficulty with most electric vehicles is that they can only travel around 170 km fully charged and if the vehicle runs out of power it takes 10-20 minutes to perform a rapid partially recharge of the batteries, (recommended only once a week as it damages them) and 6-8 hours to fully recharge. This creates a scenario called "range constraint", in that the range of an electric vehicle is constrained by its battery capacity/life. This affects different vehicle types from cars and motorcycles to refrigerated trucks in urban areas, road transport (vans, trucks and utes), trains and in areas with little infrastructure in places like Africa, Indonesia and the Philippines—tuk tuks, tricycles, powered rickshaws and buses (Jeepnees). Agriculture also requires vast amounts of energy to plough, sow and reap crops.

It will be clearly understood that, if a prior art publication is referred to herein, this reference does not constitute an admission that the publication forms part of the common general knowledge in the art in Australia or in any other country.

BRIEF SUMMARY OF INVENTION

The present invention is directed to an apparatus and system for providing a secondary power source for an electric vehicle, which may at least partially overcome at least one of the abovementioned disadvantages or provide the consumer with a useful or commercial choice.

With the foregoing in view, the present invention in one form, resides broadly in an apparatus for providing a secondary power source for an electric vehicle, the apparatus attachable to the electric vehicle and having a) at least one secondary electrical power storage unit for storing electrical energy for delivery to the electric vehicle as required to replace the primary power source;
b) a power connection assembly to connect the at least one secondary power source to the electric vehicle; and
c) a control system to control supply to the electric vehicle.

In an alternative form, the invention resides in a system for providing a secondary power source for an electric vehicle having a primary power source, the system including a unit attachable to the electric vehicle and having
a) at least one secondary electrical power storage unit for storing electrical energy for delivery to the electric vehicle as required to replace the primary power source;
b) a power connection assembly to connect the at least one secondary power source to the electric vehicle; and
c) a control system to control supply to the electric vehicle.

The apparatus and system of the present invention allow an electric vehicle with a primary power source or supply to be constructed with a provision for a subsidiary fuel source, so when the primary power source or supply runs down, the subsidiary source can be swapped in for use. The electric vehicle therefore preferably has designed and built into the chassis (body), structure, programs and operating system provision:
1. To attach a secondary or numerous secondary/tertiary fuel sources/supplies;
2. To run off that (those) supply(ies) or the main onboard/resident supply;
3. To choose whether to use the secondary supply or the main supply (so there is a switch in the vehicle which can isolate the main supply and run only on one of the secondary supplies);

There will also be:
1. Instrumentation which can monitor the remaining supply of fuel in the secondary supply (ies);
2. The ability to implement a tertiary supply source independently or via the secondary supply device (SSD) system;
3. The ability to have more than one secondary supply source and swap secondary supplies over for full charged ones/units as required and in short time intervals.

In yet another alternative form, the invention resides in a system for providing a replaceable power source for an electric implement having a primary power source, the system including a unit attachable to the electric implement, the unit having
a) at least one electrical power storage unit having a unique identifier for storing electrical energy for delivery to the electric implement as required;
b) a power connection assembly to connect the at least one power source to the electric implement; and
c) a command and control system to control supply from the at least one power source.

The command and control system will preferably include a unique identification module which maybe as simple as a computer chip or system to allow a system administrator to authorize delivery of the electrical energy from the at least one power source. Typically the at least one power source will require activation before delivery of the electrical energy from the at least one power source and an appropriate authorization and/or activation system will be provided which is based about identification of each of the at least one power source (typically a battery) within the system. This will typically be performed remotely and therefore each computer chip or system will typically have access to or be associated with at least one communication pathway. Use of the authorization and activation system and a proprietary plug to charge/connect each at least one power source within the system (the EVRE plug) will allow the system administrator to govern the system and control access and billing within the system They will also preferably be uniformity of type/model and fittings across all makes of the particular vehicle type so hire services and battery resupply service stations can be established to hold, recharge and switch SSD power supplies for vehicles of each type at set intervals (normally 2-3 hours) in very short time.

There will preferably be a number of swappable battery systems which can attach and/or fit into enclosed or open compartments on vehicles. The batteries could include any type of battery or capacitor system that can hold and deliver the correct charge which could include lithium iodide, lead acid any type of supercapacitor that can carry sufficient charge. These could include graphene, porous carbon/fine carbon based super capacitors or proposed capacitors such as that which uses paper cut into strips then mixed with sulphuric acid at 180° C. then carbonized at 800° C. before being mixed with an electrolyte get to create a super capacitor. There will also preferably be a range of support and charging systems, transport systems and equipment delivery systems.

In some embodiments, the apparatus may be configured as a wheeled platform attachable to a vehicle or an unwheeled unit which has an associated delivery or mobile vehicle (manned or unmanned) for delivery of the at least one secondary electrical power storage unit to the electric vehicle having a primary power source.

In the present specification and claims (if any), the word "TMA" and its derivatives is used to refer to a truck mounted apparatus with wheels however the same term will be applied to all such systems including those for cars and other vehicles.

In the present specification and claims (if any), the word "UTMA" and its derivatives is used to refer to an unwheeled truck mounted apparatus however the same term will be applied to all such systems including those for cars and other vehicles.

In the present specification and claims (if any), the word "Triler" and its derivatives is used to refer to a trailer mounted apparatus.

As mentioned above, normally the apparatus will be provided in one of 2 preferred embodiments namely a wheeled embodiment (referred to as a TMA) and a non-wheeled embodiment (referred to as a UTMA).

In the wheeled configuration, it is preferred that the apparatus will be or include a wheeled platform. The wheeled platform will typically mount or carry or support one or more secondary electrical power storage units. In the wheeled configuration, the apparatus may be configured as a towable trailer or alternatively as a wheeled apparatus for transport and/or delivery of the at least one secondary electrical power storage unit.

The apparatus can have one or more wheel assemblies. One or more of the wheel assemblies can be deployable or stowable and movable between a stored or stowed condition and a use condition as required. Of course other motility mechanisms can be provided such as tracks or skids or the like.

In one preferred embodiment, the wheeled platform is provided with one rear support wheel assembly. In use, this one rear support wheel assembly will typically support the majority of the weight of the apparatus, particularly when provided in the towable trailer configuration. The rear support wheel assembly will typically be located approximately centrally across the width of the apparatus and preferably behind the centre of gravity.

The rear support wheel assembly may be provided with actuable brakes and/or a suspension or shock absorption assembly. The rear support wheel assembly may be movable in order to adjust for the load. In particular, the wheel assembly may be movable forwardly and rearwardly relative to the centre of gravity of the apparatus.

One or more deployable wheel assemblies may be provided. Preferably, any deployable wheel assemblies will be provided for temporary support of the apparatus either in conjunction with the rear support wheel assembly or for temporary support in the absence of a rear support wheel assembly. Preferably, the deployable wheel assembly will be stored or stowed when the wheeled platform is being towed by vehicle and/or attached to or mounted relative to a vehicle. The deployable wheel assemblies are typically for movement of the wheeled platform at low speeds and particularly when not attached/mounted to a vehicle.

The apparatus may be provided with an external housing or housing portion. For example, one or more walls may be provided within which the at least one secondary power source is located. The apparatus will preferably have at least one base wall and may have a lid for closing the housing. According to the most preferred form of trailer embodiment, the apparatus will have at least one basewall, and at least a forward and a rear wall assembly.

The apparatus will typically have a control panel associated with any housing or wall portion. The control panel will allow monitoring of the status of the at least one secondary power sources associated with the apparatus. It is also preferred that the apparatus will have one or more plugs or ports to allow power supply from the on-board at least one secondary power source. This power supply need not be to the electric vehicle and may be provided for other purposes. Any number of outlets and any combination of types of outlets can be provided.

It is also preferred that the apparatus will have one or more cameras or other mechanisms to allow a user or control system if unmanned, to judge distance between the apparatus and other objects. For example, a rear facing reversing camera may be provided. Other sensors may be provided to allow a user to judge distance to an object such as parking sensors or laser devices for example.

According to one preferred embodiment, the trailer embodiment of the present invention will include a breaker or spacer assembly at a forward end of the trailer embodiment. Typically, the breaker or spacer assembly will form a portion of the forward wall assembly. The breaker or spacer assembly will typically define a volume extending across the forward end of the trailer embodiment (the vehicle end) in order to provide a buffer space in case of accidents or similar. The preferred breaker or spacer assembly will typically include a shaped plate located on a forward side of the breaker or spacer assembly. One or more shaped portions may be provided on the plate or in association with the plate. It is preferred that one or more cone structures are provided but any strengthening or shock absorption structure may be provided. One or more resilient members may be mounted in or in association with the breaker or spacer assembly in order to absorb shock or impact applied longitudinally to the preferred trailer embodiment from front to back or from back to front.

It is preferred that the rear of the trailer embodiment include a similar construction to the breaker or spacer assembly provided at the forward end. It is also preferred that the rear of the preferred trailer embodiment include a bumper assembly.

The apparatus may have an internal unit in order to hold or contain the at least one secondary power source. Normally, the internal unit will accept one or more secondary power sources such as batteries therein. The unit will typically be removable and replaceable from the apparatus. The one or more secondary power sources will typically be removable and replaceable in the unit.

According to one preferred embodiment, the internal unit will typically have a number of subunits, typically one forward subunit and one rearward subunit. Each subunit will typically contain one or more batteries. It is preferred that the subunits are hinged together at an upper edge. It is also preferred that the each unit is hinged to the preferred trailer embodiment at each of the upper forward edge and an upper rearward edge. According to a most preferred embodiment, a hinge assembly will be provided at the forward edge and the rearward edge of the respective forward subunit and rearward subunit which will have a pair of hinges, one with the hinge point at the top and one with a hinge point at the bottom.

It is preferred that the subunits are generally rectangular in shape although the facing wall of the forward and rearward subunit will typically be angled away from one another from the preferred hinge at the upper edge toward the base of the internal unit. This will form a substantially triangular void between the subunits and this will allow the subunits to flex upwards about the preferred hinge at the upper adjacent edge. This will allow the internal unit to be inserted or removed more easily and will also provide the internal unit with the ability to flex upwardly if compressive force is applied from either the front or the rear of the trailer embodiment such as may occur in an accident similar.

Lower portions of the subunits may be provided with skid or slide members. Corresponding guides may be provided on the trailer apparatus. One or more resilient pads or spaces may be provided on an outer side of the internal unit and/or on walls of the trailer. It is particularly preferred that one or more resilient pads will be provided, preferably at a lower portion of the facing walls between the forward and rearward subunits.

The preferred trailer embodiment may be length adjustable. In particular, the trailer embodiment may be provided in a pair of portions, namely a front portion and a rear portion which slide together relative to one another. Normally, one portion of the base wall of this embodiment will slide within or relative to the portion of the base wall provided on the other of the front or rear portion. Preferably, the base wall of the forward portion slides at least partially within guided by the base wall of the rear portion. Normally, it is the deck members forming the base wall which will slide relative to one another with the forward wall assembly being fixed to the deck members and the rearward wall assembly being fixed to the deck members. Therefore, the trailer will normally have a substantially planar deck with a forward a breaker or spacer assembly and a rear assembly with the planar deck either being fixed or including more than one portion that can move relative to each other to define the length of the trailer. Typically, a biasing mechanism is provided to bias the ends toward one another such that the insertion of the internal unit between the forward wall and the rear wall will expand the trailer.

The forward wall assembly, and typically be forward side of the breaker or spacer assembly will preferably be provided with a draw assembly in order to attach the trailer embodiment to a vehicle. Preferably, a pair of draw assemblies is provided, one on either side of the midline of the trailer. Each assembly will preferably include up in order to be received in a corresponding opening on the electric vehicle. The opening can be provided as a retrofit to the electric vehicle or alternatively can be included as a part of the original equipment manufacturer.

Each pin will typically be downwardly extending from a drop-in bracket. The pin will typically be provided substantially parallel to the forward wall of the trailer. Normally the pin will be spaced from the forward wall of the trailer. A lower portion of the pin may include one or more transverse openings in order to receive a locking pin therethrough.

Each pin will typically be shaped. It is preferred that at least one, and more preferably a pair of cutouts are provided in the pin in order to receive portions of a locking fork in order to lock the pin in an engaged condition. The pair of cutouts will each form a pair of land portions, typically in upper land portion and a lower land portion on at least one and preferably both lateral sides of each pin. In this way, a fork with a pair of spaced apart tine members can be inserted transversely to the pin to engage with the land portions to lock the pin in position, with one tine on either side of the pin.

A receptacle is typically provided on the electric vehicle in order to receive each pin there into. The receptacle will typically include a bore, typically a substantially vertically extending bore into which the pin is located during attachment of the apparatus to the electric vehicle. The bore may be shaped. The preferred fork will normally extend transversely to the bore and intersect with the bore. When the pin is inserted, the fork is preferably aligned with the pair of cutouts in the pin.

A fork will typically be driven between the locked and unlocked condition. In one preferred embodiment, a motor, preferably an electric motor can be used to achieve this. One or more guides will preferably be provided in order to guide the movement of the fork during retraction and extension. Further, a locking pin may be driven through openings provided in the ends of each of the tines of the fork on the opposite side of the pin to the drive which moves the fork in the preferred embodiment. Again, a motor and preferably an electric motor can be used for movement of the locking pin. Typically, the locking pin will be inserted after the fork is engaged with the cutouts on the opposite side of the pin to the drive of the fork.

In an alternative embodiment, a manually actuated fork may be provided. In this embodiment, the retraction and engagement of the fork with the pin may be achieved through the provision of a lever, preferably an over centre lever which moves the fork between the locked and unlocked conditions.

In an alternative embodiment, the apparatus may include a self-propelled, preferably guided, wheeled platform which can be removably mounted relative to a larger vehicle and to be off the ground when mounted to the larger vehicle. In this alternative embodiment, the apparatus will typically be provided with an external housing and that external housing will normally have a number of openings therein in order to allow insertion of mounting pins to mount the apparatus relative to the vehicle. Typically the vehicle is provided with the pins and those pins are inserted into the openings and locked in order to mount the apparatus relative to the vehicle.

Preferably a number of openings are provided in at least one sidewall or lid of the housing. In this embodiment, it is preferred that the apparatus be loaded beneath a portion of the vehicle. Therefore, the openings will typically be in an upper portion of the housing. It is preferred that openings such as these will have a convergent entryway in order to assist with alignment of the pins with the openings provided in the housing.

The housing may also be provided with one or more clamp openings in order to receive a rotating clamp member which is also provided in the vehicle.

The apparatus of this alternative embodiment will preferably have at least one extendable and retractable lifting assembly in order to lift the apparatus into position relative to the vehicle and the mounting pins and also to lower the apparatus once replacement or removal is required. Any type of extendable and retracting lifting assembly can be used, for example a linear assembly or a scissor assembly could be used.

Preferably, four mounting pins are provided, one relative to each corner of a preferred rectangular apparatus. Consequently, it is preferred that four openings are provided in the housing.

The number of openings provided in the housing for the rotatable clamp members will also preferably equal the number of clamp members provided. The openings are typically clamping ports or similar which will allow engagement of the clamp members with the housing in order to hold the housing relative to the vehicle. This is normally in addition to the mounting pins that are provided. The rotatable clamp members will normally be provided as a part of a clamp assembly normally with the one or more locking bars which allow more security of engagement between the housing and to the vehicle. Typically, one or more locking bars are provided which extend transversely relative to the housing in order to lock the housing relative to the vehicle.

The at least one secondary power source will normally be one or more batteries and the batteries may be removable and/or loadable into the vehicle or alternatively, the vehicle may draw power from the batteries within the apparatus whilst the apparatus is mounted relative to the vehicle. In some forms, the batteries may be dispensed from the apparatus to the vehicle. In this embodiment, one or more conveying mechanisms may be provided to dispense the batteries. Additionally, there may be a release aid to release the batteries from the apparatus and/or from the vehicle. Typically the batteries are locked relative to the apparatus until they are released. The release of the batteries may require insertion of a tool but preferably, the insertion of one battery, preferably a spent battery into a receiving slot or opening in the apparatus will trigger the release of one or more replacement batteries with the requirement that a spent battery be inserted before a replacement battery can be released.

The apparatus of the present invention also includes a power connection assembly to connect the at least one secondary power source to the electric vehicle. Preferably, the power connection assembly can be provided on the apparatus containing the at least one secondary power source and/or on the secondary power sources themselves for connection. As mentioned above, the at least one secondary power source may be dispensed from the apparatus in order to engage with the connection to the electric vehicle or, alternatively, the connection may be made while the at least one secondary power source is in situ relative to the apparatus. Preferably, a number of at least one secondary power sources may be connected in a grid or similar within the apparatus and then the grid is connected to the electric vehicle.

Any method or type of power connection assembly can be used. Usually, one or more connection ports are provided on the apparatus and/or on the secondary power sources in order to engage with a plug or similar to allow power to be supplied.

The apparatus of the present invention also includes a control device or assembly in order to control supply of electrical energy to the electric vehicle. Again, this may be provided in or on the apparatus or in the vehicle. The control device or assembly will typically allow monitoring of the status of the at least one secondary power sources. Preferably, flow of power from the apparatus to the electric vehicle may be controlled from within the electric vehicle with appropriate action taken in the apparatus as a result of changes made within the vehicle.

It is also preferred that remote monitoring be provided. In particular, it is preferred that a wireless connection be provided to an in vehicle display in order to convey information about the status and operation of the at least one secondary power source to the driver of the vehicle. A wired connection may be provided through the power connection assembly.

Therefore, the present invention is directed towards providing a system and apparatus by which at least one secondary power source can be provided to an electric vehicle in order to supplement the power supply of the electric vehicle and/or replace the power supply of the electric vehicle. This can be achieved in many different ways but according to the preferred embodiment, is provided as either a towable trailer embodiment which can be towed by a vehicle such as a car, truck or motorcycle or as an apparatus adapted to be releasable mounted to a vehicle to supplement or replace the on-board power supply, and which can be provided as a pod or similar attached to a vehicle in containing a number of secondary power sources or provided as or by a delivery vehicle to deliver the secondary power sources to the vehicle for mounting relative to the vehicle either individually (such as removing and replacing the on-board power supply) or as a unit having a number of secondary power sources therein and connection assembly is allowing provision power to the vehicle.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF THE SEVERAL VIEWS OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

Figure 1:
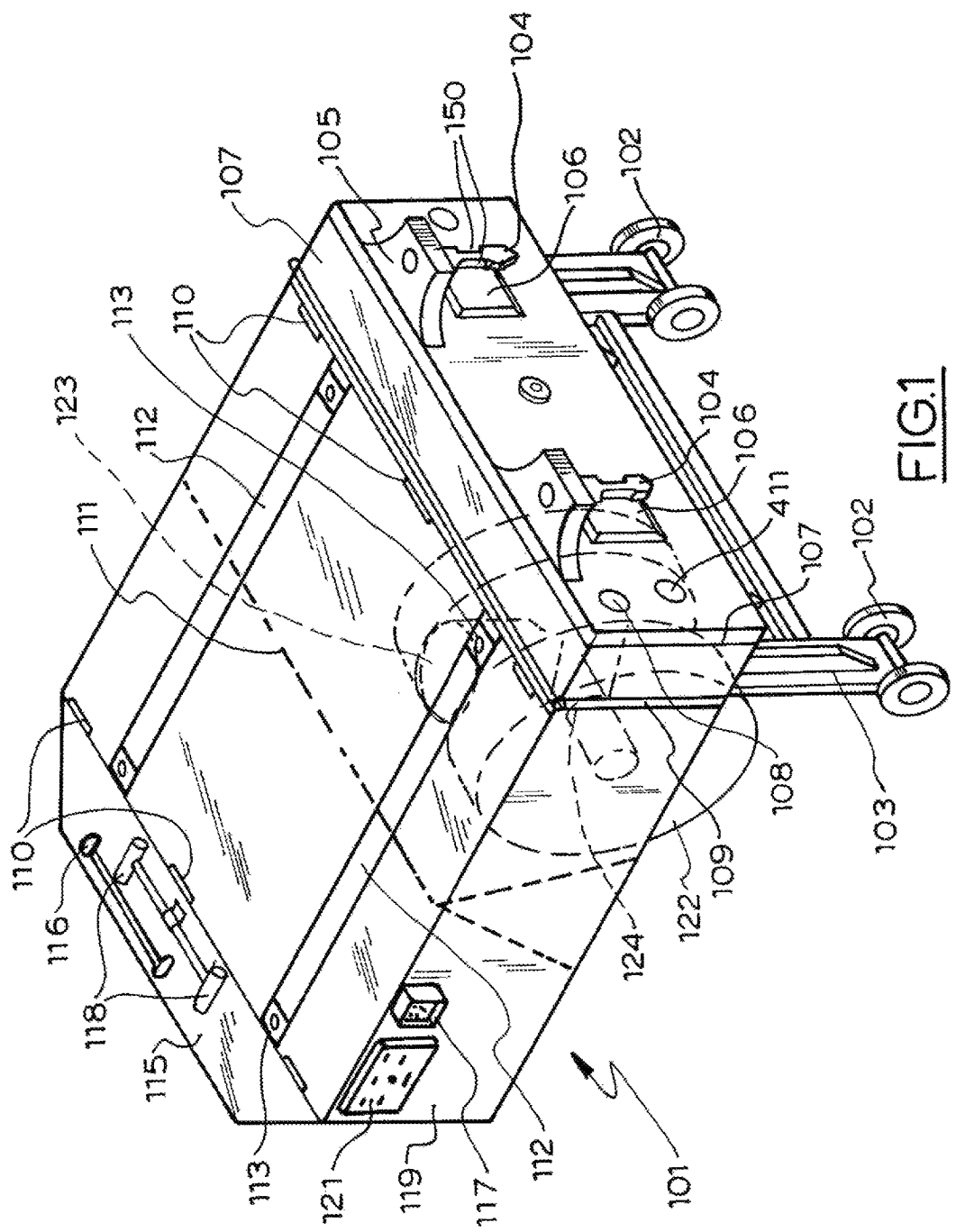
FIG. 1 shows a standard car triler (not connected to a vehicle) according to a preferred embodiment with the park wheels extended and the park wheel assembly locked down.

Diagram 4 shows a sectional view of the breaker spacer unit from the embodiment illustrated in FIG. 1.

Figure 5:
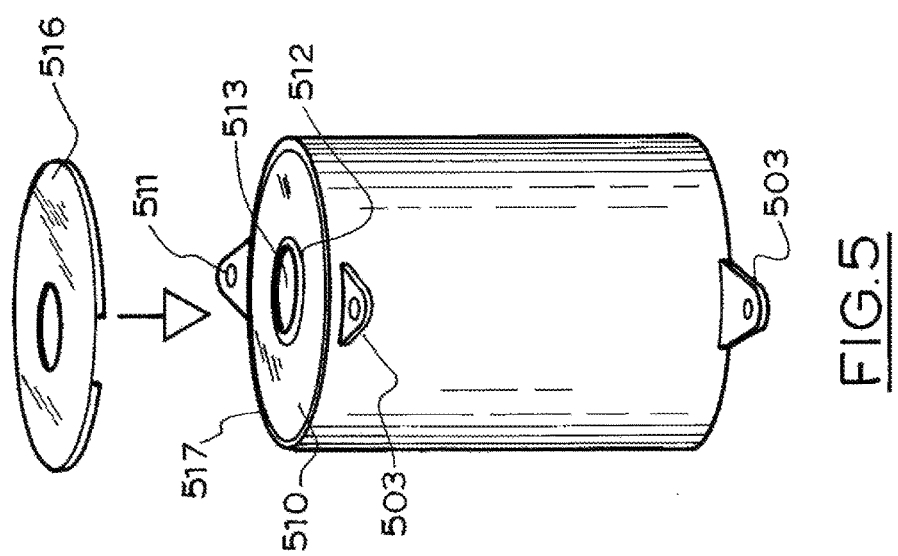

FIG. 5 is an isometric view of the pin receptacle cylinder assembly according to a preferred embodiment.

Figure 6:
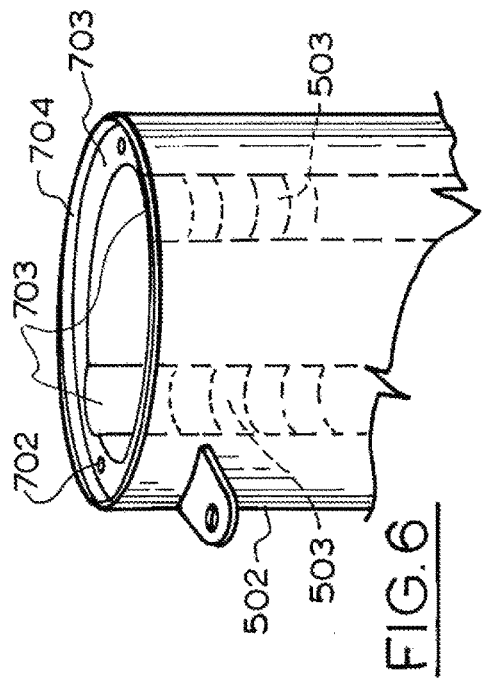

FIG. 6 is a detailed view of an upper portion of the pin receptacle cylinder assembly illustrated in FIG. 5.

Figure 7:
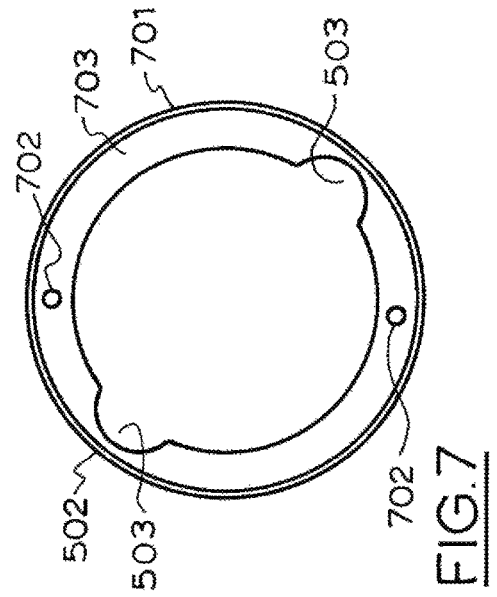

FIG. 7 is a plan view of the pin receptacle cylinder assembly illustrated in FIG. 5.

Figure 8:
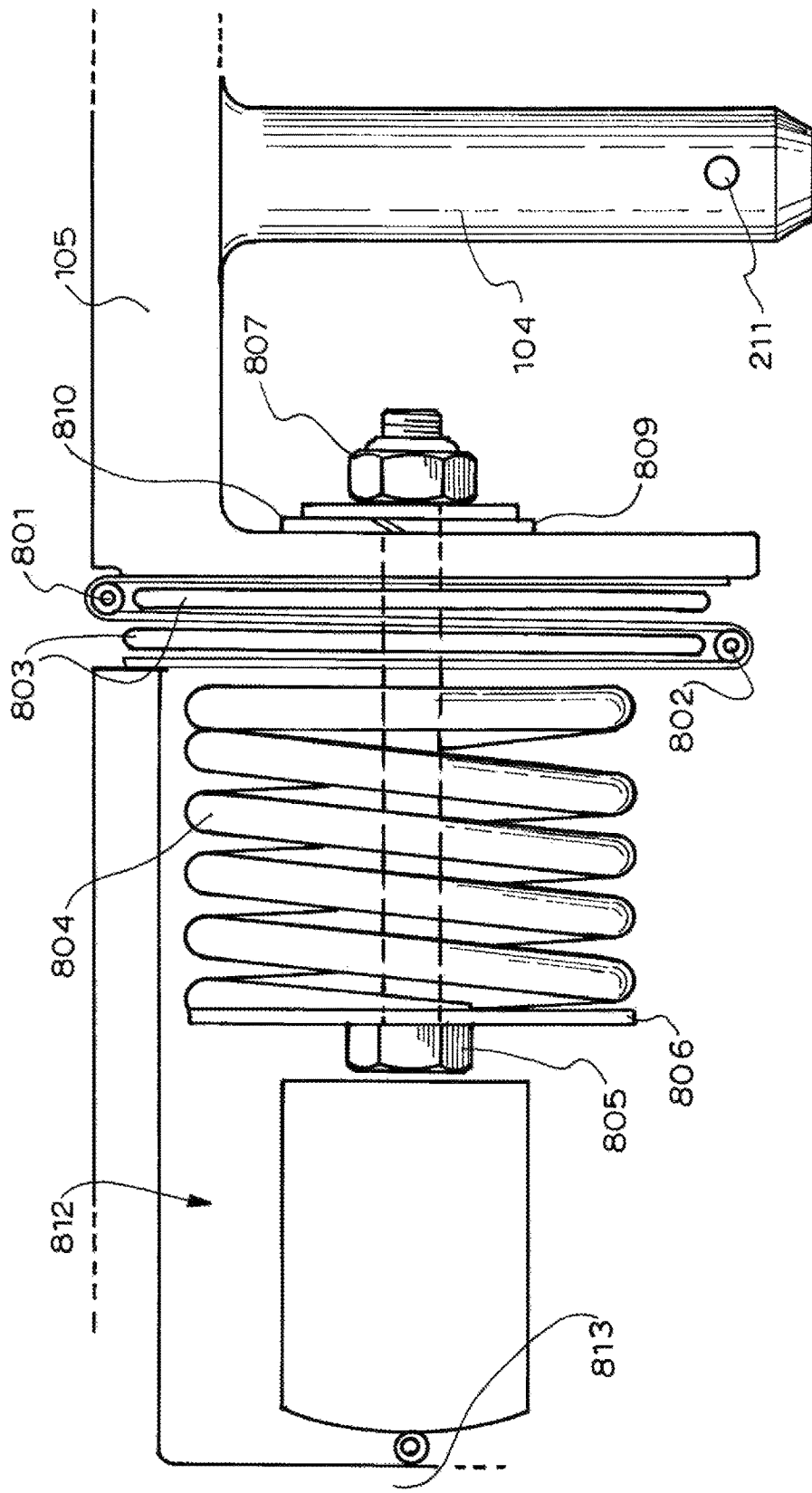

FIG. 8 shows the up-down hinge spring (UDHS) system (without the breaker spacer present) according to a preferred embodiment.

Figure 9:
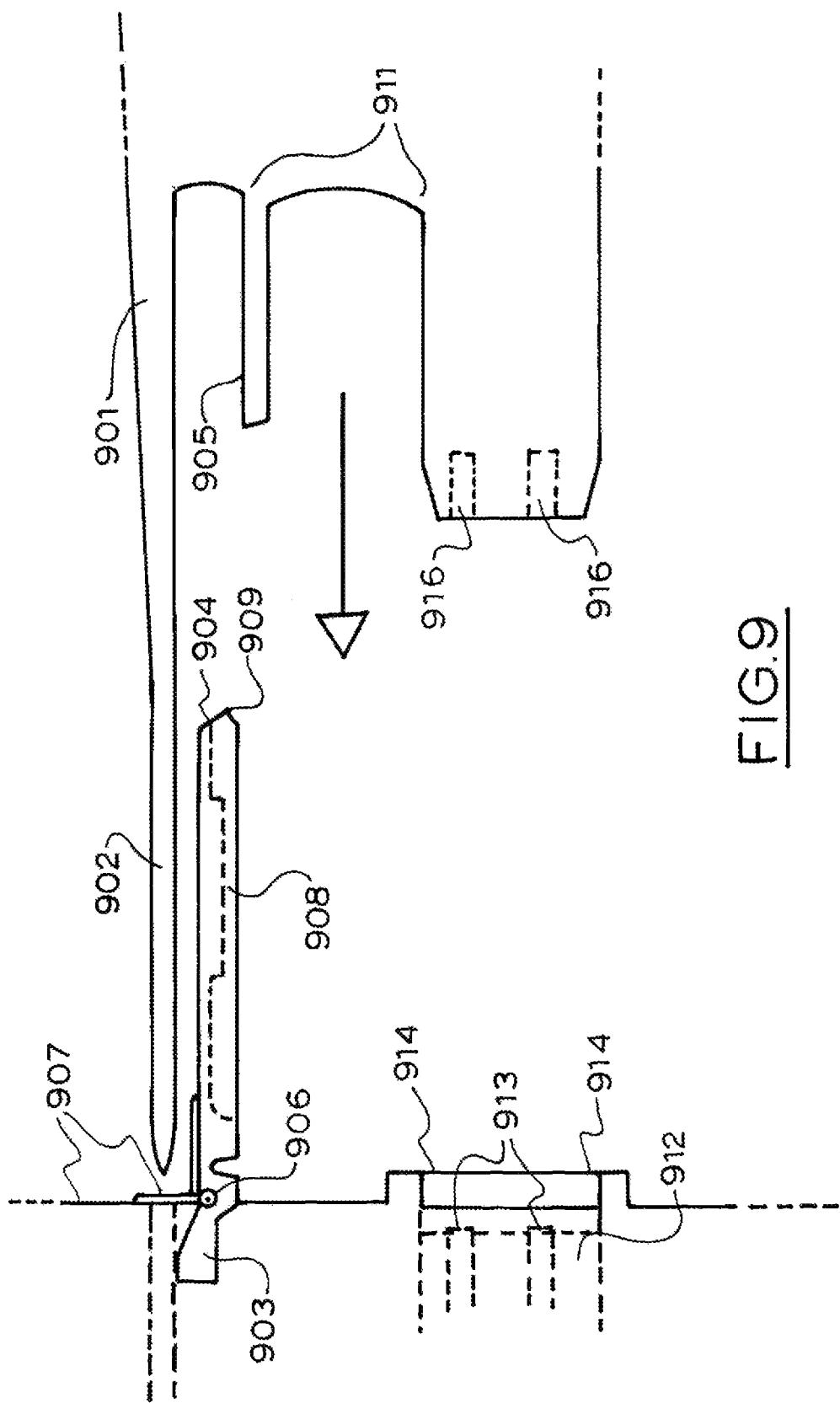

FIG. 9 shows the cover lift system according to a preferred embodiment for lifting the plug-in cover so a TMA or UTMA can plug in.

Figure 10:
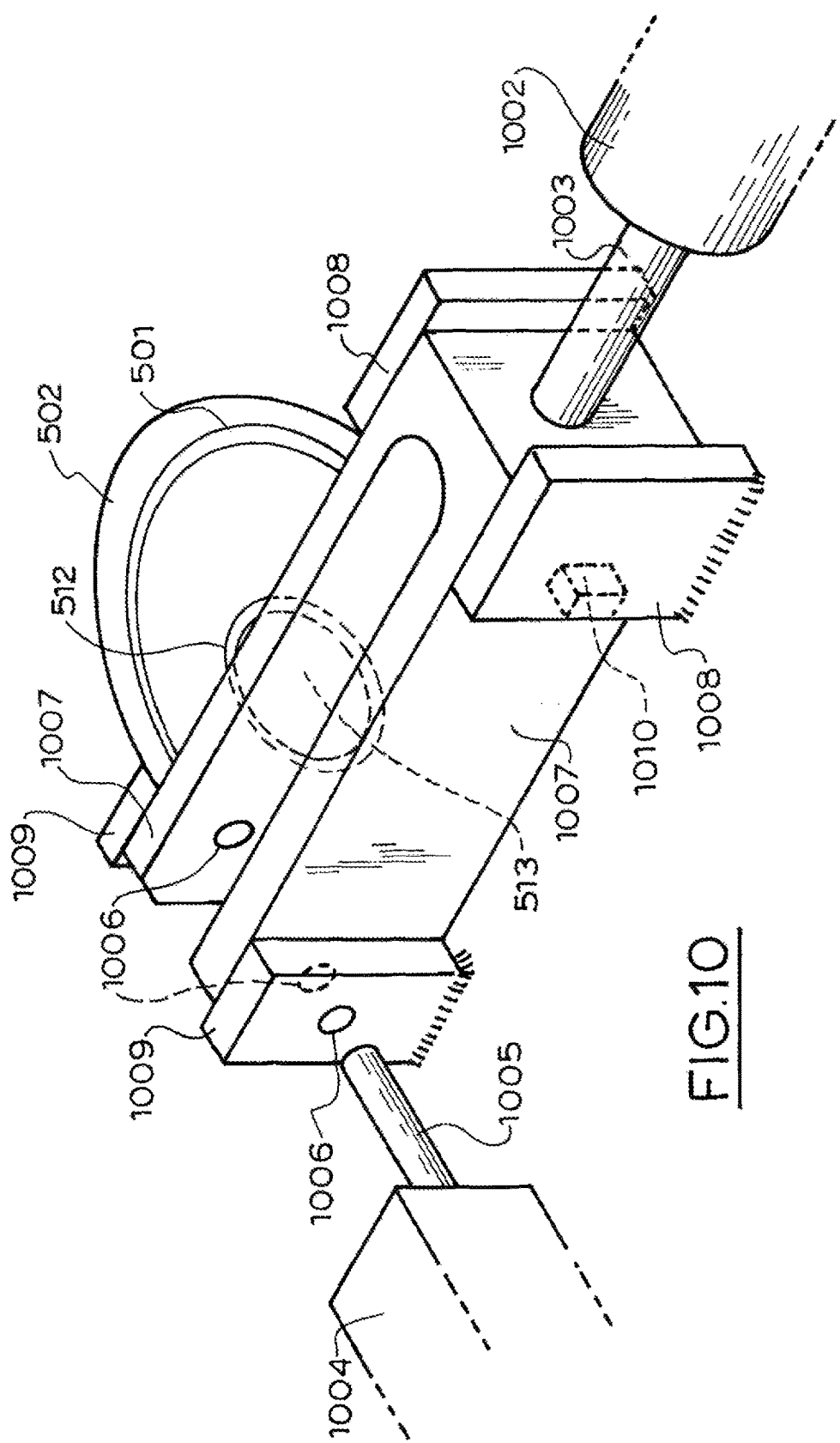

FIG. 10 shows an electrically activated pin locking fork (EADPLF) according to a preferred embodiment for locking a triler draw pin into the receptacle cylinder.

Figure 11:
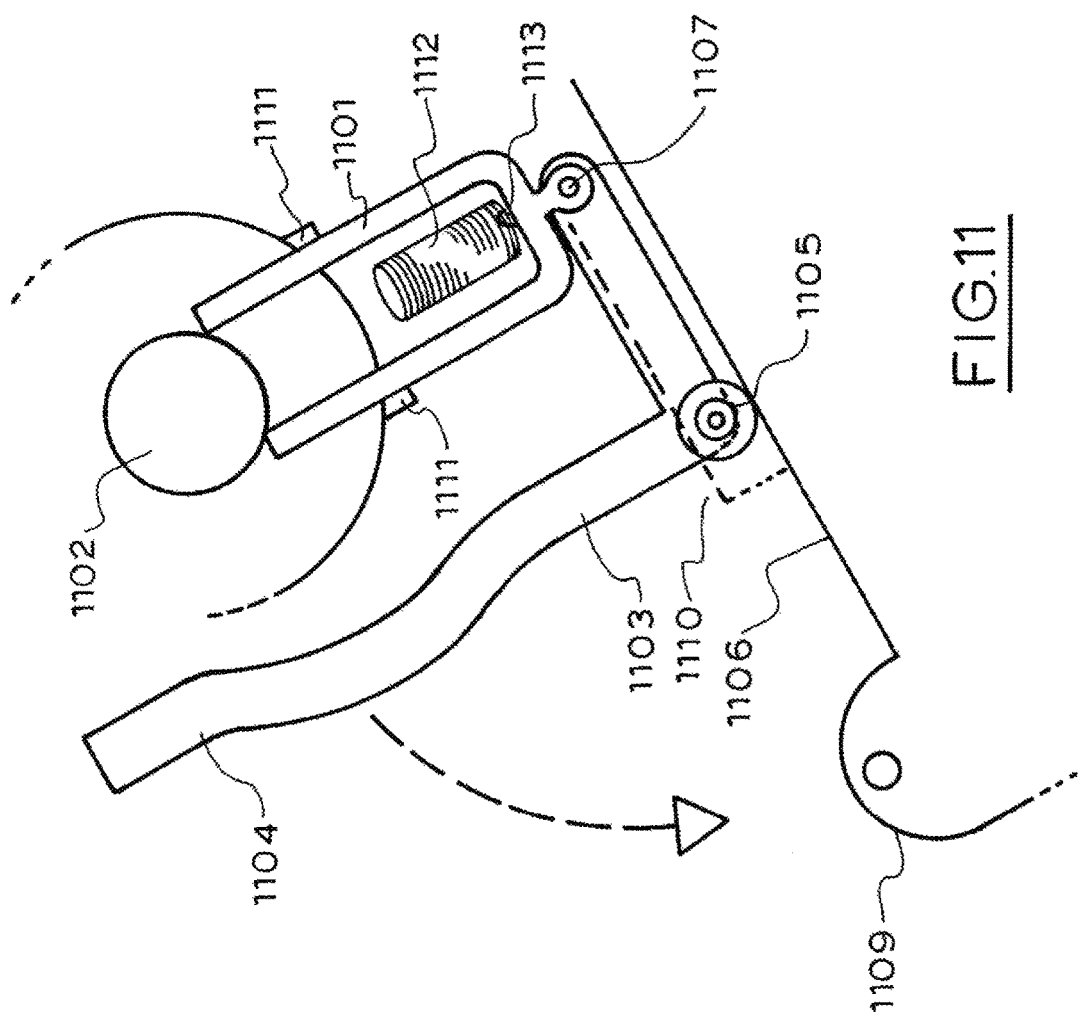

FIG. 11 shows a manual version of the fork locking system according to a preferred embodiment.

Figure 12:
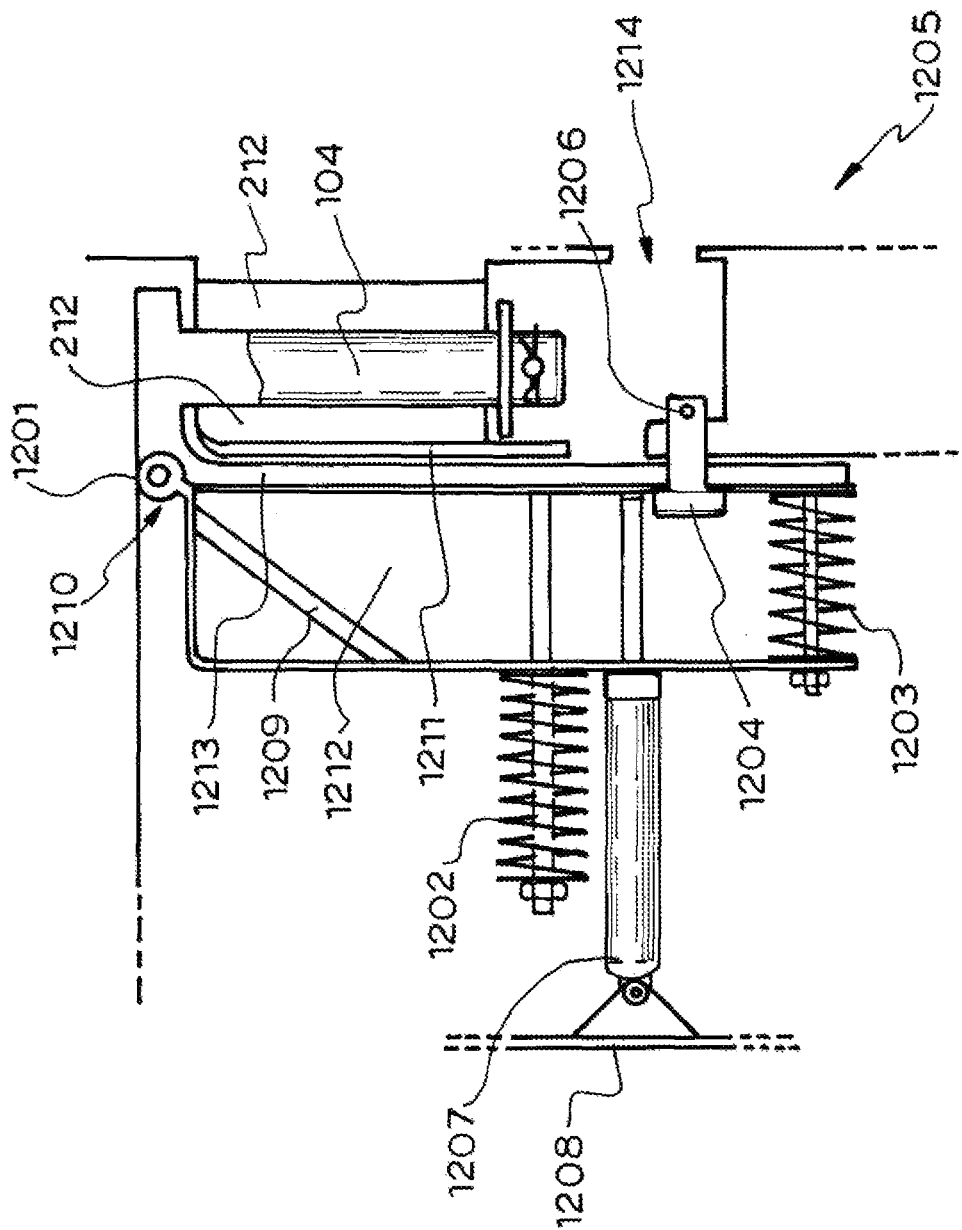

FIG. 12 shows the triler pin and attachment system for a mining equipment triler according to a preferred embodiment.

Figure 13:
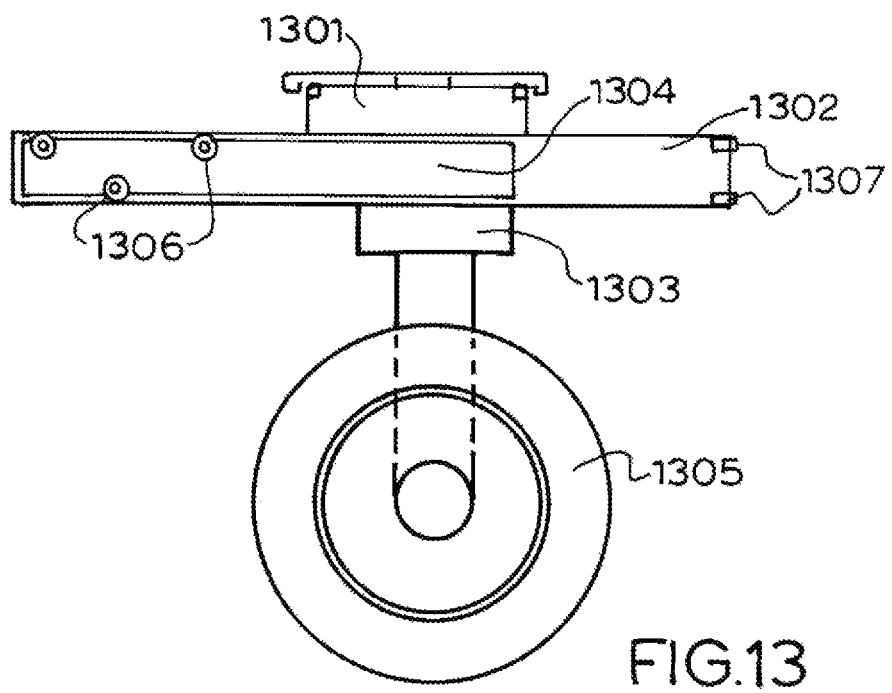

FIG. 13 shows the van triler wheel extender for van, truck, bus and prime mover trilers according to a preferred embodiment in the retracted condition.

Figure 14:
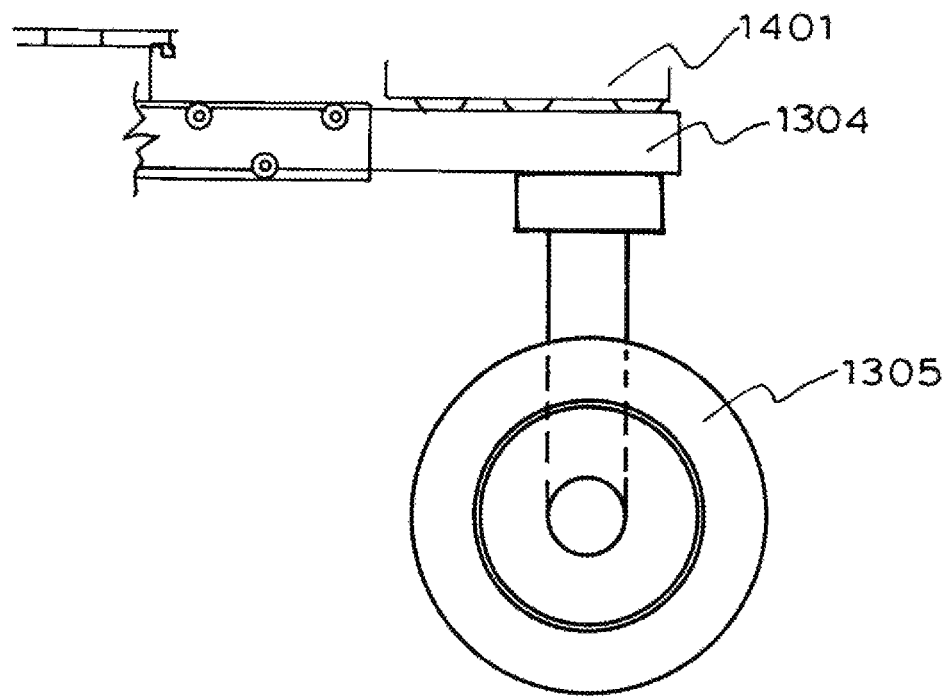

FIG. 14 shows the van triler wheel extender for van, truck, bus and prime mover trilers according to a preferred embodiment in the deployed condition.

Figure 15:
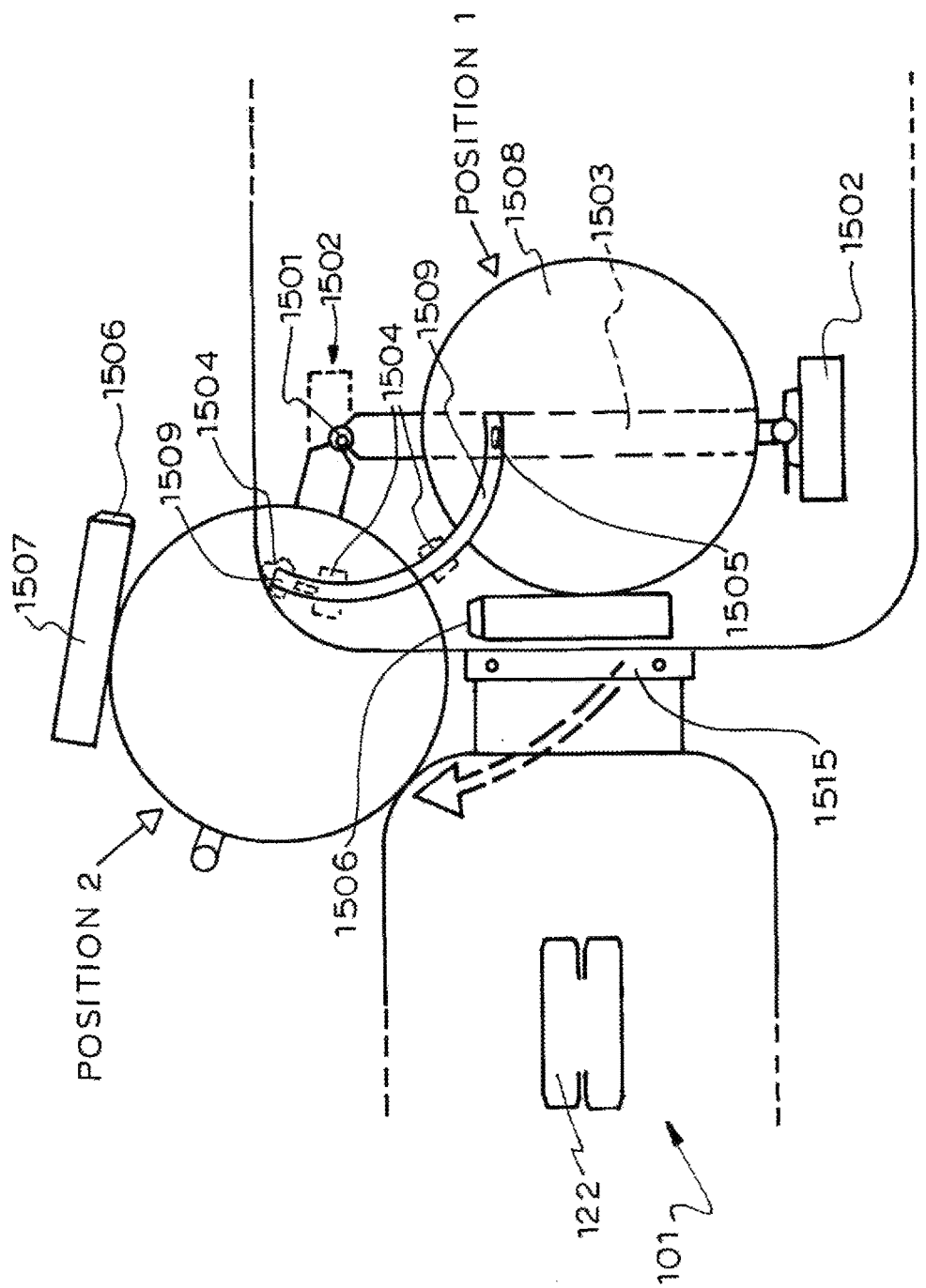

FIG. 15 shows the storage and access positions of a spare wheel bracket for triler enabled vehicles according to a preferred embodiment.

Figure 16:
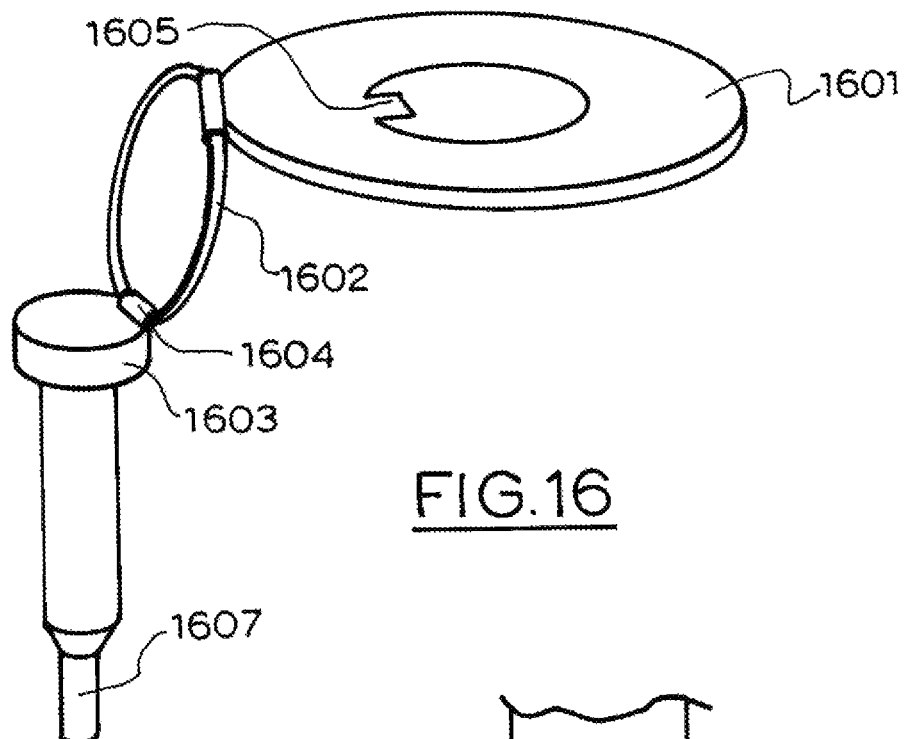

FIG. 16 shows an isometric view of an elasticized locking pin system according to a preferred embodiment of the present invention.

Figure 17:
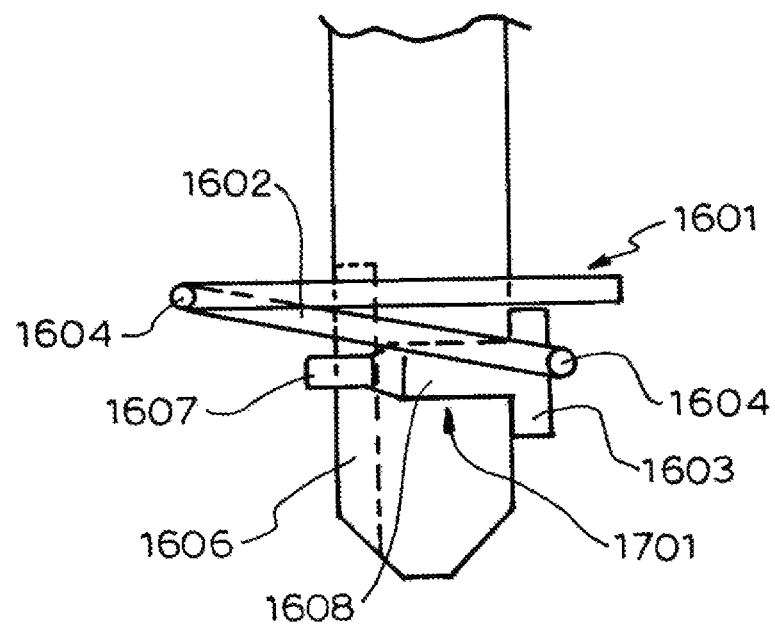

FIG. 17 shows a side elevation view of the configuration illustrated in FIG. 16.

Figure 18:
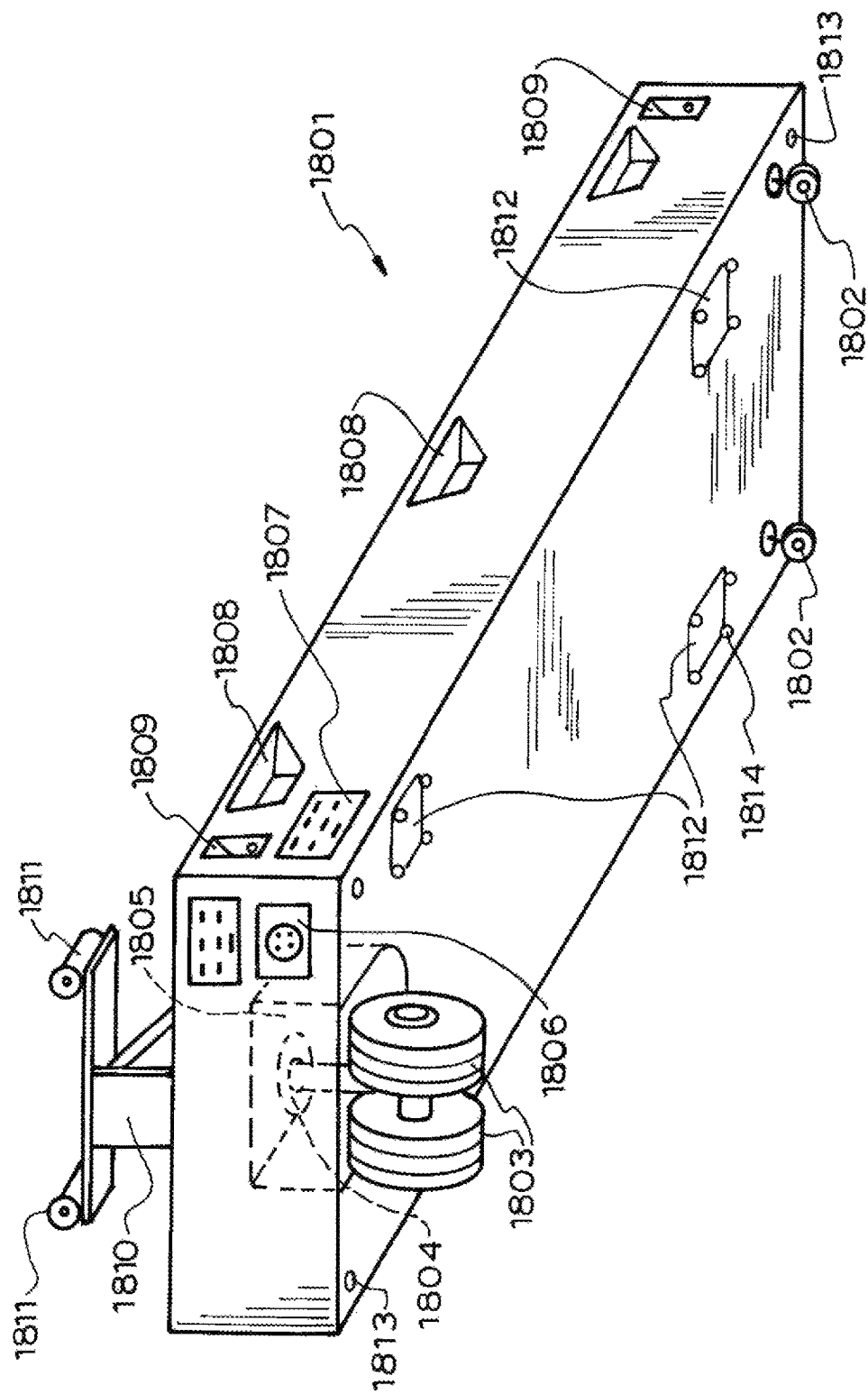

FIG. 18 shows an underside view of a wheeled truck mounted apparatus of a type suitable for cars/trucks/articulated vehicles.

Figure 19:
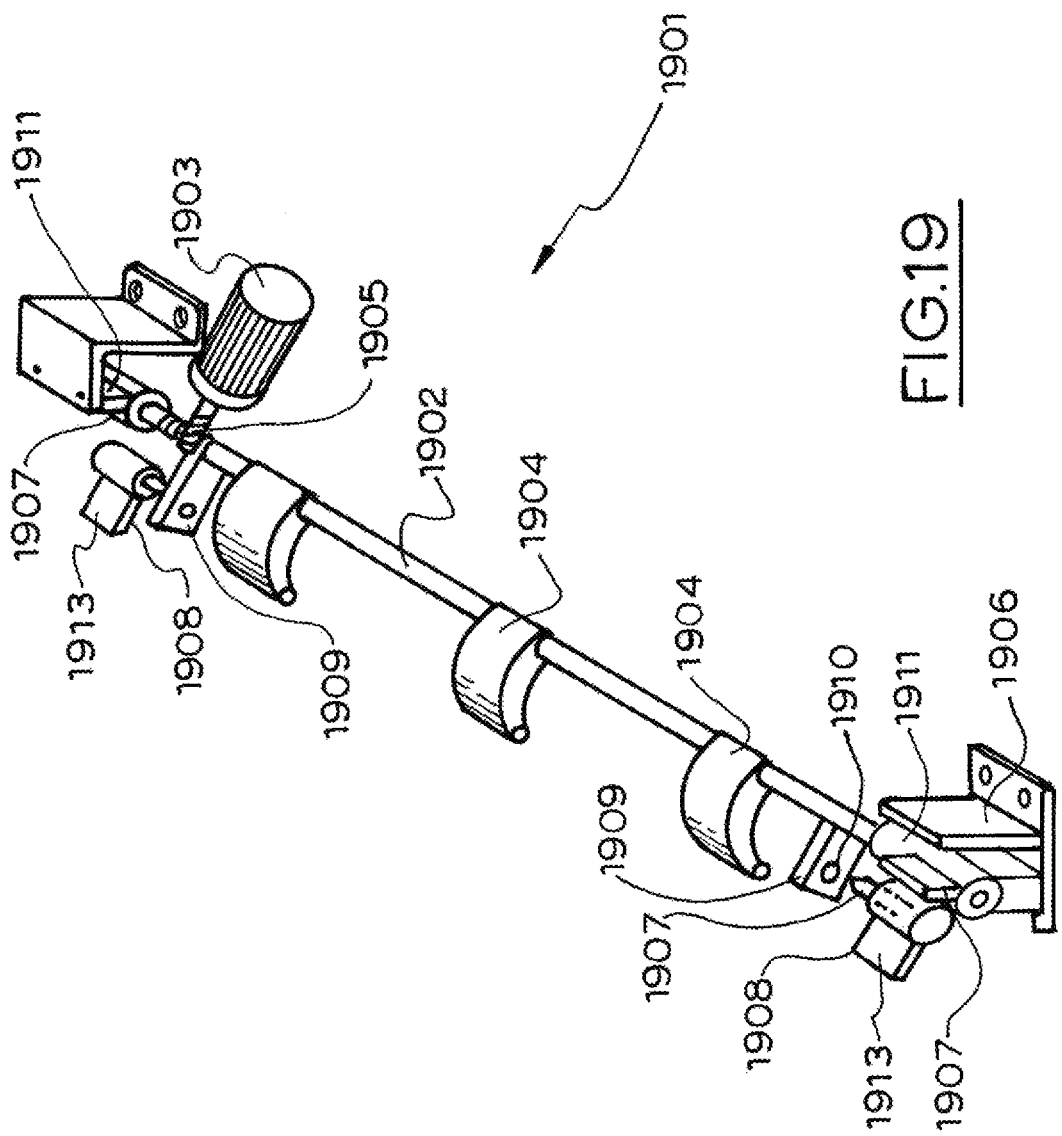

FIG. 19 shows an underside of a vehicle having a roll clamp system (RCS) that holds a truck mounted apparatus under a vehicle according to a preferred embodiment.

Figure 20:
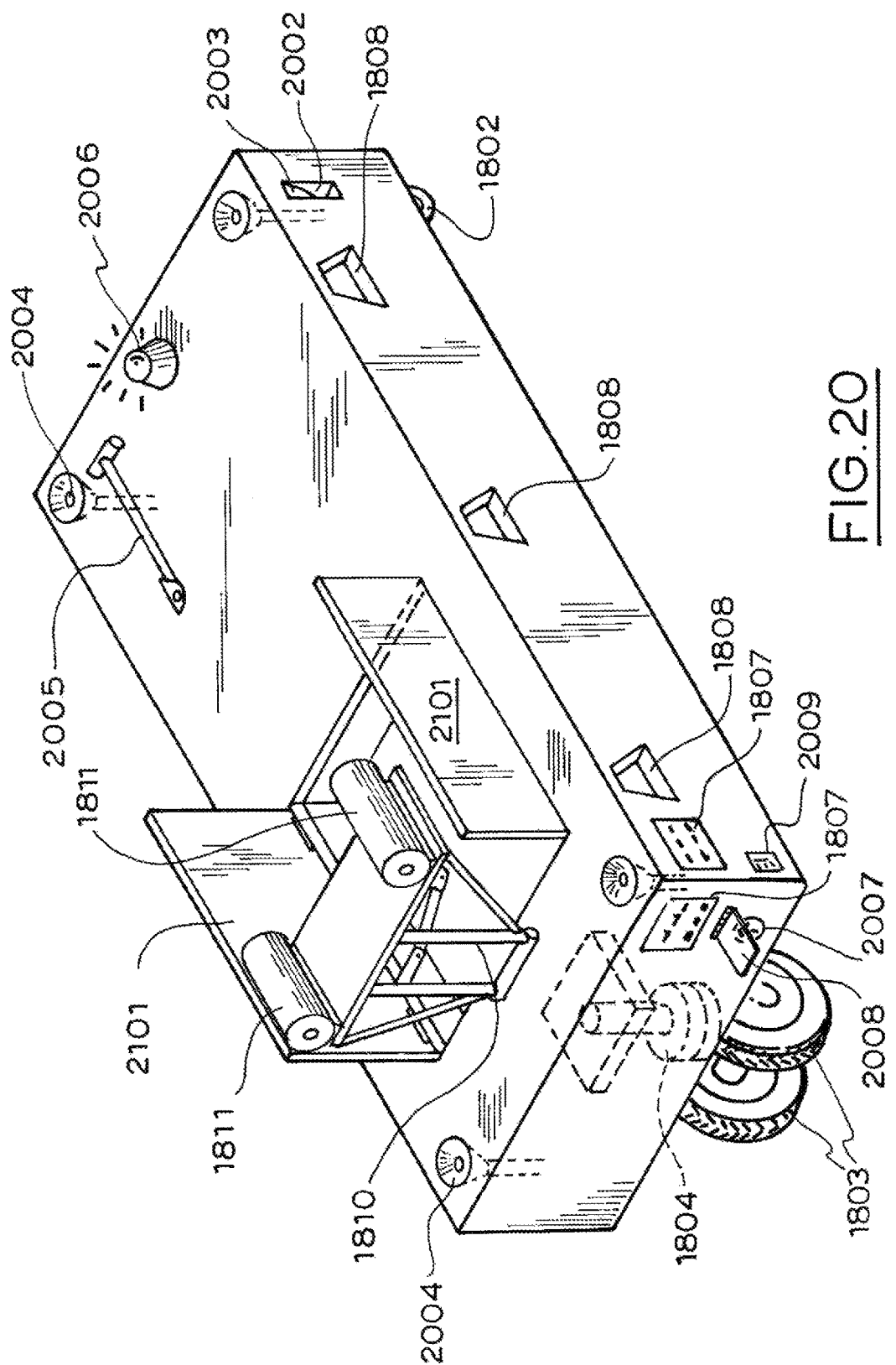

FIG. 20 shows a top view of the wheeled truck mounted apparatus illustrated in FIG. 18.

Figure 21:
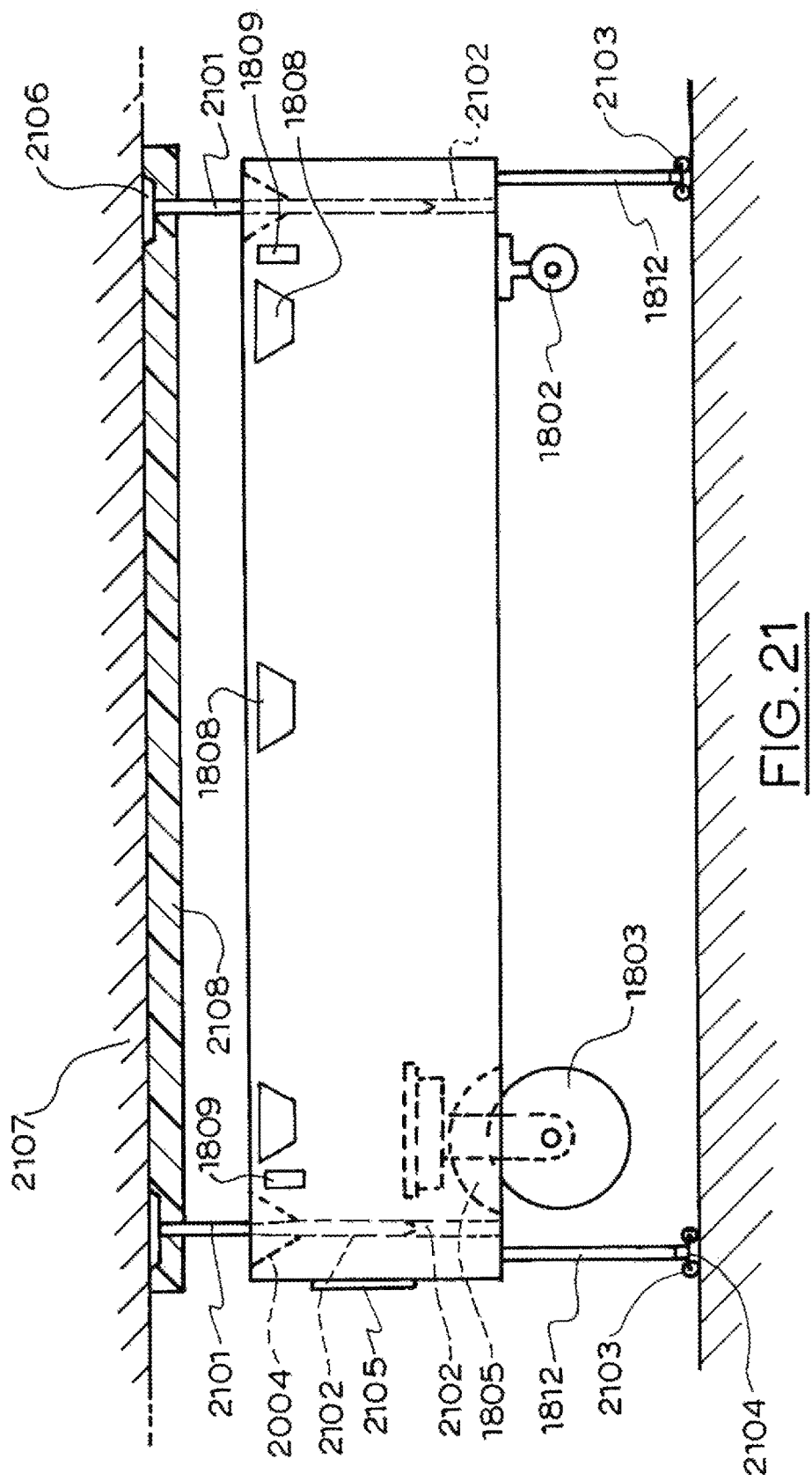

FIG. 21 shows the truck mounted apparatus mounting on jacks to the underside of the truck according to a preferred embodiment.

Figure 22:
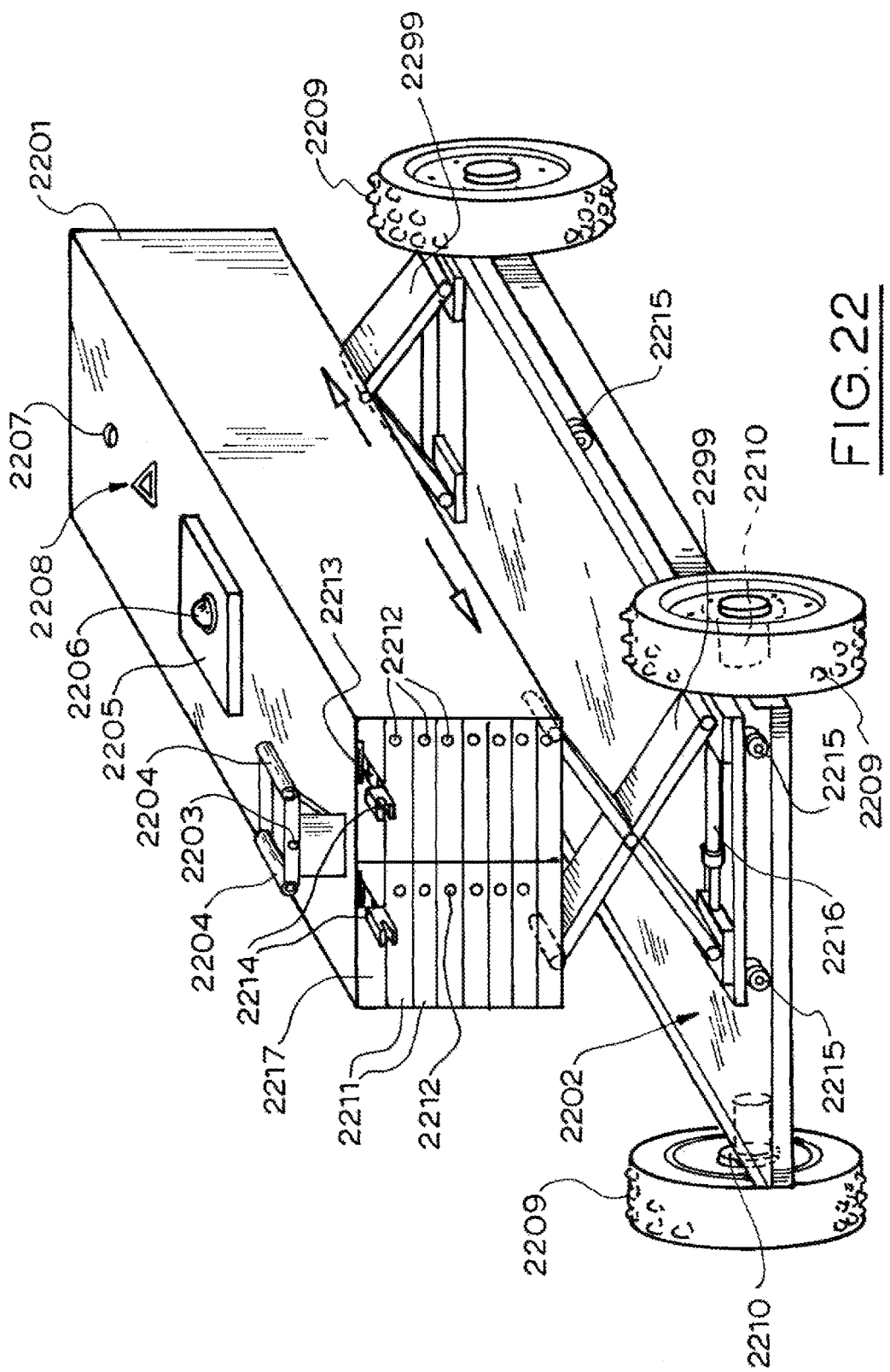

FIG. 22 is an example of a delivery system for delivery of replacement battery components according to an embodiment of the invention.

Figure 23:
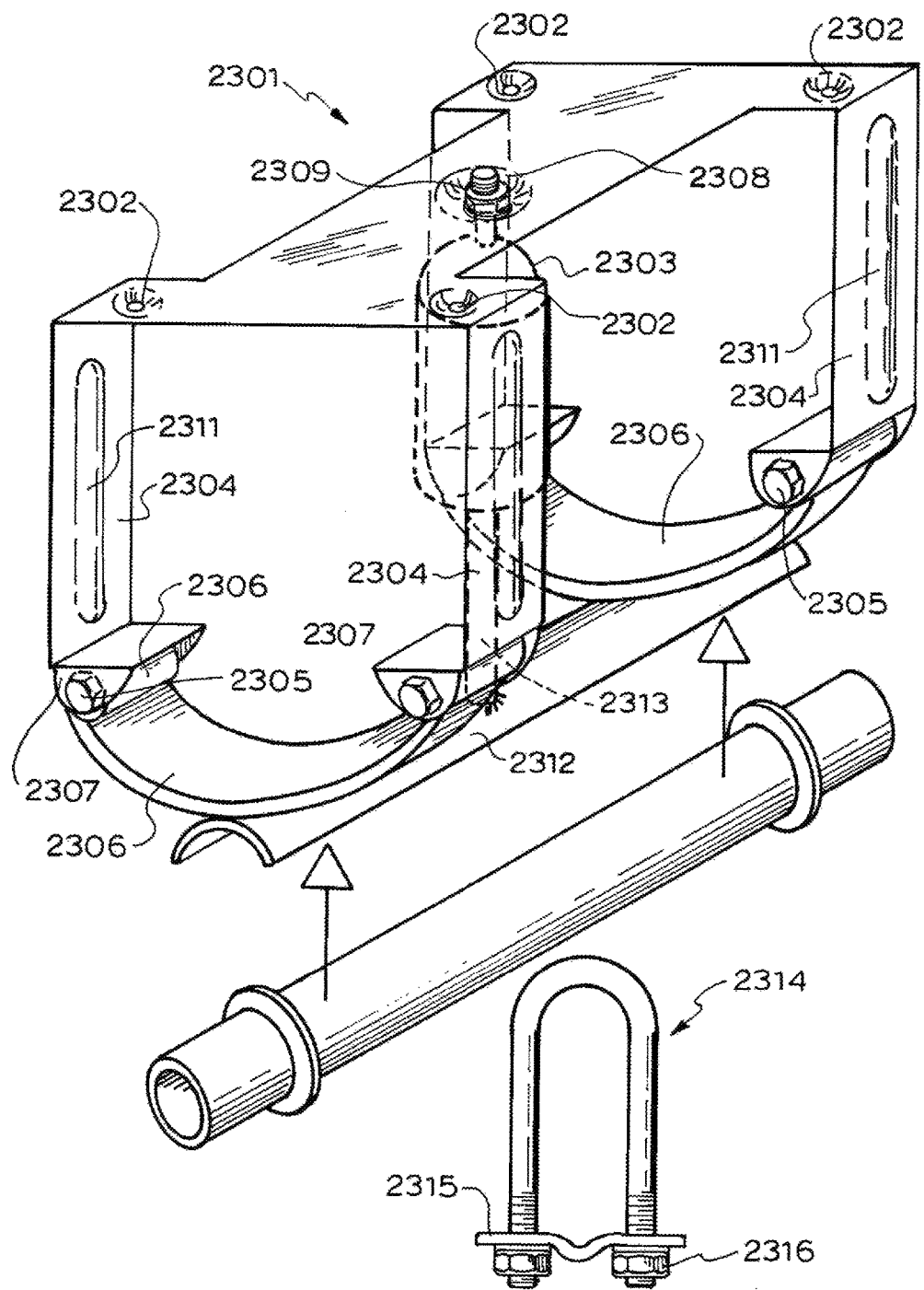

FIG. 23 shows a possible suspension system for wheeled apparatus according to a preferred embodiment.

Figure 24:
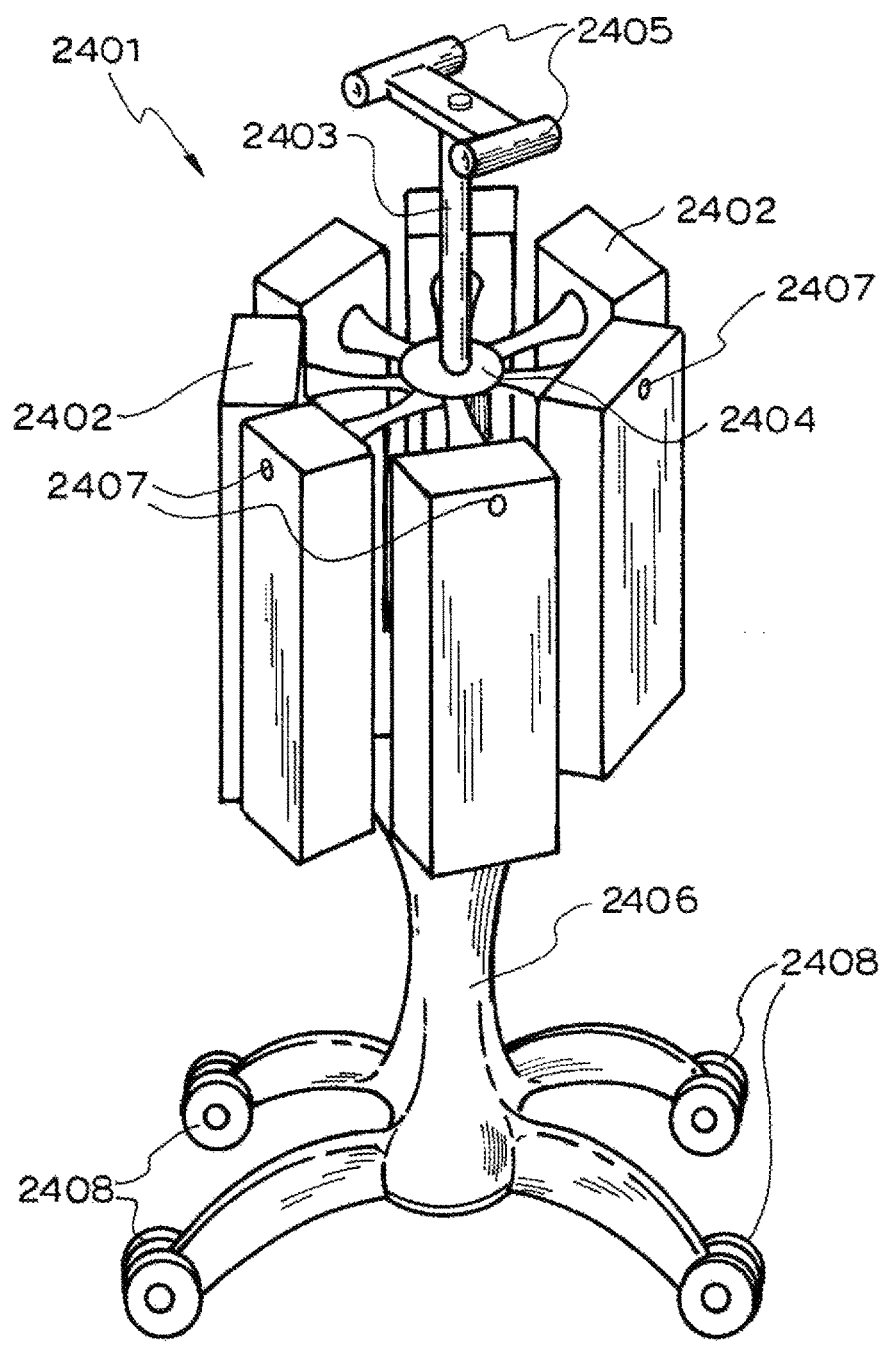

FIG. 24 is an example of an apparatus designed for ferrying replacement secondary power sources from the charge/storage area to motorcycles according to an embodiment of the invention.

Figure 25:
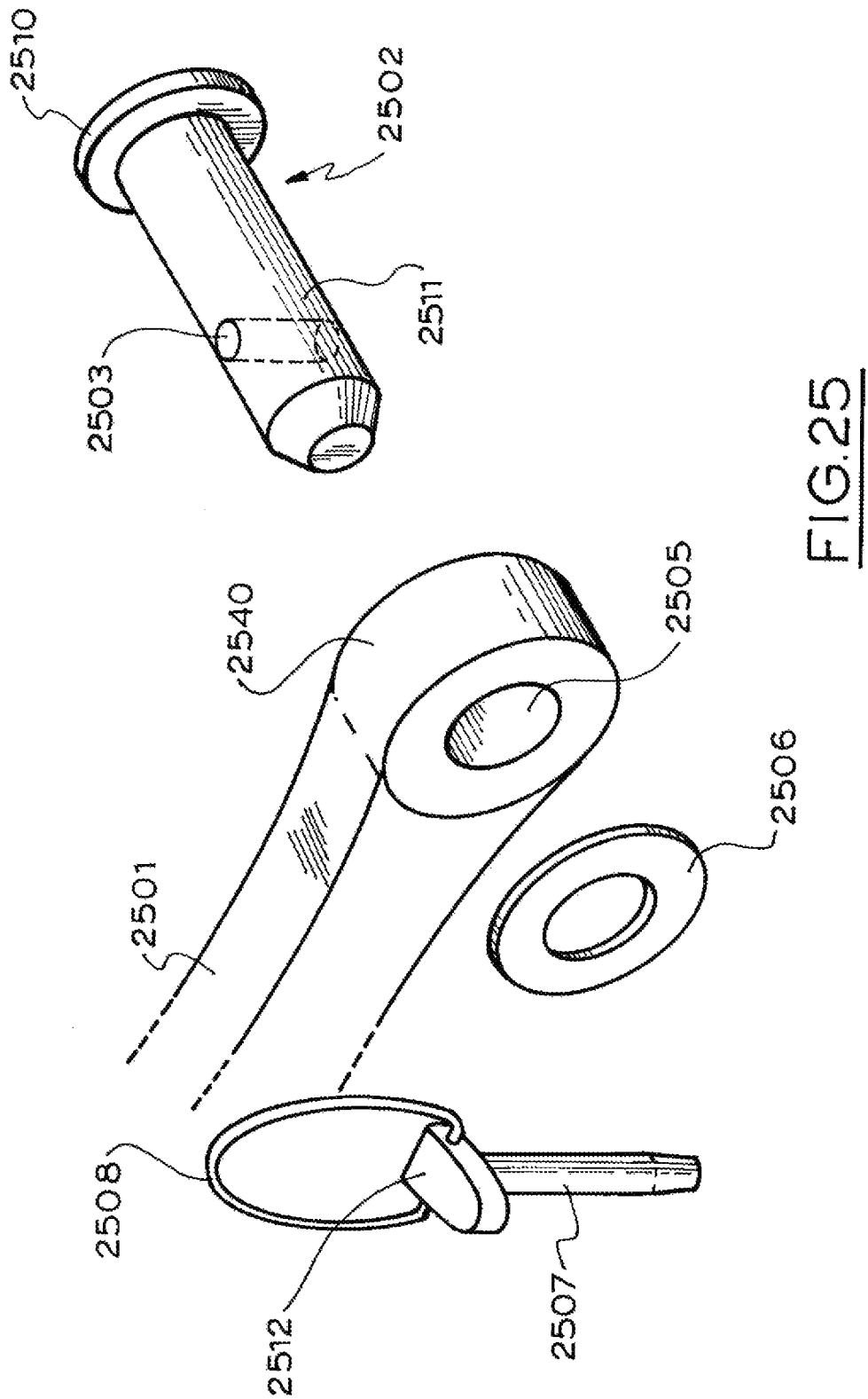

FIG. 25 shows an example of a lower attachment arm on motorcycle trilers attaching over pins/axles on either side of the motorcycle according to an aspect of the present invention.

Figure 26:
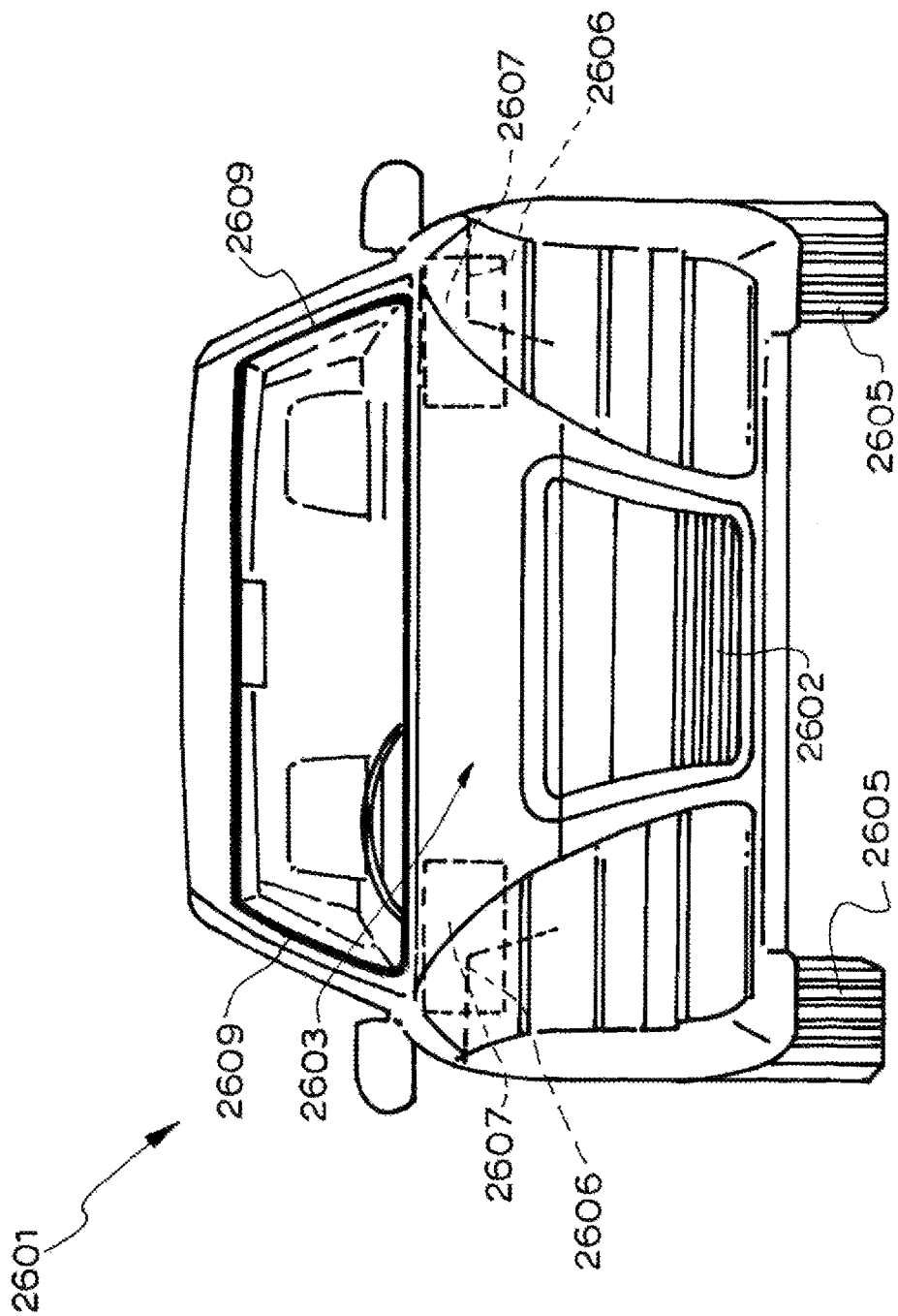

FIG. 26 shows the front of car with an Engine Bay UTMA Carrier system installed according to a preferred embodiment of the present invention.

Figure 27:
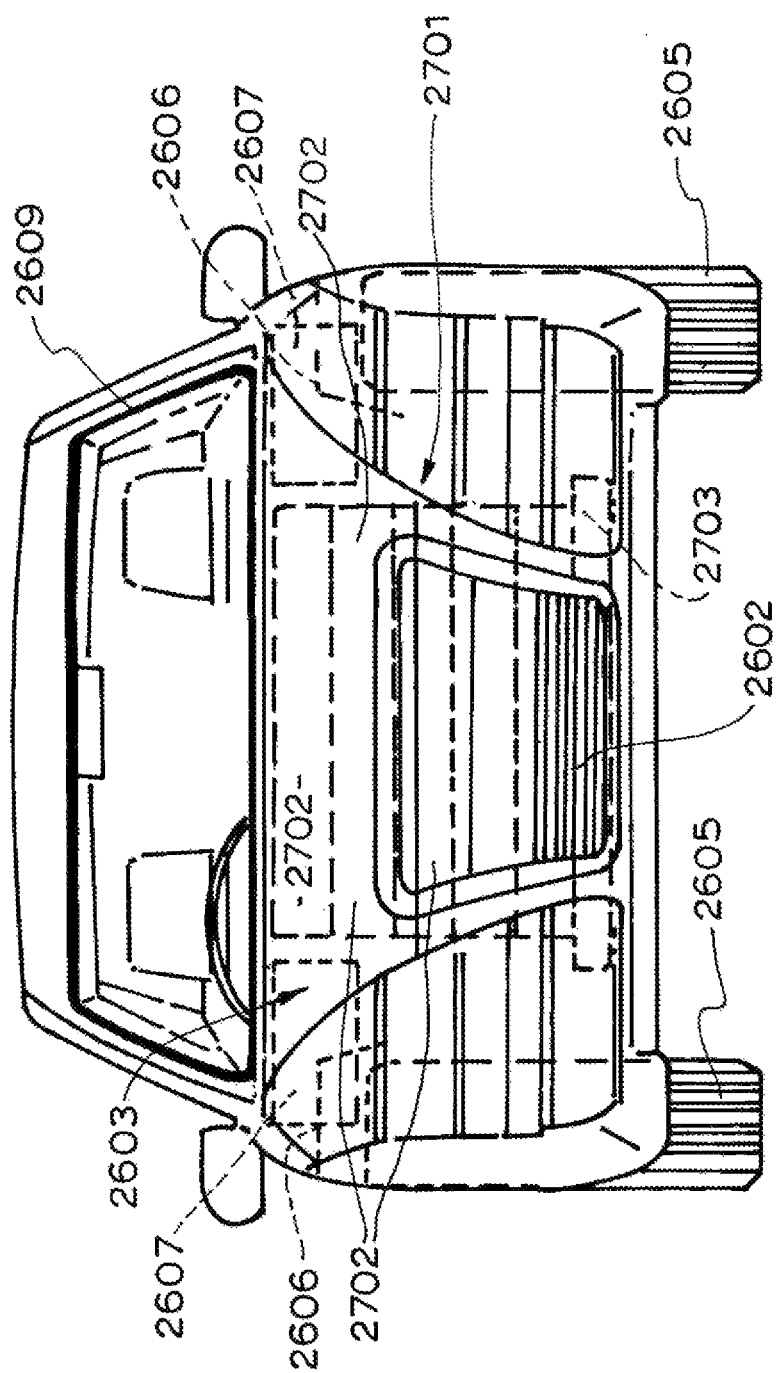

FIG. 27 shows the configuration illustrated in FIG. 26 with the concealed UTMA carrier visible behind the front.

Figure 28:
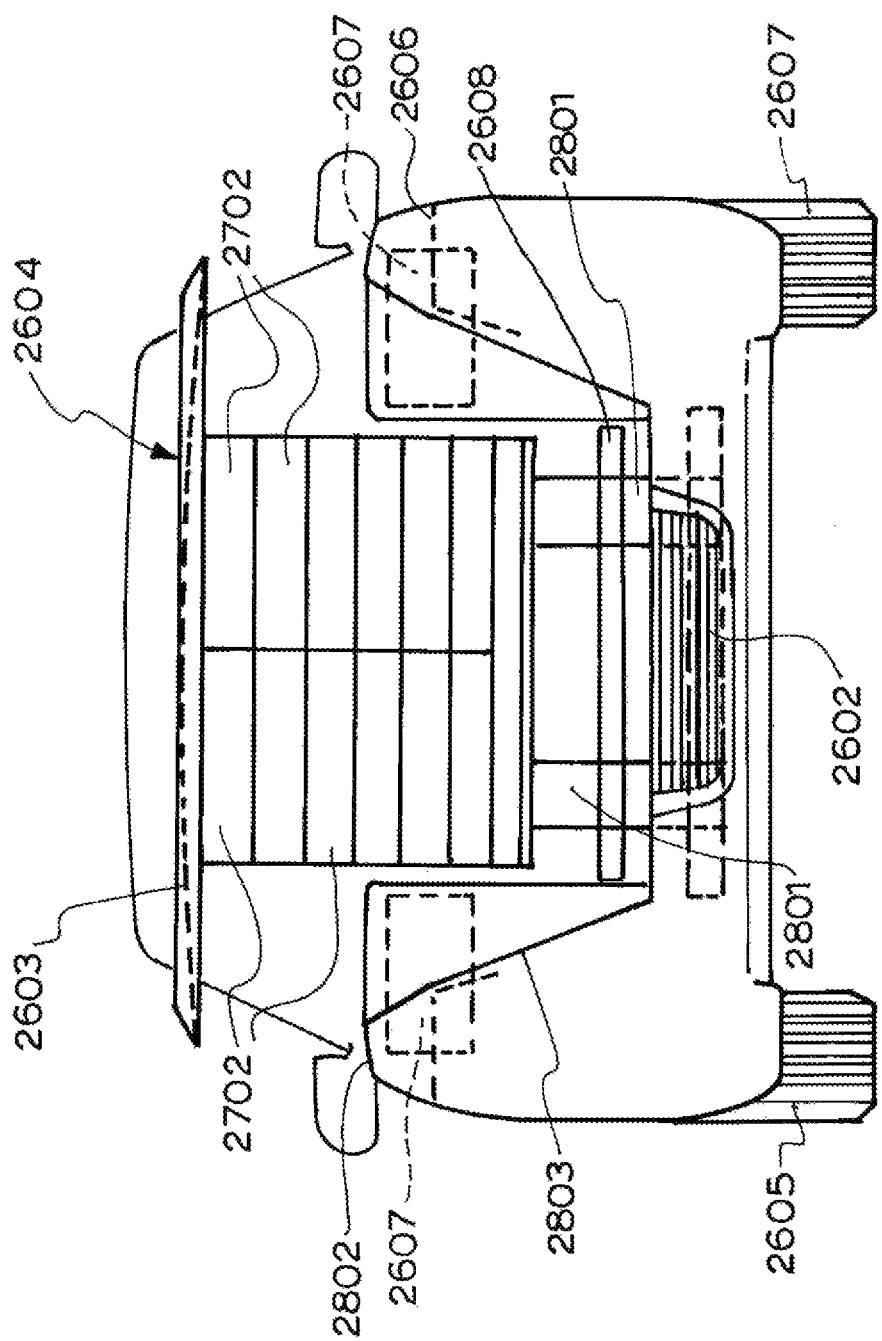

FIG. 28 shows the configuration illustrated in FIG. 26 with the Engine Bay UTMA Carrier Unit extended.

Figure 29:
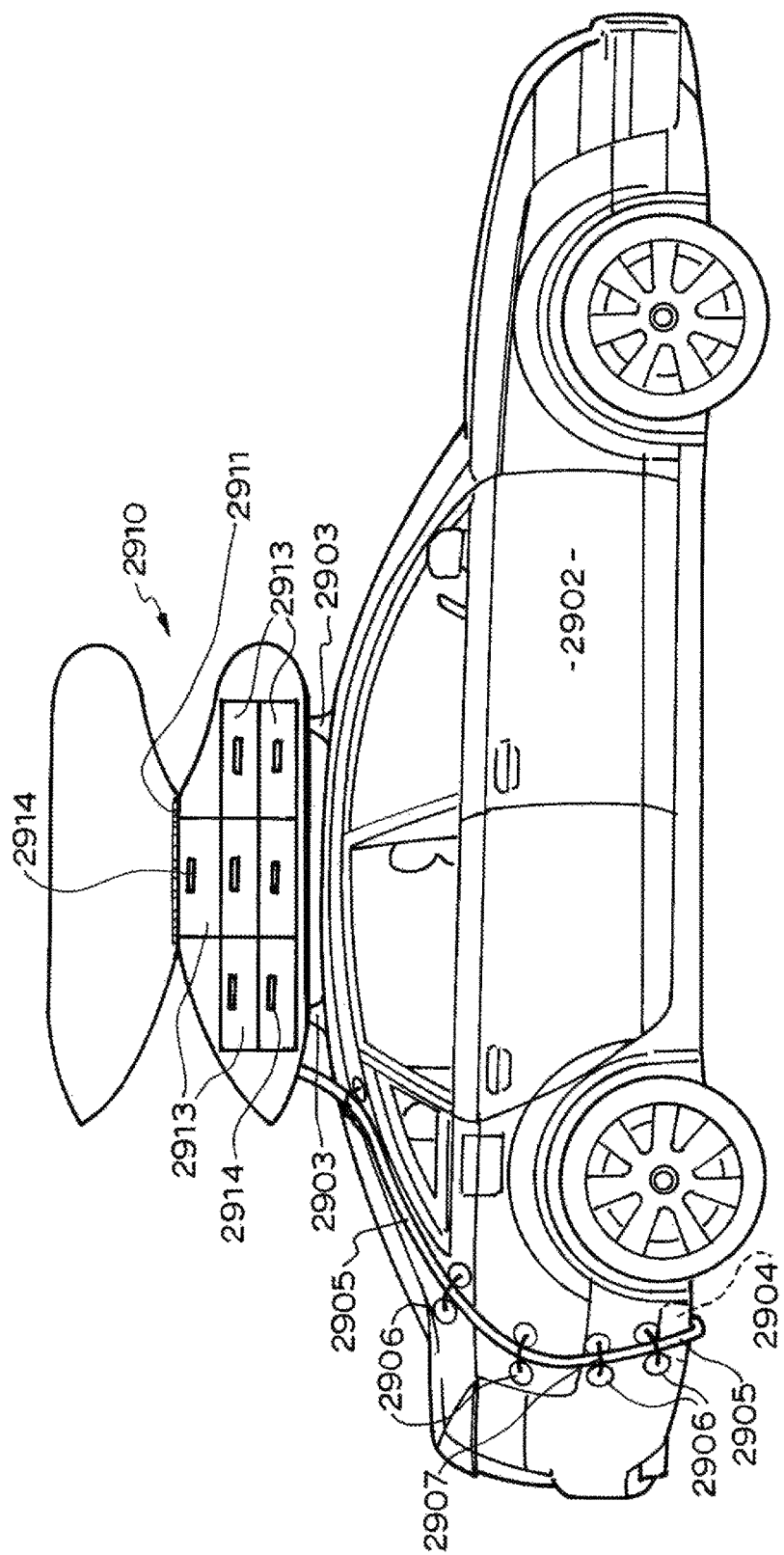

FIG. 29 shows an example of a roof rack carrier according to a preferred embodiment of the present invention.

Figure 30:
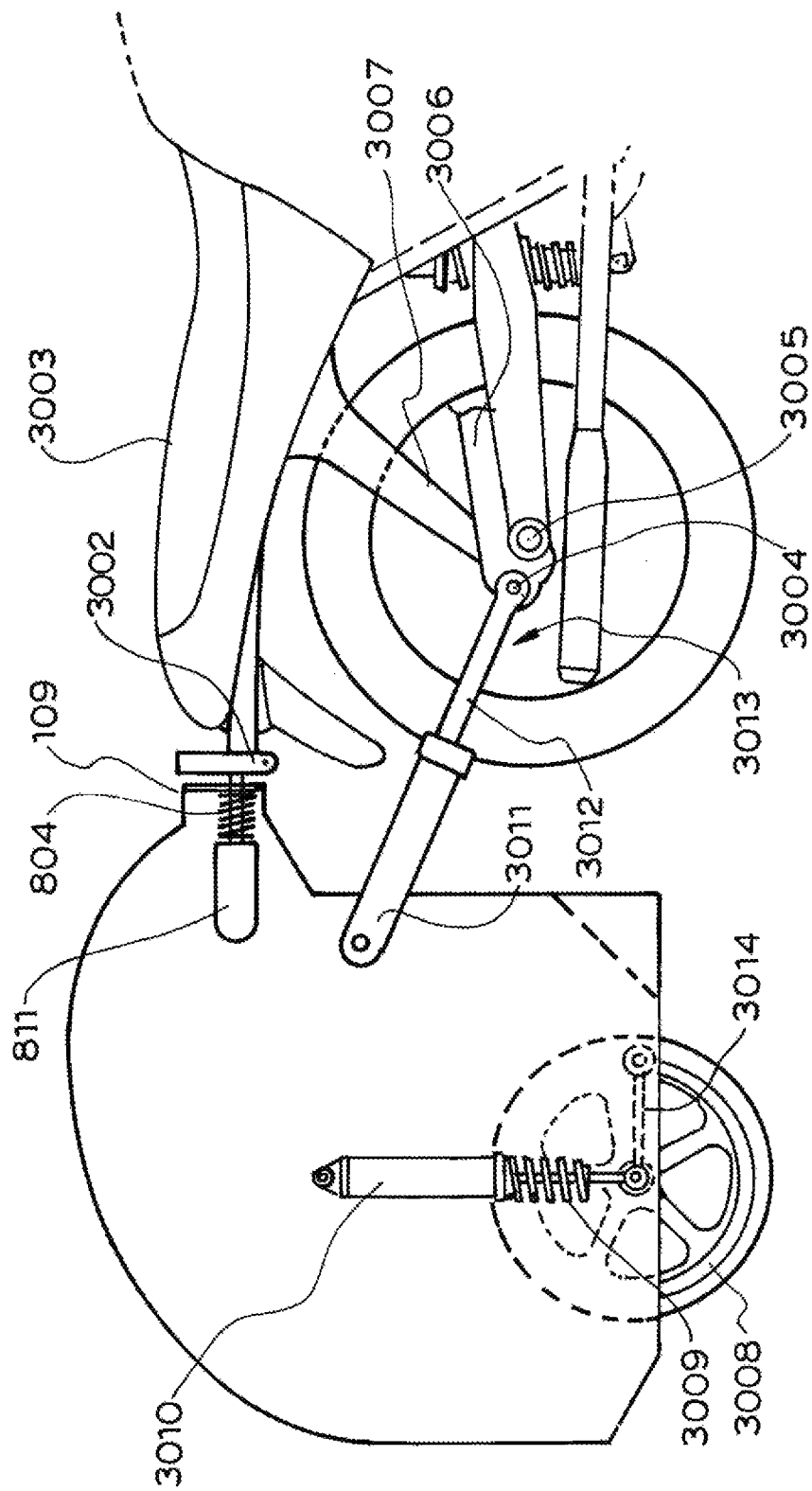

FIG. 30 shows an example of a motorcycle Triler according to a preferred embodiment of the present invention.

Figure 31:
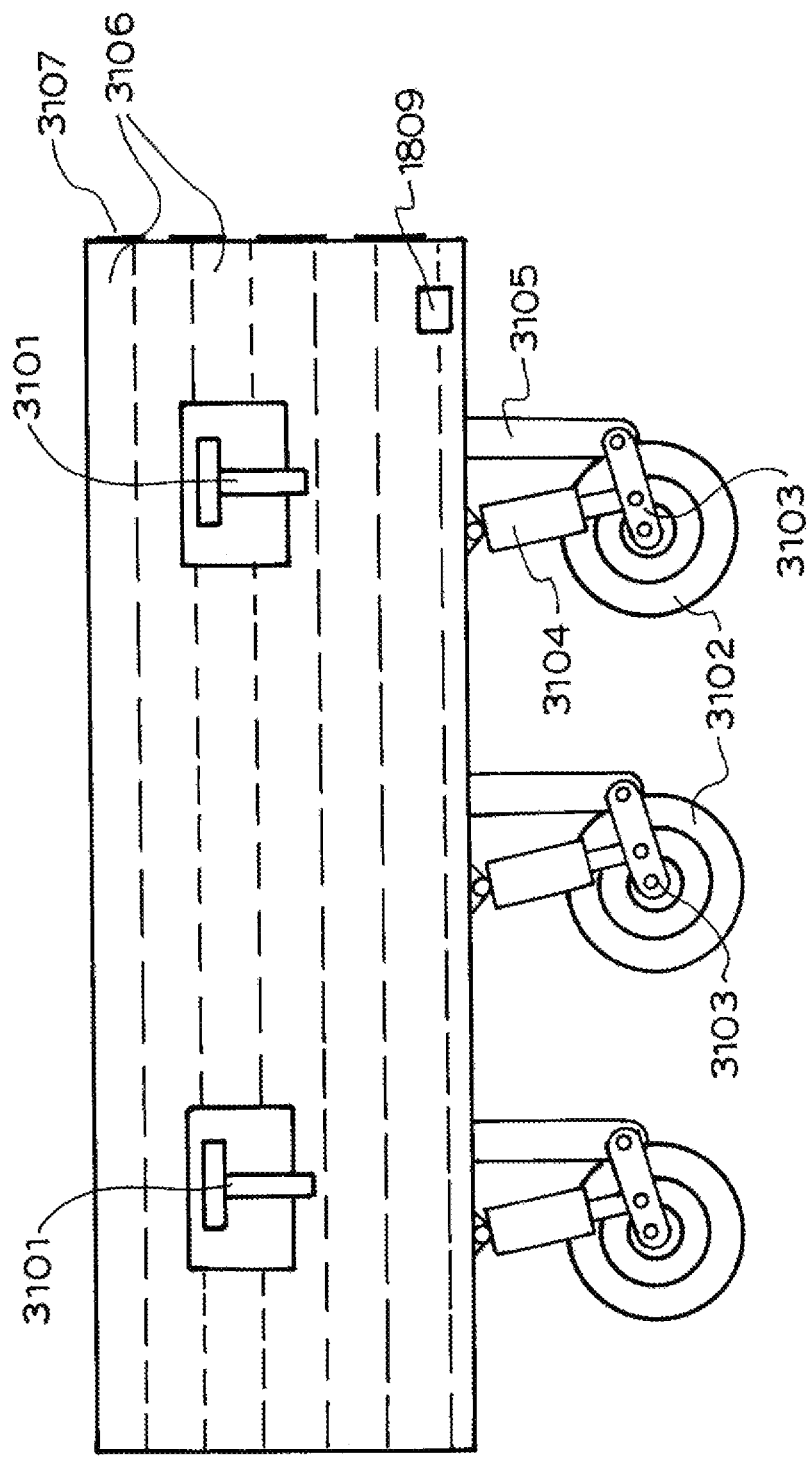

FIG. 31 shows an example of the side Triler with draw pins that are in line with the triler wheels according to a preferred embodiment of the present invention.

Figure 32:
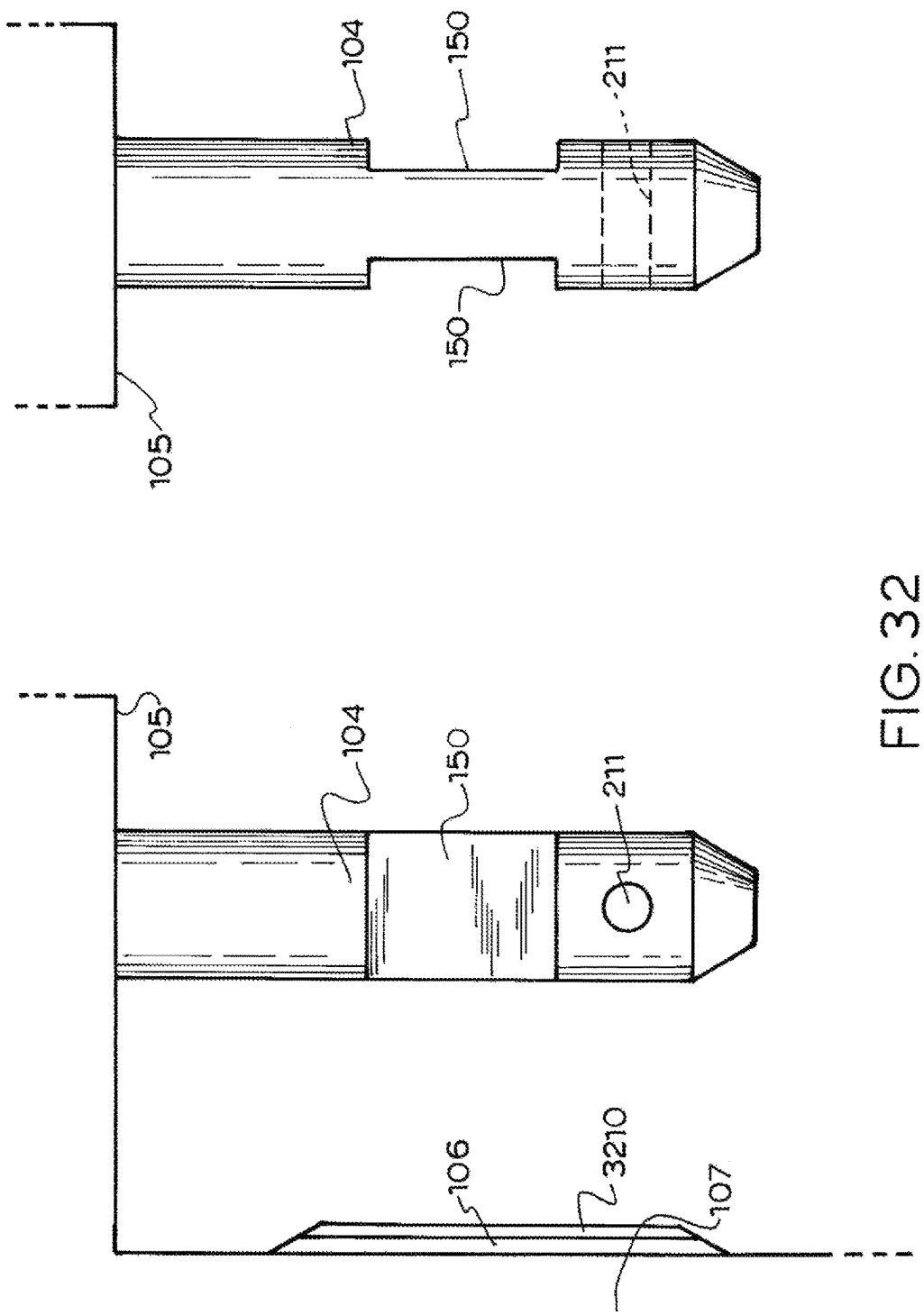

FIG. 32 shows a side view and front view of a triler draw pin according to a preferred embodiment of the present invention.

Figure 33:
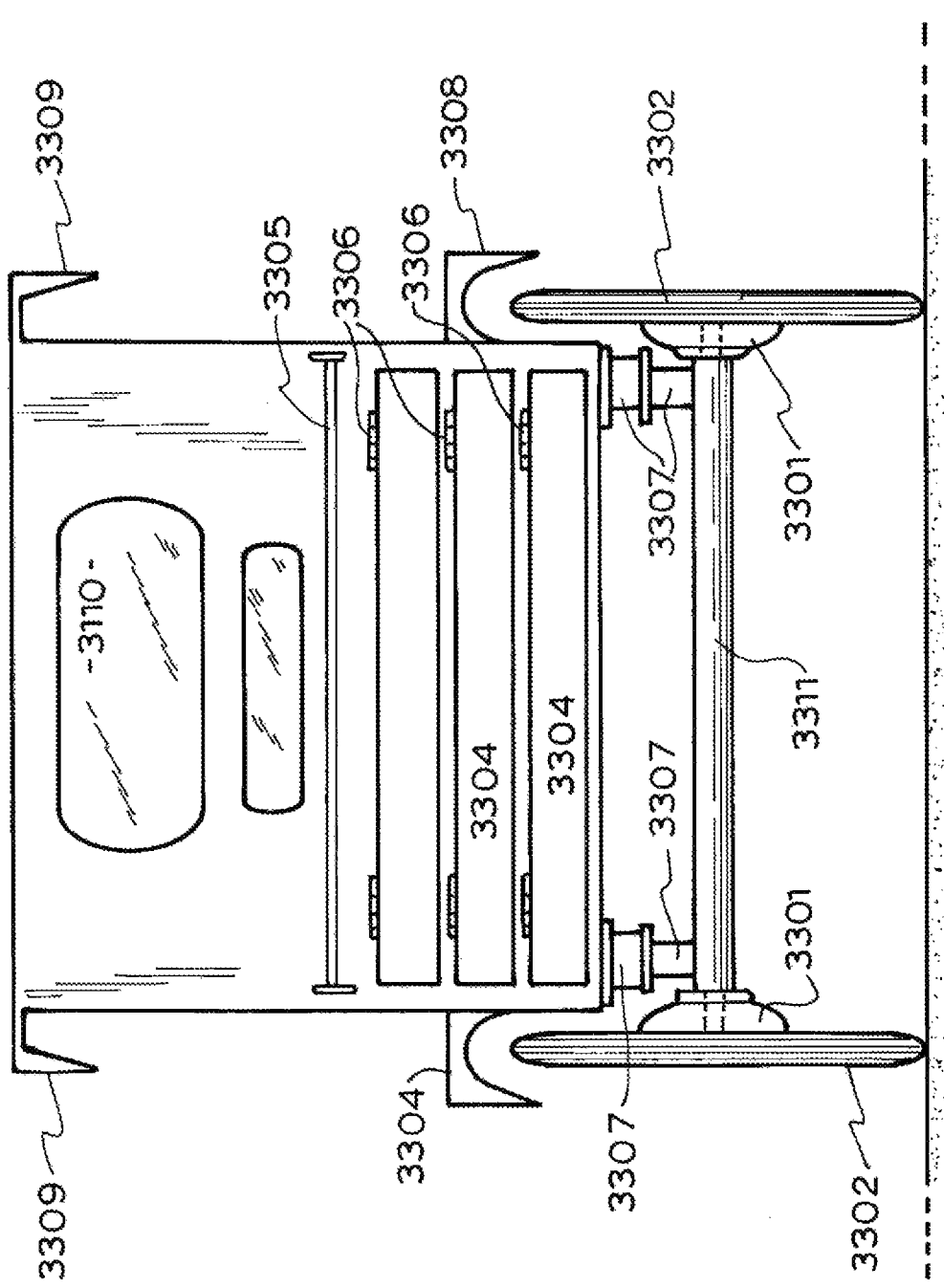

FIG. 33 shows a TMA/UTMA powered rickshaw according to a preferred embodiment of the present invention.

Figure 34:
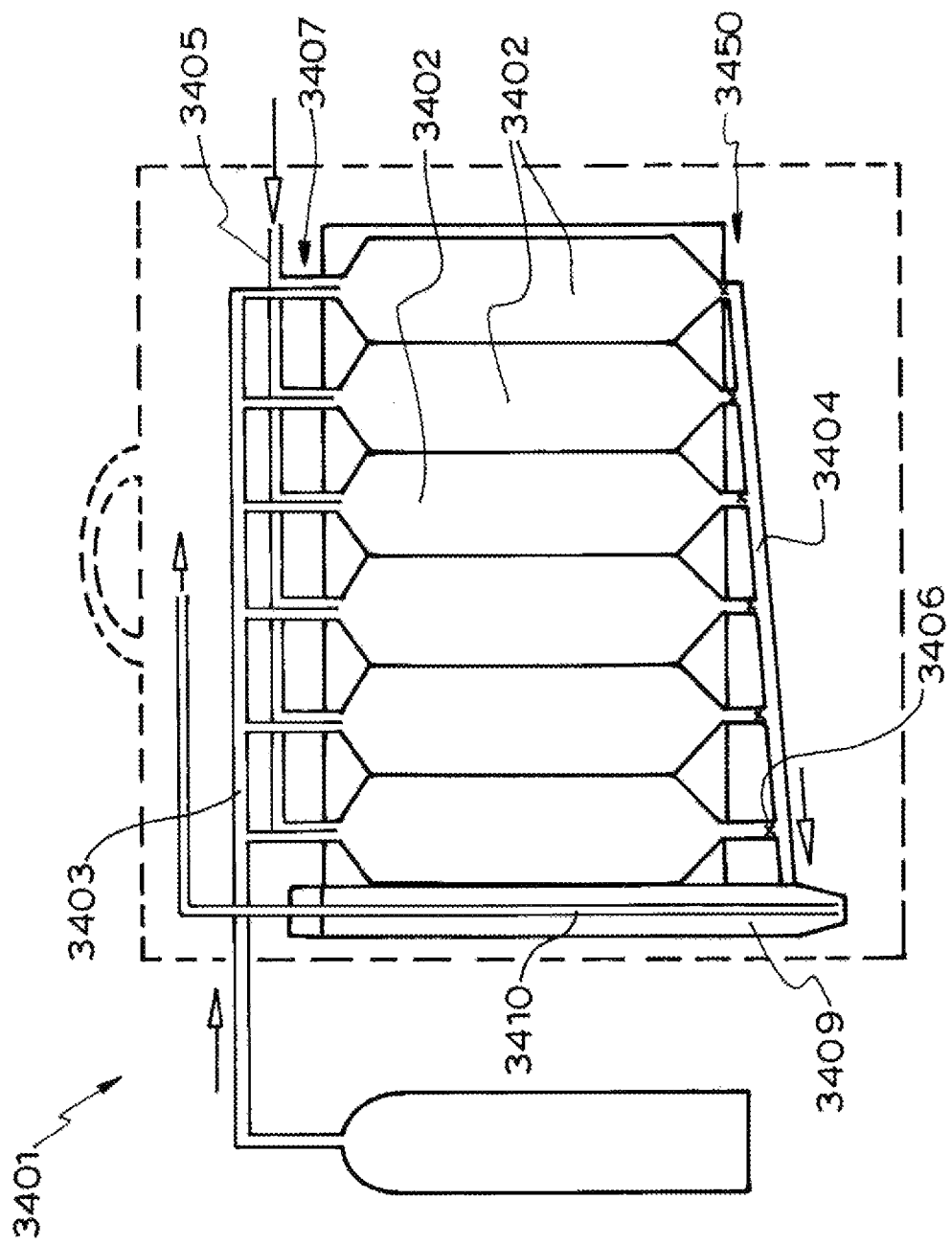

FIG. 34 shows carrier unit for an electrolyte transfer system according to a preferred embodiment of the present invention.

DETAILED DESCRIPTION OF THE INVENTION

According to a particularly preferred embodiment of the present invention, apparatus and system for providing a secondary power source for an electric vehicle are provided.

The apparatus for providing a secondary power source for an electric vehicle as illustrated in the Figures includes a wheeled platform attachable to the electric vehicle and having at least one secondary electrical power storage unit for storing electrical energy for delivery to the electric vehicle as required to replace the primary power source, a power connection assembly to connect to the electric vehicle and a control system to control supply to the electric vehicle.

For the sake of ease and simplicity, the wheeled platforms included in the present invention are referred to in this document as "trilers" or a "triler device" or a derivative.

One important feature of the triler devices of the preferred embodiments is that it they are a rectangular (or other) shaped battery platform which preferably attaches to the vehicle with two (2) pins (draw pins) that slot into compatible receptacle holes provided in or on the vehicle. When in use, a triler is supported at the pin end by the vehicle and at the other end by a plurality of wheels but preferably a single centralized wheel assembly that can rotate in any direction and that has the capability along with the two draw pin supports attached to the vehicle of supporting the entire weight of the triler. (On motorcycle trilers, the wheel is preferably fixed as steering is by tilting and reversing can be accomplished by pushing the motorcycle back). All electric vehicles, factory, farm and earthmoving machinery along with mining equipment, trucks and articulated vehicles can be designed with pin mounts to make them compatible with a standard triler for their type, make and model either as an OEM fitting or a retrofit configuration. Triler companies will work with bus, car/vehicle manufacturers to standardise triler products so the same model, type and size triler can be used with all makes and models of electric car/vehicle in that size and/or work configuration.

Thus vehicles of a particular type preferably have hitch points in the same designated spot on the front/rear/side of the vehicle along with cable connections and attachment places for electronic monitors. Systems will be designed so that a single person can change a Triler system singlehandedly. Systems will come in small medium, large and extra-large systems to suit vehicle types. There are also to be systems for commercial vehicles, vans, buses, single tray and rigid trucks and articulated vehicles.

(Please note following approximate measurements are for trilers for small to medium vehicles. Vehicles that are larger and trucks; 4×4's; mine and agricultural vehicles will have higher/larger specifications and will have trilers and components that are appropriately engineered for them).

The pins on car Trilers are preferably approximately 20-30 mm thick and slot into pin receptacles on either side of the rear of the car. Receptacle Pin Assemblies (RPA) made up of a Receptacle Cylinder (RC) and a Receptacle Cylinder holder (RCH) can be engineered into the front/rear of the vehicle/equipment or built as an aftermarket bolt-on system. The pins are locked into positions inside the pin receptacles. There are two (2) pin locking systems. In the first is a two pronged fork that slots from the car-side of the receptacle and goes through the pin support device onto either side of the pin in grooves milled out of the pin's surface. The fork aperture is preferably approximately 1-2 mm wider than the slot in the pin (but more narrow than the pin itself) so as to allow movement of the draw pin backwards and forwards (in the direction of travel) and the pin slot is 3-5 mm higher and lower than the forks to allow up and down movement of the pin in the pin hole. The pin receptacle unit (similar to towbar attachments) can be fitted aftermarket and existing car's electrical systems then modified for triler attachment/energy feed-in).

This fork can be electrically operated and slides into position automatically as soon as a new triler is connected to the vehicle. The fork prongs are 15-23 mm high (as viewed from the side) 4-7 mm thick and 50-70 mm long. The ends toward the triler have a 5-7 mm designated pin hole through them so that a steel locking pin can be inserted into the hole (this can be done with an electric device as soon as the fork has locked into position) this then locks the fork so that the draw pin cannot escape.

The strength of the system is in the fork. It will be engineered to withstand the stresses that will be applied through driving the vehicle and towing the triler. The fork slots into holes cut for it in the RCH and the RC. There will also be guides to ensure the fork slots smoothly into the holes on the vehicle side of the RCH.

In the initial rollout, aftermarket triler reception brackets similar to towbars for cars will be fitted to electric vehicles. On these a manual fork locking system will be available for locking the draw pin. The washer and pin still lock the draw pin at the bottom of RCH after the pin has gone through the draw pin hole (DPH) but the fork will be locked by the fork handle lever (FHL) being locked. The FHL is basically an L-shaped lever with a roller/wheel on the bottom corner so that it can roll along the base plate. The wheel/wheel axle runs inside a track top and bottom to keep it in position. The small end of the lever is attached to the bottom of the fork with a swivel/hinge so that as the lever come down the fork is forced into the fork slot in the RCH. The fork has a spring between the forks which impacts against the cylinder sides when the fork is locked into position. This spring helps the fork to release when the pressure is released. The lever when fully deployed pushes the fork into the RCH. It is locked by inserting a lock pin into the hole in the Lever Locking Bracket (LLB) that the pin fits into. The lock pin has a locking spring clip that goes over its end locking the pin into place.

The Draw pin goes through the pin hole (DPH) and locks into the Receptacle
Cylinder Assembly (RCA). This is comprised of the receptacle cylinder (RC)—a steel cylinder with inwardly flanged ends that is filled with rubberized material similar to that used in car engine mounts. The cylinder has a hollow steel pipe running through the centre of it that has 3+ mm thick walls. Slots are cut through the filler, cylinder and steel pipe to allow the fork to pass through and are designed to allow the fork to have a snug fit. The receptacle slots are greased as appropriate with rubber/steel lubricant.

The receptacle cylinder is designed as a single unit (pins and forks can be fitted after). It is designed with the pin hole pipe 'floating' in the rubber so that the pipe can move 3-5 mm when allowed with the rubber filler providing elasticity in either direction in response to outside forces on the triler pin. Thus the pipe is positioned and then the receptacle is filled with the rubber compound.

To manufacture the RC, the cylinder is first cut out of suitable pipe. The ends are flanged and slots cut into the sides to fit the fork. The pin hole aperture pipe (PHAP) is manufactured and slots are cut in the sides of it for the fork. The fork must pass through the filler in the RC so a plastic sleeve the size of the fork holes is manufactured. This then slots over the PHAP and is glued into place with a soft glue of similar consistency to the filler compound (of a rubber consistency similar to types used in engine mounts on cars) and which is chemically compatible with the filler compound and will not react to it.

The PHAP with the plastic slot sleeve attached is then inserted into the RC. The freedom of the fork slots still needs to be ensured as the filler is pumped in (and the Plastic sleeve maybe optional) so an overlarge fork (OF) the outside of which is the exact size of the fork aperture hole is slide into the RC, through the plastic sleeve and out the other side. This OF is greased with a slip/release compound so that after the filler is set the OF can be withdrawn and the slots remain, then filler is poured in. After setting the OF is withdrawn and any scraps of filler remaining in the wrong places are trimmed off.

Fork guide lugs are fitted on the outside of the RCH (for the fork guides from the car to lock into).

The receptacle cylinder (RC) is made so that it can easily be replaced in the event of wear and tear and has positions for bolts (bolt brackets) on either side at top and bottom to attach it to the receptacle cylinder holder (RCH) that is attached to the vehicle (with suitable bolts and brackets). The bolt bracket/arms of the RC poke out on the sides at top and bottom of the RC. The RC fits into receptacle holder RCH in a position that allows the bottom bolt arms to slide along slots inside the RCH walls designed to take the RC bolt brackets. The RC is then rotated, normally ⅓, ¼-⅛ of a turn so that the bolt brackets/arms correspond with the threaded bolt holes built into the top and bottom of the RCH. The receptacle cylinder is bolted into position with 2 bolts (and spring washers) top and bottom.

The top bolt brackets on receptacle cylinders are slightly below the top of the RC and bolt positions in the RCH at the top are recessed below the rim of RCH on a lip to allow the RC to fit in and be bolted into position in such a way that the top of the bolts is below the rim of the RCH and at the same time the top of the RC is flush with the top rim of the RCH. A plastic washer with areas cut out for the bolts, triler pin etc. is then fitted to the top of the combined RC/RCH Cylinder Assembly (RCA) to provide a friction bearing surface/spacer between the bottom of the triler pin bracket and the RCA.

A hole to allow the fork locking pin apparatus (this could include a plastic sleeve for the locking pin to operate in) to fit into the hole in the end of the fork after it has locked off the triler pin is also cut into the receptacle assembly (cylinder and RCH) and greased appropriately.

The secondary lock system is comprised of bolts/pins/studs i.e. bolts that go through holes in the DRAW pins. The holes are positioned so they are below the bottom of the receptacle assembly unit after the pins are in position. A steel washer is put on the draw pin and then the bolt is put through the hole in the draw pin locking it into position. A spring circular clip attached to the bolt head folds over the bottom of the pin to the other side and locks in position to stop the bolt from working loose.

The centralized wheel assembly can consist of a single wheel in smaller vehicle applications or two to three wheels for larger vehicles and trucks. The wheels are all attached to a single pivot that rotates under the triler so that force or movement in any direction can cause the wheels to align with the direction of motion. As the triler is fixed to the vehicle/truck with 2 draw pins the centralized wheel assembly (or dog wheel) has no effect on reversing (except for extending overall length of vehicle). It needs no expertise hence it can be used by almost anybody and requires no extra skills. (In trucks and all larger vehicles the wheel assembly can be remotely linked to the steering of the vehicle and computer or electrically steered/controlled by a program set to mimic the steering of the vehicle so having the triler attached has no effects on the vehicle performance when driving or reversing. Larger articulated vehicles (and road trains) can either use a front or rear mounted triler and a dog trailer (containing batteries) which attaches to the end of the last trailer in the series and TMA('s).

With all electric and articulated vehicles have a system in place for electric braking so that electric motors convert to generators as the vehicle is stopping to slow the vehicle and generate power. This surplus energy can be saved and used to power the vehicle for running/when it starts again. With a triler/trailer system supplying energy for locomotion it may be necessary to supply special braking batteries to electric powered trucks and vehicles so that surplus energy can be stored. So the vehicle (especially trains that may have cable power supplies) have its normal batteries for starting/stopping but these may be fully charged at the commencement of a trips so after the driver has started with energy supplied from the triler/trailer/cable if he then hits the brakes instead of the energy from the brakes being pumped back into the triler/trailer battery it is instead stored in the braking batteries.

Trilers can come in a variety of sizes so that for example a truck or articulated vehicle will have and use an much bigger device than a small family car and larger family cars like SUV's (sports/utility vehicles) and 4WD's (four wheel drives) have a bigger device than small cars. However, as trucks have no requirement to see at the back of the truck (and normally rely on mirrors) a video camera system attached to the device will be adequate for reversing. Trilers for family cars and SUV's etc. are all fitted with camera devices which feed directly into the existing reversing camera system on the vehicle or to a screen which can be attached to the windshield/dashboard if the vehicle has no reversing cameras. Trilers can also have collision detection sensors and systems on-board. These can be integrated into existing systems in vehicles or connected to visual and/or audio warning features added to a vehicle. They an also incorporate 'driverless vehicle' technology. The height of an SUV's means the triler can be larger and higher which enables it to carry more charge, luggage, batteries and other generating devices. All trilers have reversing and traffic indicator lights.

In vehicles which are for remote areas a small diesel, petrol or other fuel powered generating system (with an on-board fuel tank) can be built into a triler supply device so that even if there is no other power source available recharging can be accomplished for the subsidiary supply devices (SSDs) and the main inbuilt power supply for the vehicle. Solar panels can also be fitted on top of the device to enable charging when the vehicle is in sunlight. The vehicle and SSDs will have numerous batteries in their storage facility. Batteries can be partitioned so that recharging occurs for empty batteries with charge to drive/power the vehicle coming from the charged batteries. Solar panels can feed into a battery that is not currently in use charging it for when it is required. Each triler has a reserve battery that provides it a separate power source for its own autonomous navigation (e.g. parking and getting back to its dock site).

Remote area trilers can be programmed to feed directly into the vehicle's power supply. This would allow the triler to provide motive power to the vehicle and use its excess power generation to charge power storage systems such as batteries or supercapacitors. For example, if a vehicle is using 10 KW per hour and the triler is producing 11 KW it could feed 10 KW into the vehicle/engine systems and the rest into storage. This allows the vehicle to run continuously as long as there was sufficient fuel to power the generator.

SSD, Battery and triler resupply systems can be established in a service station network positioned at 1-3 hour intervals throughout a country so that any person travelling anywhere in the country where such service stations are located can continue to drive indefinitely. They simply change subsidiary supply devices as each one runs out of charge. The supply devices is hired to the traveler for the trip and is left at each service station as it runs out of charge and replaced with a fully charged one.

The fact that the supply devices are charged at a service station site opens up all sorts of possibilities to the company supplying them. Supply devices can be recharged by:

Using solar panels attached to roofs and covered areas of the service station;

Special solar farms built alongside service station; (especially valuable in country locations with supplies of cheap land alongside) or buying power off homeowners with solar panels.

Using off-peak power from coal fired generators that cannot be shut down at night and hence have to be kept running thus enabling service stations to charge supply devices at very low cost;

Construction and Accident Prevention

The floor of the triler is constructed of 2-5 pipe frames. The frame is made of a front and rear pipe segments. The front segment can slip inside the rear segments in the event of a rear end collision. The purpose of this is to lift the battery compartments up away from the crushing effects of impact. There is a plastic cover on top of the triler. It clips to the sides with clips that release in an impact.

There are two battery compartments—front and rear. They are hinged to each in the middle and with sprung sliding hinges to the triler frame at the ends. They are supported underneath and at the sides with rubberized supports and sit on the floor of the battery compartment but are unattached from the floor and sides. This floor is made of metal. The front floor overlaps and sits on top of the rear floor plate. In the event of a collision the rear floor slips under the front floor plate and two shock absorbers underneath the floor (one either side of the central wheel assembly slow impact).

There can be an (optional) space between the rear of the front floor and the front of the rear floor. The rear pipe segment contains straw/sawdust in its rear end as wadding.

The length that a front pipe segments can go inside the rear one before hitting sawdust corresponds with the length of pipe travel before Peak Fold Angle (PFA). In the event of a collision the front pipe segments concertinas inside the rear one while at the same time the battery compartments hinge upwards against the leaf springs they have on top of them. Battery electrical connections are from the top of the battery compartments and have sufficient slack in them to cancel out the effects of the battery compartments rising and falling.

The battery compartment hinges at the ends are sprung sliding hinges. They are each secured firmly to the top of the battery compartment but they are on the other side of the hinge set up as a sliding sprung hinge. The hinge frame arm is mounted in a slot so it can slide up and down in the slot. At the bottom of the hinge frame is a series of eye holes which are attached to springs which are in turn attached to the bottom of the slide compartment. In event of an accident compression on the rear of the compartment causes the battery compartment to want to rise to escape the compression but its near corner will prevent it. If the hinges were fixed they could not so in the first few milliseconds the hinge frames move upwards in their slots and the corners which have slide skids on them and are rounded to allow the compartments to slide along the floors of the triler can then do so. Leaf springs only start to experience the effects of impact after the compartments have risen 3-5 cm.

The two compartments then reach the Peak Fold Angle (PFA) point which is the point where the two internally hinged sides of the compartments touch. If they fold any further after it, it causes damage. However because the sides of the compartment facing compression are angled in respect to the compression and the spring hinges are sprung, if the compression continues springs allow the hinges to release and rise up out of their slots. The system is ruined but the batteries should be safe. The front leaf spring bolts are also designed so that the boltheads will break off if the impact passes PFA.

The Breaker Spacer

The Triler Breaker Spaces (BSP) is designed reduce the damage to a vehicle in the event there is an accident. Triler as they are pulled on the front/rear of the vehicle can be subjected to impacts where the car itself is not impacted. The Breaker Spacer sits between the triler draw pins and the up-down hinge system. The BSP is comprised of two (2) heavy metal plates that correspond and mirror each other. The front plate will have triangular shaped cones, knobs and cross-hatched ridges and lines facing rearwards. The rear one will have indentations that exactly mirror the protuberances on the front one. (It would be imagined that once they are in production a factory would be pumping them out in quantity and using a set of moulds to make them). The two plates when put together snuggly fit with half a millimeter tolerance. This then means they can be glued together with an epoxy resin/glue and form a single unit (the important feature of the epoxy resin/glue is that it has strength to hold them together in usual/normal conditions but in the event of an accident will separate).

The plate(s), now a single unit, have 2×12 mm holes in them through each of which passes a large bolt. This bolt has a large washer on the car side then goes through a strong spring on the triler side of the plates which has a plate, washer, a spring washer and lock nut. The nut is tensioned so as to tension the spring to hold the plates firmly together. (There can be three spring units for heavy duty trilers (if required) the impact of accidents causes the plates to separate. They are now 2 plates (and thinner than and half as thick as one joined plate) simply held together by the springs and bolts. This means they are susceptible to movement and able to move with the springs absorbing intermediary levels of impact and the plates sustaining higher level impacts from the accident. BSP's therefore act as circuit breakers for accidents quarantining a vehicle from particular triler accidents.

The Breaker Spacer Unit fits between the up-down hinge and the Triler draw pin brackets. There are metal 'rest' pads on the front of it in the areas where the draw pins are. These rest on the outside of the car RCA bracket and ensure that any force that is applied to the triler transfers directly to the up-down spring, the breaker spacer and the RCA brackets and not to the draw pin brackets or the pins.

The rest pads have a soft steel/metal cover sheet (glued or held with counter sunk screws) to their front side facing the vehicle that can wear over time and is hence replaceable as required.

(In the event of an accident that damages a triler the driver hits the un-bump button on the top/side of the triler. This will automatically disconnect all the main power sources of the battery and start the flashing light on top of it to operate with a conventional battery. If it has a GPS it will also send a signal to the hire operator. It is disconnected from the car and left to be retrieved by the operator.)

The monitors will advise the driver if the accident was minor from a triler perspective. If the accident is minor the springs will pull the plates together and the driver can take the triler to a service station to change it over. If the accident is major or the control panel is damaged or there is little response from it the driver abandons the triler and uses resident power to get to the next service station/triler park.

Triler Central Wheel Assembly

The central Wheel Assembly (CWA) is attached mounted on the rear pipe assembly part of the chassis behind the triler's Centre of Gravity (COG). The CWA comes in powered and unpowered varieties. In the initial triler rollout when bracket kits are likely to be sold as an aftermarket item to those who have already purchased electric vehicles triler CWA's will be freewheeling and move with the car. The bracket kits will be very similar to towbar kits except they will have two pin aperture cylinder assemblies which are in the appropriate position for that size triler. They will bolt on in the same way as a towbar (and in fact could have a place for a towbar tongue to bolt on in the middle for use when the triler is not attached). If they are dual use they would have wiring harnesses for both trilers and normal towbars. When the triler is in use unless it has provision for a bar to pass underneath for a towbar to be attached at the rear—the triler would use the whole towbar facility.

For this initial car market segment most trilers will be in the 15-27 KWH range which allows 150-300 km travel. In this segment of the market trilers will most probably be freewheeling with no vehicle instigated steering as vehicles have not been programmed for it. Hence the CWA when on trilers for these vehicle will be free to rotate in unison with the vehicle.

The central wheel assembly on the triler normally has two (2) wheels with a frame and support system. The wheels can be replaced in the event of a flat with a spare one positioned under the triler. The studs are standard size for all trilers in a type and can be removed with an electrically operate gun/wheel brace that manufacturers of triler enabled cars provide to their owners (so it is in the standard tool kit). The electric operated gun can plug into a point on the triler. Each wheel has a hub motor to provide forward/reverse drive to it and the wheel assembly has an electric steering system so it can be steered either by controls from the vehicle or the computer system on board the triler. So the wheel can be powered and steered if required or freewheel behind the vehicle. Trilers will have slots for 5-6× standardized car UTMA's (Un-wheeled TMA or battery package) with half of the power in 1 UTMA reserved for triler usage.

The bracket for the wheel mounts on a central pivot which can swivel in any direction (in power steered models the swiveling is limited to the confines of the steering motors). The computer however controls the swiveling to be in unison with the vehicle for vehicles which incorporate power steering and/or electric or controlled steering. The bracket attaches at the top to the central pivot. A system with 2 arms comes off at the bottom of the bracket towards the rear. It is hinged and can move up and down in respect to the bracket. The wheel axle system is positioned at the end of this arm. The wheel axle system is also independently attached to the central pivot with a Macpherson strut system so it has a spring and shock absorber to minimize impacts with the road.

Front and Rear Positioning

It is possible to position the triler at either end of the transport vehicle. In this terminology the term vehicle is used to describe a multitude of vehicles including trucks; cars, buses; tractors; combine and other harvesting machines; vans; earth moving machines; dump trucks; mining equipment; end loaders; trains and virtually everything that needs power and is moveable. Fixed items like/including pumps can also use them where the battery device can be delivered in 'trains' to the site where the power is required ('trains' is an arrangement so that 1 or more triler systems are linked to each other with a linking unit (that has a second set of wheels and a set of pin holes so the next triler can be attached behind it) so a train of trilers can be towed (it could be by TDS (TMA Delivery System)) to a place where needed.

(The TDS is a system for delivering SSD's or battery packages to vehicles. It is a robotic mobile system that picks up battery packages from the warehouse in the service station or the charging station unit for mining and agricultural applications and delivers them to the vehicle. It has a carriage platform that can raise or lower and adjust in height and position so as to insert the SSD's or battery packages into appropriate 'slots' or carrier positions in a triler or vehicle. It incorporates driverless technologies like trilers and so navigates itself from the charging station or warehouse to the vehicle and back using the systems listed for trilers along with driverless car and vehicle technologies and GPS for remote locations and in large sites and wi-fi triangulated and other positioning systems. It carries the SSD's to the equipment or vehicle; removes used SSD's or battery packages from the carry slots on the equipment inserts new charged ones into the appropriate slots. It then takes the discharged battery packages back to the warehouse or charging point and inserts them into receptacles on the charging system or the warehouse for recharging. The warehouse has a fully automated process using automated warehousing systems and processes for taking used SSD's; moving them internally using lifts, robots and automated warehousing systems and inserting them into and retrieving them from charging slots along with systems to monitor gas emissions, recharging rates, current flows and usage and insertion and removal requirements).

The concept of attaching to the front or the rear of a vehicle means that in the powered versions (so the triler wheel has electrically powered steering and/or electric motors in the wheel unit so power supplied to a motor in/on the wheel unit can augment the power of the vehicles motors, the programming for vehicle and triler computer systems (that both have on board) are different in each mode as drive parameters and characteristics for a front mounted triler are different to those of a rear mounted one. One way of ensuring the correct programming is used for each mode is to have redundancy in the electrical plug that connects the triler to the vehicle. So if the plug has 7 pins pin 5 is used for power if the triler s mounted at the rear and pin 7 is used if it is front mounted. Thus the computer automatically knows which program to use. Alternatively different draw pin widths could be used front/rear mounted trilers. So front mounted trilers have a set width for the pin separation of say 1 meter and rear mounted trilers for the same size of vehicle have 90 cm between the pins.

Trilers will be brought out in a number of sizes. So for example in cars there will be small, medium and large models to suit most vehicle types. Two sizes for 4 wheel drive and off road vehicles; plus van units for delivery vans. The van unit trilers will probably be front mounted but could include a rear mounted one complete with cargo loading area. The front mounted triler has the bonus for vans of providing extra protection for the driver as the impact absorbing characteristics of the triler provide an extra layer of protection between them and the other vehicle or object. Vans could also be able to take one at the front and one at the rear for deliveries outside normal locations.

Trilers for vans have cutaways as required to allow headlights and van number plates to be visible (or alternatively a camera photos/videos the plate and projects the number on an electronic screen or display on the triler). Van design will be such that it allows for front or rear triler use. Charging triler, UTMA and train batteries on off peak rates is particularly advantageous for industry.

Agricultural Trilers

The agricultural machinery requires 250-300+ KWH trilers. The reason for this is that a 200-350 KW tractor while ploughing may use around 120-300 KW continuously per hour. Thus a user will need a supply of charged trilers or SSDs at hand and also charging facilities.

The 300 KWH triler will have considerable weight and should require 3-5 wheels to support this weight.

Agricultural and commercial trilers (CT) can be both front and rear mounted. The wheels away from the draw pins for ease will be described as the 'front wheels' even though they may be rear wheels when a triler is behind the tractor. If there are two front wheels they could be mounted together on a single hub (so they have their own axles but the point where they attach to the triler is on a single mount which is electrically steered (rotated) so that it can be directed in the same direction as the vehicle steering. (Alternatively if on separate hubs would work in sync together with the vehicle system). The 'rear' wheels whether on single, double or triple hubs will similarly freewheel or be electrically steered so that the triler has no impact on the steering performance of the vehicle.

The wheels will be positioned in pattern so that a 5 wheel triler will have 2-3 wheels in the normal position on single axle assembly with steering capability and perhaps other two or three single axle wheel assemblies in positions to carry the extra weight again if required with steering capabilities.

Wheels on agricultural and mining trilers will have off road wheels, as well as shock absorbers and springs suitable for such work and have larger and low pressure tyres.

Agricultural and Mining Trilers (Cont)—Side Trilers

Side trilers are for earthmoving, agricultural and mining equipment where width is not a problem but front and back access may be. The concept of the side triler is simple. The triler bolts/slots on to a bracket on the side of the vehicle. It attaches in the same way as normal trilers with two draw pins but in this case the pins are further apart and the wheels on the triler face in the direction of travel (in parallel to the pins). It still has an Up-Down (three way) hinge between the pin section and the full triler. The may be a breaker spacer if needed and there could be two to three wheels if the weight requires it. The wheels would have shock absorbers and sprung suspension but would basically free wheel under the power of the main tractor/machine/vehicle engine. If the vehicle has tracks it would still be able to have this as a power source. The trilers would be removable if the vehicle doesn't need the extra power supply and the trilers can have their compartments filled with TMA's that can be swapped by TDS's (TMA delivery systems) at intervals. One could be fitted to each side of a machine, including mining trucks and earthmoving machines.

Under Truck Systems (TMA's and/or UTMA's)

In addition to trilers, vehicles and commercial vehicles such as trucks, buses and articulated vehicles are able to be equipped with under truck or under vehicle systems. These systems can be used in the same a manner as trilers but fit into positions built into the truck or vehicle (including vans and cars) so they are carried on board the vehicle in some instances in special compartments where a door can close to protect them from the elements. They would be developed in wheeled and un-wheeled versions.

Generally speaking they will be rectangular shaped boxes 1-2.5 meters long. They will be individually designed for the different vehicle types from cars and motorcycles to trucks, mining and agricultural and earthmoving vehicles and equipment. They can be charged in homes, offices, shops motels and commercial premises with special ERVE (Electric Vehicle Recharging Equipment) square plugs and in triler parks and swapped with ease. Like trilers the wheeled versions can move under their own power inside triler parks using electric hub motors inside the wheel assembly to provide locomotion with power coming from the batteries.

Un-wheeled TMA's would be moved between the vehicle fitting area to the charging facility and then plugged in by TMA Transport Devices (or TDS's). They would contain all the systems they need internally including wiring, monitoring and communication systems and a chip so all they require is to be plugged into a suitable slot in the UTMA carrier. Each UTMA is a self-contained swappable battery unit.

The Truck Mounted Apparatus (TMA and the same term will be applied to all such systems including those for cars and other vehicles) can come in a variety of sizes. Some will be organised to fit in the space between the chassis of the vehicle and the sides so they will be 1-2.3 meters long and 500-700 mm wide so they can fit in the space allowed. Others will fit sideways under a truck (or car) so they may be almost the width of the vehicles; 1-1.3 meters wide and 400-600 mm in height to allow ground and obstacle clearance under the truck.

TMA's can be built for cars. In cars they are of smaller height and their dimensions are such that one or two and up to three can fit underneath a car between the front and rear wheel axles and another behind the rear wheels and can also fit in the space previously occupied by or under the engine bay.

The rest of this section will be on under or bottom fitting TMA's (these TMA's have wheels); at each corner bottom fitting TMA's will have a hole positioned 50-100 mm from the sides and end for the securing pin; this hole will go all the way through the TMA. The top of the hole has a funnel shaped aperture. This aperture allows the pin to easily slide into the hole and the TMA to dock easily with the vehicle. The TMA guidance system positions it under the vehicle preferably using a laser guidance system or infrared light systems coloured lights with mirrors on the vehicle underside and sensors on the TMA top. An approach arm which extends down from the bottom of the vehicle could also guide it to locate the proper docking position. Van trilers because most of the weight is upright could have an extra wheel (s) which extend under the vehicle along with a system to extend the main wheel out forwards when the triler is disconnected from the vehicle and thus provide balance for it when it is moving around.

The approach arm has flanged arms to allow the TMA to easily fit in and rises and falls with the TMA into the vehicle. The jack arms/stalks (which have small rollers/wheels on their feet to allow them to move small amounts on the ground to accommodate the movement necessary for the TMA while it is fitting onto the securing pins) fold to the ground and then begin to extend from the bottom of the TMA on stands/stalks lifting the TMA up under the truck. There will be 4-6 (and up to 14) steel securing rods extending down from the bed of the truck. The rods will have a rounded point on their lower end to allow insertion into the funnel shaped aperture holes which run right through the TMA.

Electric motors power the jack stalks (which are round or rectangular steel with worm drives in the side or round steel screw types like the old screw type worm drive jack) to lift the TMA into position under the vehicle. The TMA is mounted onto a thick rubberized pad between the TMA and the underside of the vehicle which is 20-30 mm thick under compression. Its purpose is to reduce shocks to the electric batteries inside the TMA when the vehicle is in motion.

Once in position locking bars slide into holes at each corner (20-100 mm from the end/sides) of the TMA and locking pins inside the TMA slide in from the area beside the locking bars and the pins slide through holes in the locking bars effectively locking the TMA in position. (The locking pin mechanism is inside the TMA). The locking bar is shaped so the top of the end towards the TMA is lower/closer to the ground and then from a third of the distance in it reaches full height. In this manner it exerts upwards pressure on the TMA as it slides it position. Two types of clamping or locking system can be used to hold the TMA in place—a roll clamp or sliding bar. Each have the clamping or sliding system mounted on rubber shock absorbing mounts so as to minimise shocks and vibrations. The roll clamp system has clamps that roll over and secure/clamp into holes in the TMA or bars protruding from it. Once the clamp is in place an electrically operated pin slides into a hole in the arm of clamping mechanism locking it in place. The TMA has electronic monitors on all clamps and locking pins so that if one is loose a light flashes red in the cab or side panel of the TMA.

The receptacle holes that the positioning bars slide into have plastic friction reducing sleeves (bearings) on the inside to minimize metal to metal contact and to assist the pins in sliding into position with minimal friction.

The operator then places a washer on and locking pin through the 4 corner positioning pins (through a hole in the bottom of the pin) and then activates the electric motors on the stalks to lift them and the wheels/apparatus up into locking position on the underneath of the TMA. The entire apparatus is removed in the reverse manner. The TMA can then drive itself using the guidance system designed for trilers to a docking position in the Triler Park. TMA's have a detection system the same as trilers to allow it to monitor positions of guide posts in the triler park that is extended electrically on a stalk above it when it is on the ground for ensuring it can find its way safely to its docking position. It also has a steering/drive wheel which has a hub motor and is controlled by the computer guidance system to control and drive it around the park. Triler parks could also have underground tunnels systems to allow safe movement of TMAs from staging areas to service, charging and storage zones.

TMA's (TDS's also) always enter and leave vehicles and the staging areas by the same routes. So they have one way in and another way out. They always approach a vehicle from a standard direction and vehicles always park in spots designated for TMA attachment where they are parked within specified lines and parameters. The TMA has an on-board computerised parking and location system. They also use traffic management and collision avoidance systems. The system locates the guide arm on the vehicle and then backs the TMA into position against the guide arm. A switch on the arm then notifies both the TMA's and the truck's computers that the TMA is in position and the attachment and jack systems then activate bringing the TMA into position under the vehicle. The driver then manually plugs the electric cabling into its plug (or this can be one automatically); monitors the control panel to ensure all the lights are green and slots the locking pins in to the securing pins.

Detaching from the vehicle is the reverse of attaching to the vehicle except in this case the TMA leaves the Staging Area by another route. The entire process is computer controlled except potentially for the plugs and the locking pins. The park computer wirelessly identifies the truck make, vehicle type, registration nos; number and types of TMA requiring replacement; amount of charge still present in them; billing amount required; and who to bill. It sends the TMA to the vehicle and controls a boom which comes down in front of the truck as it enters staging area and is raised when the last TMA has moved away safely and sends the TMA away to a site for recharging. Service station operations may initially have one operator outside to advise and assist customers with TMA's and the rest merely to take funds off customers and sell them drinks and food etc. Most trucks have to stop at least every 3 hours.

Each TMA has its own monitoring system with a control panel on the side where it is visible to the operator with 4 lights one corresponding to each of the clamps holding the TMA in position. If the light is green it shows the clamp locked if it is red there is a problem. The computer monitoring system:
1. Controls the raising and lowering of the jack arms and steering and guidance system;
2. Ensures the electrical connection to the vehicle is properly engaged;
3. Communicates with the vehicle's on-board control system to advise its charge level; ID Nos; updates if the status changes during travel.

[Non-wheeled TMA's (UTMA's) carried by TDS's are effectively transportable battery packages, the monitoring and control systems apart from #3 above are mainly built into the vehicle using them.] Monitoring has various sections including monitoring the recharging of batteries in vehicles and the warehouse to ensure maximum battery life and optimal recharging; monitor levels of gas emissions in service stations, charge stations, trilers, cars, trucks and other equipment to monitor gas levels and emissions by batteries and control and activate ventilation systems in equipment, vehicles and recharge stations to maintain emissions at safe levels and within authorized tolerances.

Suspension for TMA's

Unwheeled TMA's will be transported around triler parks by TDS's which will do all the transporting and navigating from one site to another. Hence the TDS requires a fairly long lasting and heavy duty suspension system with struts, shock absorbers and springs. Wheeled TMA's spend a lot of their time sitting at charging docks or under vehicles. The times they are moving in triler parks is on smooth surfaces and for short periods. Therefore a light mass produced suspension system should suit them. A standardized system for TMA's with wheels that has 2 light leaf springs and a central shock absorber which bolts under the central steering hub of the CWA could be mass produced at low cost. This would be made as a complete unit that can be removed and replaced quickly and easily. Rear castors for wheeled TMA unit s would have springs built in to them to allow small shocks (it may be needed to fit shock absorbers to them for large TMA's).

Locking Pins

TMA's use locking pins to ensure the TMA is secured underneath the vehicle. Trilers use them to ensure the draw pin is secured in position. Locking pins can be made using standardized designs so in Type 1, the pin and a metal spring clip that goes with it are built as a complete unit. The spring clip is circular and folds over the end of the pin and is spring-loaded to keep it in the up or down position. Alternatively in Type 2, the pin and required washer are linked together and attach simultaneously. Draw pins on trilers and securing pins on TMA's are made with a key slot that faces the rear in the area the washer goes over. This corresponds to a key protrusion inside the washer. This ensures that the washer can only fit in one direction. The pin is attached to the washer by an elasticized/rubber band that has a swivel on the side where it attaches to the washer and another opposite it where it attaches the pin/bolt head. So it swivels on the washer end and the pin head.

The washer attaches or fits over the draw/securing (draw/sec) pin so that the swivel faces the rear. This means that the pin enters and can only enter the hole from the front of the vehicle. (This is to ensure that if it is hit from the front it won't be dislodged.) The locking pin has a bolt like end where it is attached to the swivel. At the other end where it goes into the hole the pin shaft for the last 3-7 mm could reduce in diameter to almost ½ to ¼ of what it was at the bolthead end. The purpose of this is to ensure the locking pin can only be put into the hole from one direction (the front) as the draw/sec pin hole is wider at the front than the rear. (Alternatively the pin hole and shaft diameter could be of uniform width). The operator then places the washer on the draw/securing pin; pulls the locking pin to extend the elastic band towards the vehicle front and inserts the locking pin into the front of the draw/secure pin hole. The elastic band then shrinks pulling the locking pin into position.

TMA's Electrical Connections

TMA's will be suitably configured to suit most vehicle types. This includes small cars and vans and specialty use vehicles such as window glass carriers. Because some of these have very low clearance at the side they will need to be fitted with lifting arms or jacks so the body part of the vehicle can be lifted so that the TMA can slide underneath. These jacks are engineered into the vehicle at the time of manufacture so the driver pulls into a service centre, positions the vehicle in the appropriate site; hits the lift button and the vehicle raises itself using a hydraulic suspension system or will have jacks/lift arms descend from the vehicle body to lift it. Alternatively the vehicle could position itself over a lift device at the service centre that will raise the vehicle.

The TMA can then slide underneath, position itself and raise itself into the correct position.

The TMA's because they are underneath the vehicle and hard to access will either plug themselves into the vehicle or advise the vehicle computer to plug them into the vehicle. The plugin system in Diagram 7 is one for plugging the vehicle into the TMA. A similar system could be used for plugging the TMA into the vehicle. In either a number of key features apply:

1. The plug goes into a point which has a cover over it and a seals around the outside to prevent dirt and moisture entering and the cover has a similar sealing system;
2. The cover has holes in it with valves to allow any water that gets in it to drain;
3. A lift pin on the plug assembly automatically lifts the cover so the plug can plug in;
4. The plug has a worm driver or similar system to move it into the plug receptacle;
5. A cover shield protects the cover when the plug is in place/inserted.

The electrical plug system will also have a positive air pressure mechanism which enables the cavity around the electric system inside the plug to be filled with air at a pressure of 1-2 psi more than the atmosphere at that area. A pump fills a chamber under the port which connects with an air tube(s) to the electric cable port with air at pressure. The chamber also has a pressure measuring device attached to it so if air leaks out a warning is sounded. This enables the driver to know if the system is connected and sealed correctly. The chamber will automatically empty water it gets into it through the valves at intervals. (UTMA's use other systems as they slot/fit into sealed compartments)

All TMA's must be water proof and capable of submersion as trucks and cars need to go through water. This means the electrical connections must be able to withstand submersion. Having the cavity and empty space inside the connection charged with positive air pressure means that even if the water is at some depth/pressure the electrical connection can stay dry inside. Batteries in all TMA's and trilers are programmed with a safety device which automatically disconnects the internal electrical components in the event of an accident.

TMA's can come out in a variety of styles and sizes Heavy rigid trucks may have 3 sizes 1.3-1.5 m long; 1.7-1.9 m long and 1.9-2-3 meters long. Smaller trucks and vans have a range of 1 to 2 meter TMA's as well as the others. TMA's (and non-wheeled TMA's) can be fitted in front, behind or between the main or steering wheels of a vehicle in convenient, easily accessible locations; and come in a variety of standards sizes and heights. Mounting positions can be found on both sides of the vehicle.

TMA's can also be produced for vans to mount between the front and rear wheels and for cars in a similar position. Car and van TMA's would obviously be lower in height than truck mounted TMA's. Articulated trailers could similarly be fitted with TMA mounting positions. Prime movers could also have mounting positions (especially useful when travelling back to base or empty).

Other Uses

Agricultural machinery and industrial sites like wharves require a specialized TMA system for their cranes and systems for transporting containers. Some of these applications require specialized TMAs and packs and required systems to lift them up and into their required place in the machinery. Tractors should have side places where TMA's can be located and a hydraulic arm to lift the TMA up from the charge station or delivery system and assist in positioning them on the tractor. Container carrying systems for wharves would have a place where the TMAs can fit in the side arms (legs) with one either side. Each would be able to power the system as electric cabling would connect each side to the equipment. (Tractor and earthmoving TMA's are mostly without wheels—Unwheeled TMA's (UTMA's) and are TDS delivered). Agricultural, mining and earthmoving equipment can also use side Trilers. These are triler which have two pins the same as normal trilers but instead of going at the front or rear are on the side. So the draw pins line up in machine's forward/reverse direction of travel. Side Trilers are particularly advantageous for large equipment that may need use and access to both their front and rear ends (such as bulldozers). The other advantage of side trilers is they make excellent carrier systems for UTMA's and being at the side are easy for the TDS to access and swap UTMA's on. The wheels on side trilers are fixed in position (and do not need steering). It can have 2-3 wheels in a single line in the direction of travel with spring and shock absorber suspension.

Agricultural applications will require specialised TMA delivery systems (TDS). It is common for farmers to operate in large fields in Australia with few power connections. The power supplies may be 1-2 km or more from where the farmer is working. Thus there will be need for a specialized system to deliver TMA's to the farmer at the work location and replace empty TMA/UTMA's. This location may also change as the day progresses with the farmer at the start of the field in the morning and 3 km away by afternoon. Thus the delivery system must be able to pick up the TMA's and any trilers from the charging station (and the charging station could be mounted on a trailer so the farmer can drive it from one field to another) and take them to the farmer wherever they are and then after the TMA swap is completed return the empty TMA's and dock them into the charging station for recharge.

Delivery systems would have 4-9 wheels and be self propelled so they can move under their own power and have charging systems which can plug them into the charging station when they are idle. They would also be fitted with GPS and homing systems so they can be preprogrammed with co-ordinates to rendezvous with the farmers/tractors at predetermined times and locations, or travel to the farmer/tractor when a homing signal is received. Pathway programming will also be incorporated into their systems and integrate with their memory systems so a mine operator or farmer can drive over the desired route for the delivery system to take; the system would memorize the route (using GPS and other navigational systems such as but not exclusive to GPS and inertial guidance systems) this memory information could then be transferred either wirelessly or with a memory device such as a USB stick to the memory of the delivery systems which could then drive on the designate pathway to the rendezvous point. Most of the time the triler/TMA delivery system is at the charging station and only leaves it to rendezvous with the farmer at a set time and location for an exchange. The exchange is completed the TMA is either slid into position on the tractor by the TDS or an arm picks it up and positions it. The used TMA is picked up/returned to an empty (spare) slot on the TDS, (Hydraulic arms could be mounted on the tractor or the TDS or both) and the TDS returns to the charging station downloads the empty TMAs into their respective charging docks and the reloads charged one and is ready for their next delivery. This can all be done robotically. TDS can also attach empty (empty of charge) and full (of charge) trilers and return them to and from the charging station. The wider wheel base and large tyres of the TDS make it more stable than an unattached triler and so safer in field locations.

The wheels would be large; operate on large low pressure tyres that can traverse all terrain type. 6-8 wheels versions could be built. They would require good suspensions, springs and shock absorbers.

(Note: TMA's carried in TDS's are all unwheeled TMA's [UTMA's] unless specifically specified as otherwise even if they are called TMA's)

A TDS has multiple sites built onto it for trilers and TMA's. Changing a triler requires firstly the empty one to be released from the tractor to free the site for the new one. So the empty one is released and attached to the TDS at an empty site and the full triler is then released and attaches to the tractor. Similarly an empty TMA has to be removed from the tractor. So it is removed; placed in an empty TMA carry site on the TDS and then replaced with a full one from the TDS.

A single charging station may have 10-20 TMA charging sites and 3-5 triler charging sites and a single TDS may have 10 or more TMA carry sites and be able to service 2-7 (or more) tractors/earthmoving machines. The TMA's on return slot into docking positions in the charging station and automatically dock/are secured by the charging system. Tractor trilers can also be set up as TMA holders and have sites for multiple TMA's on the triler which are then supplied by TDS's.

The charging station can have fold down sides that form a secure platform/base for trilers to move around on when in proximity to the charging station so that they are stable and can move to and from the TDS and dock themselves in safety and secure themselves to the charging station.

TMA Delivery Systems (TDS)

TMA Delivery systems will also be required in areas where small TMA's are in use this could include for cars, vans, delivery vehicles, motor cycles, tricycles and tricycle and motorcycle driven taxi cabs. Smaller battery packages do not require or justify the expense of wheeled TMA package systems. TDS's are capable of delivering quantities of non-wheeled TMA's in a fast, easy and efficient manner. The expense of computers on self-delivered systems is unrequired as these are contained on the TDS but may be included for billing, authorisation, monitoring, safety, ensuring maximum battery life, optimal recharging profiles, profiling and other purposes.

In countries such as Indonesia where expense is an issue TMA's/UTMA's would be small and light enough to be installed manually. They can fit on the side of a motorcycle (so two can be fitted one each side of the rear wheel). Tri-wheel cabs, rickshaws and Tuk Tuks could have them fitted under the passenger seat or package delivery area. The TMA's need to be small enough to be man handled and so are better and more practically manufactured without wheels and self-loading assemblies. Larger TMA's could be handled by a TDS delivery system which can carry at least 2 to 3 large and up to 10 smaller TMA's and with empty positions for the used TMA's.

The TMA Delivery System brings the required number of TMA's to a vehicle; then if it is done manually by the driver, the driver unloads the empty TMA to be swapped; the TDS receives the first empty TMA. It is inserted into an empty slot. The TDS then locks the slot and unlocks the slot of the first replacement TMA etc.

If done automatically, the loading device on the TDS rotates or lifts to remove the first used TMA then rotates/lifts so a new fully charged TMA can be fitted and then lifts/rotates into position and removes the second empty TMA and so forth. The TDS for this application has 4 wheels with two additional wheels on the bottom of arms that can slide out to the side or under the vehicle if required to provide additional stability to the TDS by increasing the wheelbase while it is unloading and loading TMA's. All systems which are automated will be designed to receive and deliver TMA's to the TDS push/pull and plug them in and also close and open compartment doors.

TDS's in advanced countries where expense is not an issue would be designed to integrate directly with the vehicle the package is being delivered to. In this case the compartment where the TMA is stored would be opened automatically by the TDS either by use of a wireless signal to the vehicle computer system or by a probe which engages the compartment door locking mechanism. The used TMA would electrically be pulled, pushed or pop out (if spring loaded), be retrieved by an arm or catch on the TDS that draws it into an empty space on the TDS. The TDS would rotate or lift to line up a fresh TMA with the empty compartment and perform the insertion phase placing the TMA in the compartment. The door is wirelessly or probe activated and closed by a spring or electric motor.

Tricycles and similar vehicles could be fitted with 4-6 small TMA's fitted in various locations. These smaller TMA's would only require 2-3 positioning/securing pins and could be fitted inside compartments on the vehicle with doors that close once a TMA is in position (thereby protecting it from weather). It would be suggested that as with other TMA's the driver be responsible to fit the safety locking pins through holes in the securing pins as a safety precaution to lock the TMA in place.

TMA's, Trilers and all of these battery systems could be fitted with an activation code system similar to that used to recharge mobile phones with a charging voucher so that the passenger or driver once they have paid for the charged TMA's etc. is given a printout with the code numbers etc needed to activate the TMA's. These are then entered by the driver/passenger into a large numbered display panel/keyboard (older people and truck drivers may have large fingers and thus need larger sized keys on the keyboard). These codes can be downloaded to the customer's smart/iPhone with the 'tap/'bump' system which the customer can then download to their computer. The TMA codes are controlled/issued by the service station computer and the TMA practically closes down without the code being entered. If they swap a series of TMA's a master code could be entered to cover them all. This authorisation code system can be used to ensure that only authorized service stations; office, park station and supermarket carparks; triler parks, motels, industrial, mining, farm and home charging systems can be used to charge UTMA's, TMA's, battery packages and vehicles and supply energy to these cars, vehicles, and systems.

The TMA's have a locking device which holds them in position in their compartment. The arm from the TDS hooks into the handle/removal slot causing the locking system to deactivate and release the TMA. A recharged TMA replaces the old one and as the new TMA slides into position and reaches the loaded position the locking system reactivates causing the arm from the TDS to release the UTMA. All securing pin holes have bearings/plastic sleeve guides to ensure smooth easy loading into cavities.

Motor cycles etc. could also have single or double TMA's which are fitted from the rear. So a single TMA unit made of a double sided battery pack can fit either side of a motorcycle frame at the rear above the wheel and is able to be removed/installed from the rear. It can slide into a compartment on the cycle that has a door that opens to the rear and closes to protect it from the weather. (The TMA could alternatively be in the open with just the electrical connections sealed against weather). Again, as with all TMA's, the electrical fitting engages automatically and it is suggested the rider insert locking pins into the securing pins. Securing pins on these TMA's could be on the front of the TMA itself and slot into/through holes in the motorcycle assembly so that the end of the pin goes out at the front of the compartment for the driver to insert the locking pin into. There could be TMA's to fit on either side of the front or rear wheel. (There would be covers to cover the protruding pins after the locking pins are inserted. TDS's can be made to load TMA's into compartments on Motorcycles)

A large single TMA could also slide in from the side of or above the bike into the position occupied formerly by the motor or fuel tank. The standard built-in battery pack could be positioned under this, or where the petrol tank used to be; under the handlebars or under the seat of the motorcycle.

In low cost environments most of the work replacing smaller UTMA's could be done manually—the insertion, removal, closing and opening of compartment doors, insertion of locking pins and locking of the TMA in place. TDS's can be automated to put TMA's into compartments on motorbikes or wait for the rider to load them. Larger packages will require the work to be done by TDS that have worm or hydraulic driven electric jacks mounted on it to tilt, rotate and lift and insert the TMA into the bike.

Motorcycles will not have need for internal combustion engines. This means that the space normally occupied by the engine can be used for standard on-board batteries with the areas outside the rear wheel being used for exchange systems. They will need large power supplies as air resistance is high. Controls and monitoring system are all built into the control panel on the motorbikes and related equipment by manufacturers, all working in conjunction with the supplier of exchange systems.

The space required for charged batteries means that for longer trips most larger motorcycles will require a motorcycle triler system. This system is the same as the standard vehicle triler in most respects. However there are some variations. The wheel on the motorcycle triler will be fixed (i.e. no steering) and single (or close double if required). This will mean the motorcycle can perform as a standard cycle with 3 wheels. That means it can still tilt as it goes around corners and in all other respects acts like a motorcycle. It will require side arms. For larger (and if required all) cycles a set of stands will automatically start to fold down from the triler as the motorcycle speed slows to under say 5 kmph (this will be advised by the electronic speedometer) and by the time the vehicle stops the stands will be on the ground. The stands have skid pads on the bottom so they can slide across the tarmac and are sprung (with shock absorbers as required) so they can cope with ground variations The stands fold down electrically from behind. As the cycle starts to move off it folds up in the same direction (backwards). The stands have a small electric motor operating through a clutch mechanism that can allow slippage if motorcycle takes off quickly and/or the stand hits/reaches rough ground.

Cars and vans could also use wheelless TMA's that are transported to the vehicle and removed by TDS's. This would enable the TMA's to be put inside compartments in the side/bottom of the vehicle (opening on the side away from/or beneath] the siding door in vans) which means the compartment could be sealed by a door which closes after the UTMA is put into its receptacle to protect it.

TDS's will use the same docking and port location systems to find their way from the parking and charging site to the staging areas as trilers and to ensure TMA's and other non-wheeled equipment TMA's are correctly positioned on the vehicle and returned to their charging stations correctly. The use of TDS's will remove the requirement for unwheeled TMA's to have computer controlled, wheel, steering and navigational/positioning systems on board. They can just be packages for batteries with a computer system; correct plug-in components and catch handles so a TDS can position them on a vehicle; can grab them to remove them from the vehicle an The TDS has equipment to open any compartment doors; pop out used TMA's and replace them with recharged TMA's. Trucks and articulated vehicles using TMA loading systems will communicate wirelessly with the TDS which will instruct it to unlock the TMA compartments and move the UTMA packages to the side so the TDS can remove them and to extend the TMA retrieval and removal apparatus to allow removal and replacement of used TMA's.

Systems for servicing engine bay carriers located in places which used to serve as space for engines have an extension apparatus so that the TDS carrier delivery unit can slide out over the bumper bar etc. on the vehicle and insert the UTMA's directly into the TMA slots in the engine bay carrier.

Trains

The key feature about trains is that they don't need specialized trailer systems to do the job. They do however require specialized operational and electrical systems. The reason for this is that train locomotives in use for transporting freight rely on large weight in the locomotive to create friction/traction for the pulling wheels. The switch to electrical power changes this requirement as transport flat beds are fitted with electric motors for acceleration and braking energy reconversion thereby removing the requirement for heavy weighted locomotives. The use of electric power with battery cars means that trains must be prepared and manufactured with a view to electrical power.

The train will require a number of flat beds and/or freight cars to have these types of electric motor so when loaded with freight can provide traction; similarly they will need to have braking systems which can convert energy of braking back into electricity which is stored for future use/acceleration. This energy can be stored in batteries positioned under the freight cars alternatively it could be stored in a special freight/braking car van with a supply of on board batteries to collect this power.

The key feature of this system is that trains of the past are past. The new style of train will have a wiring yoke which passes under all the cars in the train so energy can be transferred from a number of battery cars positioned along the train and take energy back to storage from braking as required. The braking stored capacity can be in special brake vans; in batteries provided for that purpose under the freight cars or in a special portioned off sections of battery storage in the battery vans.

Thus a train may have 5-7 electric engine equipped flat beds/carriages plus 3-5 battery cars. Where overhead cabling is available trains run (and charge batteries) on mains power; on entering remote areas batteries take over. In places like Australia where solar energy is plentiful a train going one way (or part of the way) can swap battery cars at charging spots as needed. On arrival the used battery cars are replaced with ones that have been charging (with solar/off-peak/mains power) and the train can then go continue on with recharged cars (the used cars are left to recharge till the next train arrives).

The next issue is concepts of diesel, cars and cables. Currently the only thinking with trains is diesel powered or electric overhead cable powered. One needs to understand a third way of thinking. This is Hybrid Electric Concept (HEC). The electric train (or vehicle) uses most of its power in acceleration. Once it has reach cruising speed it uses very little power to maintain its speed. In the past electric trains have been limited to overhead cabling, should they be? If cabling is strung up above stations in country towns, in transfer spots, mountain areas and loading areas in mines the train can use cable supplied power for acceleration up to cruising speed and then batteries for ongoing cruising. When it comes to braking the regeneration energy is stored in batteries but it is not wasted in acceleration it is saved for cruising all starting up in towns can come from the cabling. Motors on flatbed carriages mean power can be used anywhere along the train. Trains need to be setup with switching systems and the computer programming to make it work in particular the concept of charging from cabling as soon as cabling is available and switching from cable to battery power and back again as required.

At the same time while the train is sitting in a station and under cabling it is sucking energy out of the cables to recharge its batteries. The next point is that in many places in Australia there are short sections of long hills say 3-5 km and then very long sections of flat grade (hundreds of kilometers). Is power wasted on the short sections of hills? No, cabling is run up the hills so the train can go up under cable power and when coming down any energy captured is stored for later.

Finally power is used in acceleration and lost in air resistance. Reducing air resistance and be using very good grease in wheel bearings/hubs saves acceleration power. It is easy to make the front of trains aerodynamic but what about carriages? The front and rear ends of a carriage are where it interacts with the air but does it need to. Passenger carriages have air-conditioning which comes in from the roof (and coal carriages don't care). Therefore by putting tarpaulin or canvas covers over/between the spaces between the rear of one carriage and the front of the next carriage air resistance can be halved and the train can run much further on a single battery carriage (and the tail end of the last carriage can be aerodynamically shaped to reduce drag).

The Carriage Air Resistance Reduction System (or CARRS) relies on minimizing the air flowing against the fronts of carriages and drag on the back of carriages. The system has three (3) type of tarpaulin or plastic sheet (TPS). The first Side Tarp Plastic (STP) covers the space between the sides of any two consecutive carriages. The space between the Rear of the Front Carriage (RFC) and the Front of the rear Carriage (FRC) adjacent is either static when the carriages are in a straight line; shrinking (one side) when the carriages are going around a corner or expanding the other side on the same corner. The STP thus needs to stay static; expand in length or shrink in length. This is achieved by putting a sprung roller on one end of the STP similar to that used for canvas blinds. The other end has a clip that slots in a bracket on the carriage in front. The roller/balance of the STP is attached to a bracket on the FRC so that as expansion is required the STP spools off the roller and as shrinkage is required it is spooled onto the roller by the spring mechanism. The STP can thus expand and contract as the train carriage go around a corner. If required a steel frame could be located on the junction between the two carriages to provide support for the sides and top tarpaulins to keep them in position.

The Top TPS cover (or TTPC) is slightly different (and this could be used on the air spaces between the bottoms of the carriages. (Anywhere that air is pushing against creates resistance and being pulled/dragged through creates drag both use power). The TTPC is in a situation where the sides change but the centre remains mostly static. So a TTPC Unit is made of three portions: a right side (in direction of travel) section (RSS) a Left Side Section (LSS) and a plastic middle fixed section (PMFS).

The PMFS is made of plastic extrusion with spaces either side for the RSS and LSS to fit into. At either end it attaches to a plastic swivel mount (PSM). The PSM slots over the ends of the carriages at the front and rear into a bracket mounted on the carriages and allows the PMFS to swivel from side to side as the carriage goes around corners. THE PMFS has slots on either side that fold over at top and bottom forming a capture system. The inner side of the TTPC has small bits of plastic (pieces of plastic/tube) that are laid at intervals of 5-25 cm and glued along the edge that is folded over and sewn shut so that the imbedded plastic inside the flap stops UPS side escaping from the slot.

The end of the TTPC at the RFC end is simply attached to a bracket. At the FRC a smooth stainless steel rail or alternatively a rail with small wheels/runners along it that can move independently is attached to the top edge of the FRC. Approximately 10-15 cm under this is a position designated the SMS (start of movement section). The TTPC after going over the rail is connected to a sloping beam that goes from 10 cm below the SMS point on the inside section of the TTPC to 10 cm plus the FREA distance below the SMS point on the outer side of the TTPC. The FREC distance is the difference between maximum and minimum separation distances (MXD and MND) between the adjacent FRC and RFC sides. So it is the difference between the corners of adjacent carriages when a side is going around and right hand corner as opposed to a left hand corner. Half of this amount the FREC Retraction Expansion Amount (THE FREA) represents the distance the TTPC has to retract or extend at the outer side as it corners in either direction. If this FREA is over 20-30 cm (depending on carriage width) then FREC expansion/contraction system FREECS should be split over both front/rear carriages half at RFC and half at FRC. (For ease it will be explained as if just the rear carriage has a FREECS).

The beam therefore slopes from inside downwards towards the outside. The difference between its side height on the inside and its side height at the outside is the FREA. The beam is attached by two springs to a horizontal bracket 4-5 cm+ the FREA distance below the outer side of the beam. Each spring is set inside ¼ to ⅓ of length of the beam from its edges and goes straight to the bracket.

Both springs have slight tension on them. The outer spring is a 'soft' spring which in the neutral position is already extended so it can contract the FREA distance and can also extend the FREA distance without damage. If the train goes around a corner and the distance between carriage edges shrinks, the spring pulls the beam down and takes up the slack; if it expands the TTPC pulls the beam upwards against the spring; when it returns to straight travel the beam resumes its neutral position.

The outer sides of the TTPC are folded over. There are two rows of 3-5 mm diameter holes (approx. 3-5 mm apart) along the outer edge with 7-10 mm between adjacent rows).

A pair of joined spoked wheels is made that rotate on the central bar. Each spoke has an extension that goes through the wheel and through holes in the TTPC. A second set of spoked wheels connected with a sprung hinge and counter lever axle system to the bottom set of wheels is on top of the TTPC. (So spoked wheels run top and bottom of the TTPC with one on the central bar and one on an arm joining them). This keeps the edges of the TPC in alignment with the sides of the carriages. The holes in the folded edge sections run for 3 cm+ FREA distance up/down along the TTPC on either side of the central slide bar.

Side plastic right angle clips similar to PMFS clips can run from the RFC to a distance equal to FREA distance minus 3 cm from the FRC, along the top of the outside of TTPC and hold the top of the side TPS and outer side of the TTPC together. The edges of each are folded over with plastic tube in them similar to central TTPC folds. (If there are FREECS systems on both FRC and RFC, side plastic strip clips will be in the middle between the carriages and run to within ½×FREA—3 cm of each carriage).

Collision Systems

Trilers are designed to take impact from each of the sides and the rear. The rear collision system comprises of two platforms on which the battery carriages rest. These sit on top of three (3) or more pipes which are split in the middle so that the front pipes can slide inside the rear pipes in the event of an impact. The rear pipes have small holes in them to allow the slow escape of air and flanges to hold the air inside. The front and rear carriage holders are linked by shock absorbers (or the pipes can be shock absorbers) and are also sprung so that springs push them apart after any impact.

The two battery carriages hinge in the middle and are held with hinges at the ends to the triler. A plastic cover on top of the triler to protect it is clipped on the sides and will release in an accident.

In the event of a rear end impact (for rear mounted trilers) the force of the impact causes the chassis support pipes to concertina together. The carriages sitting on top of them fold upwards around the hinge between them so they form a triangular shape. Thus the impact on the batteries is mitigated. After the force/pressure of impact is released the chassis pipe springs or leaf springs on top of the carriages force them back into their normal position.

Battery carriages can be stacked to three or more levels. There must be 10-15 cm space between the top of one battery carriage and the bottom of the next one up to allow movement and air circulation. The triler rear end frame must be reinforced and strong enough to spread the force of any impact so that it is spread over the battery carriages simultaneously so they all bend upwards simultaneously.

Trilers have a main wheel assembly (MWA) that supports 85-95% of triler weight so it is behind the centre of gravity (COG) and operates (like a single wheel) around a central pivot so that whatever direction the vehicle goes in the central wheel assembly rotates to track it. In passive/free-wheel mode it just rotates on the central pivot to move the wheel into line with and in the same direction as the vehicle's movement. It can operate in three modes: free-wheeling where the wheels are free to rotate and the assembly is free to rotate at will or as caused by the vehicle it is attached to so the vehicle pressure in any motion causes the assembly to follow. Controlled drive is where electric motors on the wheel assembly follow orders from the vehicle's central computer/steering system to steer the wheel assembly in unison with the vehicle. Finally it can operate in powered mode so there are electric hub motors in the wheels which can power the triler in unison with the vehicle's drive system and also for powering the triler when it is detached from a vehicle and in triler park mode.

Off vehicle controlled drive (OCD) is when the triler is off the vehicle in a triler park so the triler controlled by its internal computer system can move independently to follow orders of the triler park central computer (TPC) and find its park station; park itself and attach itself via the charging wand or be attached by the TPC (by a plug from the park station) to the power supply. Each park station has a clamping system to lock the triler to the ground to prevent it being blown away in high winds.

There is a secondary park wheel assembly (SWA) that is mounted under the triler and folds down for use to support the triler when it is not attached to a vehicle. It has two wheels on an assembly that folds up/down and locks up under the triler when not in use. There is an electric motor (which can use a worm drive) to push the wheel assembly down into position. The force of the electric motor pushing on the rod that forces the wheels down is strong enough to lift the triler up from its position on the car or vehicle so that the hold pins come free from their pin receptacles on the vehicle. As a safety feature the SWA will have a clutch mechanism that comes into action if the electric motor encounters too much resistance to lift the triler. This could come into play, for example, if the triler had not been unlocked from the vehicle so that the motor was trying to lift the vehicle as well as the triler.

The electrical connection to the vehicle needs to be disconnected before the SWA will lower. It is recommended that connection and disconnection of electrical leads from vehicle to triler be done by humans (this can be automated) the triler is then free to move away under its own power to a parking position in the triler park to charge.

Triler Parks

Operations in triler parks are similar from site to site. The areas Trilers/TMA's/TDS move on is called the Tarmac with a smooth drive surface. Triler parks may be hard wired with underground electrical circuits. These electrical circuits could carry computer instructions to any trilers & TMA's at a dock in the park and talk to the park control stations located at each end of the park aisles. These park aisle control stations (PACS) can communicate wirelessly to trilers in close proximity to them. Triler parks can also be built as high rise buildings in built up areas with elevators, lifts, stairs and ramps between the floors and tunnels between the storage/charge areas to and under the service and loading areas.

Trilers can be—self propelled; self plugged in; locked down electronically or keyed for security and storms; lockdown clamp over axle. Self docking to electric charger which can also have a secondary clamp. So the triler will be clamped in two positions—onto its charger and onto its pad via an axle clamp. The axle clamp can be activated by the triler computer chip so when the triler gets into position the electric motor on the clamp using a worm drive raises it up so the triler axle can fit underneath. The triler then moves itself into position with a small electric motor on the axle and then once in position sends a signal to the clamp's electric motor to set the tension on the clamp pulling it down onto the axle. The clamp has to have sufficient force to survive winds of up to 300 kph in tornado regions.

Trilers move about under their own power to linkup and docking areas. Whilst moving around parks trilers have hazard lights on, travel at 5 kph and emit intermittent 'beeps' to warn people of the potential hazard and to stay out of their way. Qualified personal only are allowed entry into triler parking areas; once they are trained in the behaviour of trilers and people who are not trained are banned from entry into the parking areas. (UTMA's are inserted into charging slots in sheds by TDS's which take them to and from the shed/service area in Triler Parks.)

Triler clamps would also have a key locking system that is not in use most of the time when the park is under normal operation but that will be able to secure all trilers in the event of a hurricane or tornado. This means in the event that a tornado is possible staff can order all trilers to be locked down. This would best be done with each triler row having a key locking point at the end of the triler row to turn off all the clamps and power down power supplies to all the trilers in the row as it takes time if done individually. (Powering the trilers down reduces the risk of damage and hazards by water blown into their compartments).

Docking

Trilers and TDS's will have an on-board map of the triler park allowing them to navigate to any required location in the park. This will allow trilers and TDS's to move to charging locations, storage areas, vehicle locations or any other location in the park as required.

An image based collision avoidance system for unmanned vehicles may be used.

Such a system, in part, may rely on a two camera displacement model to calculate the angular displacement of a target object to determine its position. A system similar to this, along with a range of other active sensors, will be used to ensure that trilers and TDS's avoid collisions with any obstacles in the park.

Trilers and TMA's can have an automated plug in system to attach them to a vehicle. The system can be attached to the vehicle (or the triler park charging dock) so that an arm with a plug attached extends electrically from the car/charging dock towards the TMA/Triler (or vice versa). A cover lift pin lifts the cover and the plug then enters the socket and seals against the weather. The socket can have pressurized air inside so any water coming into contact with the outside is repelled By adding a colour recognition system the system could then be used to work out the aisle numbers and number position of a site in an aisle. If the cameras then focus on the position of laser point sources around the docking site/within the site the same camera and location system could be used to dock the triler to its charging point. They can also use a modified version of the Roshni system to find their way to their correct docking position. (It would be modified to use numerous wireless sources in the triler park to pin point their location with triangulation or wave shift technology that positions them with shifts in their transmission wavelength when they move.)

Trilers, TMA's and TDS have a 'vision' control system built into the triler/TMA/TDS that pops up on a stalk when they are on the ground (and unattached to a vehicle) to give them the ability to navigate and locate the relevant guide posts in the triler park they are located in, avoid obstacles and move the triler to its designated docking attachment position. The 'vision' system has binocular cameras, (two forward facing digital cameras separated by a space between them on the stalk) enabling angular differentiation between the cameras so the computer system can determine space and distance. The stalk folds down as a TMA reaches its charge/truck load position or a triler is connected to a vehicle.

Hooking Up

Trilers can be programmed to hook up to vehicles The handheld triler reader when touched to a place on the triler (or an automated one which reads the information wirelessly as the triler/vehicle enters the triler park) reads the:
1. Account number of the customer;
2. Identification number of the current triler or TMA's requiring replacement/transfer;
3. The amount of charge still in it;
4. and can be advised by the triler park central computer of
5. The number of the replacement triler and charge amount; and
6. Calculate the payment due and transmits it to the front counter/or the automated payment system for the patron to pay.

Triler parks in urban areas could be established as multistorey structures. All the floors can be connected with lifts and the bottom two stories can be connected with ramps to the ground. TMA's might be stored on the bottom two stories with multilevel stacking and warehousing systems. TDS's can place, plug in and remove TMA's from charging slots.

Warehouse and stacking systems mean a triler or TMA can be picked up and taken by automated forklifts, conveyors and transporters and placed in the site where it is to be charged. Similarly it can then be automatically retrieved when charged and delivered to a securing area. Securing areas are places where trilers and TMA's wait prior to the move to the staging areas for connection to vehicles.

Vehicles are able to be fitted with a computer system which automatically advises both the amount and model of charge of a triler by wireless technology as a vehicle enters a park. This automatically notifies the park computer to send the correct style of triler/TMA to the staging area.

Natural Disasters

In the event of a natural disaster; power may be down in the most affected areas and a triler park full of fully charged trilers/TMA's can provide a secure backup electrical source. Each park will have a self-propelled vehicle stored in a secure location that has a power source on board so it can go to the end of each triler row and power up the trilers and unlock them. Triler rows can be set up so that in the event of a natural disaster the lead triler in each row can be turned on to power up the trilers in the row so that trilers (after being checked for damage and water inundation) can be unplugged and used. The triler park owners would obviously have a security override code that they plug into the end of a triler row that means that only the owners can turn the row back on again so others cannot steal them.

In preparation for power losses/blackouts important facilities like railway boom gates and street traffic lights could be fitted with adaptors for receiving emergency power from trilers/TMAs which could be taken to them in a blackout. Triler parks can also act as reservoirs to supply power to the grid. It would also be possible to provide adaptors to business premises and homes so that in the event of blackouts trilers/TMAs could be leased to organisations and individuals as a power source.

Triler parks are set up with rows of trilers. Two trilers can log on to each docking station one in front and one behind. Docking stations would be numbered and when a triler reaches a park it would be given instruction as to how to find its docking station by wireless communication from the central park computer. Laneways to docks could be one way so trilers move along in an orderly manner. Trilers in proximity to each other could talk wirelessly and use collision avoidance programs to queue and move in an orderly way from on the loading area to its final destination/position.

Trilers have heavy metal/aluminium sides for storm and cyclone areas and a plastic cover on top.

Batteries are stored, if practical, in sealed packages to withstand water and storm effects.

Trilers have on board computers to: park them; keep records; operate GPS locators; receive and send billing information via Wi-Fi signals to/from triler park controllers/computers; receive orders to come to queuing and base; send and receive signals through electrical wiring of the harness to the vehicle and/or park charging system; process package activation codes.

Flow control packages on triler park computer systems monitor demand and ensure sufficient trilers are waiting in each type of queue for every customer to be serviced within 5 minutes. There will be queues for small and large cars, trucks, vans and articulated vehicles for either trilers or TMA's.

Attachment

Vehicles that require rear access (like dump trucks, delivery vans, mine vehicles and articulated vehicles) could have front mounted trilers. Triler parks could also have provision for articulated vehicles to park while the drivers are on a rest stop and charge the vehicle's main (built in) batteries. The electricity cost for the main battery recharge could be at the same rate as triler recharges and payment handled in the same way. Prime movers can be serviced by front mounted/inserted TMA's (TDS delivered) that are inserted into positions in their former engine bay which should have sufficient space for 130-190 KWH.

On-Board Triler to Vehicle Charging

Vehicles can be set up so that the built-in batteries can be charged from the triler batteries when the vehicle is in motion. Thus a customer who hasn't had time to fully charge his on-board batteries can charge them from the triler batteries whilst his vehicle is in motion. For example, if a vehicle is travelling for 2 hours to the next battery swap area and the triler has 3 hours power in it, 1 hour of power could be transferred to the vehicle's built in batteries in that time. Thus after the next triler stop the vehicle would able to be fully powered with full batteries and a new triler.

To facilitate this charging the computer system in a triler will communicate with the computer systems in the vehicle. This will encompass exchanging the information required to start charging the vehicle's built-in batteries. It will also determine the vehicle's destination, energy usage and next planned battery swap. From this the triler will be able to calculate how much power can be devoted to charging the vehicle's built-in batteries. The triler's computer system will reserve energy in its on-board batteries in case of unexpected travel delays.

Trilers can be fitted with tow bars and towing systems which attach to the tongue of the existing towbar of a vehicle and pass under or through a slot in the triler put there for that purpose. The system can be built into trilers or fitted for customers as it is requested.

This triler charging system can be used to provide power to any external device. For example 'tradies' could use it to recharge their power tools on site and to provide power for things like air compressors. They would be able to carry spare TMA's/UTMA's for such usage under their vehicle (in a normal carriage position) or in their former engine bay.

Electrical Systems

All triler and TMA systems use the same system of voltage and controls. This is a means of enabling a vehicle to travel long distances without having to use chargers. For example a vehicle travelling from Europe to the United Kingdom may not have an adaptor to plug into the local power system. The vehicle can swap trilers and/or TMA's and use on-board charging to fill their built-in batteries.

Plug-in Systems

All vehicles will initially come with two (2) plug-in ports/points. A local domestic current power point (LCP) and a 4-7 pin square EVRE (Electric Vehicle Range Extender) port/point. The difference is that the local current point (LCP) can only charge the on-board residential built-in battery systems that come with the car. The square EVRE point is attached to a specialized electricity meter so that it shows up separately on the bill and can charge everything including Trilers, UTMA's and TMA's (TT's). It is expected as the system system rolls out internationally that vehicle manufacturers will build vehicles that are integrated into the SYSTEM environment. These vehicles would only have the EVRE port/point as all batteries would be charged through the system.

The reason for this is threefold:

1. It enables the registered country license holder (RCLH) for that application to have separate arrangements with electricity power suppliers for power to be supplied to these (their) customers at specified peak and off-peak rates through EVRE TT points;

2. Secondly it enables the RCLH licensee to have special purchase and supply rates for power and to charge special rates at holiday periods and special times. So for example they might run a special at Christmas time whereby all people with EVRE TT plugs could charge all their vehicles for free from 7 pm 23rd December till 5 am 24th December. (Shell for example could advertise this as a Christmas present to all their customers in Europe). This would help shift the power load on the main grid and it also encourages everyone to spend a bit more and have EVRE TT Plug/meter installed.

3. EVRE TT plugs can charge the entire car/cycle and this includes the resident on-board system.

It also means that once the EVRE TT plug/meter system is universal, RCLH will be paid a percentage of all power sold and used by vehicles in their region. (Commercial operators will be expected to install these EVRE plugs/meters as a matter of course).

The specialised electricity meter may be a physical meter installed at a premises or, it may be a centralized system that utilises power line communications (PLC) to create a virtual meter for a premise and track power usage centrally.

Hotel/Motel and Office Systems

Accommodation providers such as hotels, motels and caravan parks provide an interesting application for recharging. In the initial uptake trilers will form the predominant method of travel. If accommodation providers have charging points fitted with ERVE plugs they will be able to service and cater for this market. The EVRE plug in via the triler allows all electrical systems on the vehicle, in any format, to be recharged. Licensee electrical companies will supply accommodation providers with a package that includes separate charging points for customers along with a control and billing system so they can add the electricity cost/charges to the customer's bill. This will provide a new revenue source for accommodation providers.

Customers could be charged a premium to the actual electricity cost. A central metering computer is programmed to show itemized charges per vehicle and could be integrated into the accommodation provider's billing system.

General parking lots (e.g. commercial parking lots, offices with on-site parking, and the like) could also provide charging points with ERVE plugs. The parking lot operators could charge a premium for charging similar to accommodation providers. They could also use the charging facility as a way to attract customers by offering discounted or free charging promotions. Business with parking for customers and staff could similarly offer charging options. These could be charged at cost, at a premium, offered for free, or as part of a salary package for employees.

Practical Applications

Most vehicles currently have an engine bay which will become obsolete with the move to 100% electric vehicles with electric wheel motors. As will differentials, exhausts systems, starters, tail shafts and other running gear associated with petroleum powered engines. This leaves a large amount of space for on board (resident) batteries and ample room for mounting TMA's and TDS delivered UTMA's (combined known as U/TMA's). Resident batteries could be stowed in the engine bay and under seating; TMA's could fit under the floor especially for commercial vehicles, buses and trucks.

The fact that a TMA swap service is available means that the average person does not have to carry large amounts of on-board power for most normal day to day applications. So if a vehicle can carry 3-4 TMA's in addition to the resident power supply the average commuter would only need enough power to travel say 100 km in their resident supply with another 50-70 km in the TMA. If they need more power they can simply swap the TMA or source some more. Buses and trucks could swap 2-3×50 KWH UTMA's/TMA's two to three times a day when bus drivers have to stop for meal or other breaks.

The advent of a TMA/triler swap service means that resident battery power and hence weight that a vehicle has to carry on a day to day basis is reduced. Car suppliers don't need to build cars with 170-300 km ranges in on-board systems which are rarely ever used. The average commute is less than 45 minutes each way (including time in traffic on minimal draws. Thus the extra weight is just a cost to be carried around. U/TMA's reduce this cost and the upfront cost of electric vehicles.

The average person travels for 4-5 weeks in a year total travel time over a year is equivalent to 670 to 850 hours. The TMA suppliers will be paid an upfront fee of $1000. This will enable a TMA hirer to have unlimited swaps on their vehicle for say 5 years. Second hand buyers will be able to pay 3-5 year top-ups. Thus the vehicle will come with 1 semi-resident 6-7 KWH U/TMA's and positions for 2-3 more. Resident systems could have 5 KWH so the vehicle has enough for 100 km commute but if they want to travel further they load up with TMA's &/or trilers.

Motorcycles would be similarly setup with a combination of a semi-resident UTMA's/TMA which can be swapped and a permanent (resident) on board system that would give a combined range of say 50-70 km in city traffic/work. Similarly there would be positions for an additional 1-3 U/TMA's to increase the range as required and also a triler fit point.

Remote Area Trilers

Because trilers are for use in long trips and in remote areas the concept of trilers with generators on-board has already been discussed. Their engine could be Petrol/diesel/turbo-charged or supercharged/with or without ethanol or water being direct injected into the cylinders. The one thing that does need to be mentioned about trilers that have attached generators for remote area use (and perhaps some other trilers as well) is they should be equipped with a standard local current electrical plug so they can be plugged to any point in any place if the opportunity presents itself. This means (since trilers can recharge every other onboard system) that every battery pack on the vehicle can be recharged via the triler plug. This will not affect the business of selling electricity via the ERVE points that are fitted in homes and businesses as the loss of power sales can be offset by charging high rental figures for these tilers when they are in use.

The car's computer can also be programmed so that it calculates the power usage to the destination and since the destination has mains power and can recharge the triler and other battery systems cheaply, the computer varies the power output from the generator so that most of the power is used from the batteries prior to reaching the destination thereby saving/conserving generator fuel.

Triler Parks (and Suburban Hi-Rise Situations) Additional Features

A hazard of electrical networks is system failure. It can be caused by a failure: at a sub-station, along the transmission lines or in the generating power station itself. It could cause blackouts or brown outs. If a triler park has 2000-5000 units in stock and 70% are fully charged it has a latent capacity to feed electricity into the whole electricity gird if so required. Thus in the advent of a blackout, at short notice a triler park could power its local region.

This will require a program inside the triler parks computers to direct power to feed out of the park. All leads and power connections will need to have sufficient capacity to handle high current flow back into the network. Finally it will require inverters to convert the current from the trilers and TMA's back into the power voltage used in the grid. However if these things are put in place electricity companies will pay high premiums for such redundancy supplies.

Advanced implementation often this technology in developing countries which have never used electric cars will probably skip the 'triler park' section of the rollout. Triler parks work in areas where there are electric vehicles already and provide a means to transition non-system electric cars to system applications. Hence a non-system car can have after market equipment installed so it can use the system Triler and network system.

A new system network established in areas from scratch which have no electric cars would use service station 'warehouses' where battery packages (BP's) or UTMA's are stored in single or multi-level warehouses which have TDS robots to put the BP's directly into the slots in the cars or vehicles and take the replaced ones back to the recharging slots in the warehouse to be recharged.

Motorcycle Trilers—Features

These trilers are different to standard vehicle trilers. Multi-wheeled vehicles have inherent stability and do not require the ability to sway or lean on their side as they go around corners. The multi-wheel vehicle trilers can rock from side to side using the 2 leaved up-down hinged spring system. Trilers for motor cycles (and scooters) need to lean from side to side and thus need greater stability. It is therefore essential that they have very strong springs in the up-down hinge system in order to ensure that stability is maintained and they are safe at all times. All trilers (including cars) would be equipped with effective spring and shock absorber suspension systems so in many cases breaker spacers may not be needed if the suspension and up/down three way hinge is adequate.

Bike trilers have a smaller cross-sectional area to their 2 pin mounts and thus may need additional support. This is allowed for with two side arm brackets which attach to pins at the rear of the cycle at around rear axle height. These are sprung arms with inbuilt shock absorbers and attach to small axles pins. These are attached by brackets to the frame of the motorcycle and protrude from the sides of the motorcycle. They end in a circular fitting which has a nylon/plastic washer inside which fits over the pin axle arm and is locked on in position with a washer and lock pin system in a similar manner to other triler pins in use. The arms provide support for the triler as it moves up and down at the rear of the bike as it moves along the road and also do not impede it from tilting over as it corners.

Plastic covers would fit over the RCH parts/axle pin components when not use.

Integrated Computing System

In the context of the system, a computing system is any computational device, including its control software. It may be an embedded system comprising multiple computing devices (e.g. computer chips) and their associated memory. It may be a single system on a chip. It may be a full fledged computer. It may be a distributed computing system comprising many different embedded systems and/or systems on chips.

A key aspect of the system is the computing systems embedded into all of the components of the system and their integration. Each component (TMAAJTMA's, TDS's, trilers, triler parks, charging points, vehicles, etc.) has an embedded computing system and they all communicate securely with each other to provide the business process that makes the system unique, secure and commercially viable.

Communication security will be based on a variant of asymmetric key cryptography. No key in the cryptographic chain will be made public but some keys will be shared with partners producing components for the system. The security protocol will evolve over the lifespan of the system to maintain security. If quantum computing becomes viable quantum cryptography may be introduced into the system, potentially using quantum key distribution.

Every system compatible battery pack, whether it is in a TMA, UTMA, triler, train car, resident in a vehicle, or any other device, will have an embedded controlling computing system. This computer system will manage battery charging and discharging, like in many common rechargeable batteries, to optimise the lifespan of the battery. It will also provide safety features, such as monitoring for over heating, leakage and short circuits. In the event of minor problems the computing system will actively manage the issues (e.g. by turning on active cooling or venting systems, or by reducing current flow). In the event of dangerous situations the computing system will shutdown the battery operation and signal the failure with visual and/or audible alerts and by informing other relevant systems (e.g. a vehicle control system or a charging point).

The more important feature of the battery computing system is its secure communication with the rest of the system that allows for customer billing and data collection.

Data collected will include usage patterns that will be analysed to optimise the system. The battery computing system will enable customer billing in two basic scenarios. The first scenario is when a battery pack is swapped at a triler park or other service centre. When a battery pack is swapped it will communicate with the service centre's control system indicating its current charge and maximum capacity. This will allow the service centre system to calculate how much electricity is required to charge all of the battery packs swapped by this customer and to use this to calculate the amount to charge the customer. The second scenario is when the battery is charged by the customer at a charging point. In this scenario the charging point will calculate the amount to invoice the customer based on the energy used to charge the battery packs. Battery packs will provide their identification to the charging point for security and tracking. They will also record charging data to be collected and analysed by the overall system.

As mentioned in previous sections all battery packs will be charged through a special plug. This provides both safety and security. Plugs for different categories of battery packs will have unique shapes ensuring that they can only be charged by devices capable of handling the current flow. The plugs will not only have wires to carry the current to charge the batteries but will also have wires for communication between the battery packs and the charging point.

The computing system in every battery pack will include GPS, wired and wireless communication features. The GPS feature will allow battery packs to be tracked. Location data will be analysed to optimise the system. The GPS feature can also be used to find missing battery packs. Wired communication will be used to interact with any other device to which a battery pack is physically connected. This will include interacting with a vehicle control system, with a charging point and with a TDS. Wired communication will be based on transmission control protocol and internet protocol (TCP/IP) or universal serial bus (USB) and will be encrypted. Wireless communication will make use of a variety of protocols potentially including wireless local area network (wi-fi), Bluetooth, radio frequency identification (RFID), near field communication (NFC), wireless USB, infrared, ZigBee, cellular and others.

Trilers, TDS's, TMA's and other service devices are autonomous robots. They will share a common software architecture and, to the extent possible, a common hardware platform. As autonomous robots they will be able to navigate safely on their own, avoiding collisions with obstacles and conducting their service activities. Navigation will be through a combination of traversing a known map and using route determination algorithms. Collision avoidance and navigation will make use of a range of sensors. These may include active and/or passive stereo vision, radar, sonar, laser, infrared and physical touch sensors. If one of the physical touch sensors is activated the robot will immediately stop to avoid a potentially imminent collision.

Navigation will also make use of radio signals and/or physical route indicators. When these autonomous robots first enter a service centre, such as a triler park, a map of the park will be wirelessly downloaded to them. These maps will be stored in the robots and reused the next time they enter the same service centre. If memory becomes limited the oldest stored maps will be deleted.

Trilers and TMA's in open industrial or agricultural environments will build a map of their environment as they navigate around it. They will share this map with all other trilers and TMA's operating in the same environment.

In addition to sensors and logic for navigation TMA's will have fine tuned sensors and logic to manage their connection and disconnection from a host vehicle. Given the close tolerances required to make a connection to a vehicle a TMA will interact with active and passive guides and sensors around the vehicle's connection point. These will allow the TMA to know its exact location in relation to the connection point. TMA drive mechanisms will have precision gears, such as a step motor, to allow the TMA to position itself exactly.

A TDS will have similar fine tuned sensors and precision gearing to position themselves accurately to remove and insert UTMA's. The TDS will interact with active and passive guides on the tray mechanism that holds the UTMA's in the vehicle. A TDS will have robotic arms that perform the removal and placement of UTMA's. The TDS will communicate with the vehicle's or triler's control system to determine which UTMA's need to be replaced. The vehicle or triler control system may indicate it wants fewer UTMA's than were removed, it may indicate it wants more UTMA's, or it may indicate it wants empty UTMA slots filled without removing any current UTMA's in the vehicle or triler.

A TDS returns used UTMA's to a central deposit location in a triler park's or service centre's warehouse. Using its robotic arms it transfers the used UTMA's to a storage location or places them onto a conveyor belt. If UTMA's are placed into a static storage location separate service centre robots will collect the UTMA's, take them to charging locations and place them into charging cradles. If UTMA's are placed onto a conveyor belt this conveys them to charging locations where robotic arms position the UTMA's into the charging cradles. Once charged UTMA's are removed from their charging cradle and moved by conveyor belt or service centre robot to the provisioning area of the warehouse ready for collection by a TDS to be delivered to a customer.

Service centre robots are simplified versions of a TDS. They operate in a more limited environment so they do not require as many navigation sensors. They also do not require as much precision for loading and unloading UTMA's.

Charging points can be located at a private residence or a public commercial environment. Battery packs, usually in a vehicle or triler, are connected to the charger to begin charging the batteries. The charging point and battery packs communicate to determine optimum current to use to charge the battery. The charging point determines how much energy is used to charge the battery packs. This information is used for billing purposes. A charging point in a private residence would communicate the energy usage data directly to the energy supplier who would bill the customer through their commercial relationship. (Communication with the electricity supplier could be through a smart meter, a specific meter for the charging point or could use broadband over power lines.) For auditing purposes the charging point would also communicate the energy usage data to the central control system for that region. Charging points in a commercial environment (e.g. accommodation providers or parking lots) would also report the energy usage to the commercial entity's central computing system. This allows the commercial entity to determine its costs of providing energy and would allow the entity to charge customers who use the charging points.

Charging points will have a built-in user interface and will also provide a web interface to allow interaction via external devices such as smartphones. In a private residence the user interface will allow the customer to set charging schedules. For example they could select to only use the least expensive off-peak electricity rate for charging. Alternatively they could select a fast charge, to charge at any time, or to only charge to a set limit. This gives the customer control over how they make use of the charging point. In a public environment a customer could find out the cost of charging their battery packs and options to select a maximum amount of charge. Billing information could also be displayed through the user interface in a public environment. Some charging points in a public environment could have payment facilities built-in. Payment could also be accepted through a smartdevice or direct debit.

Charging points will monitor the charging process in collaboration with the battery pack computing system. This process will optimise current flow to extend battery life within the constraints of user requirements. The process will also monitor for batteries overheating and turn on active cooling systems, reduce current flow or pause charging the batteries to prevent battery damage or risk of fire. If a fire was detected visual and audible alarms would turn on to signal an alert of the danger. A message could also be sent to a customer's phone, a central computer or alarm system to escalate the alarm. Charging points will have sensors to detect dangerous fumes associated with a leaking battery. The charging point will trigger a graduate series of alerts depending on the level of fumes detected. The lowest level would involve sending a message to a customer or central monitoring system. The highest level would turn on visual and audible alarms as well as ventilation fans.

Charging points will be designed to allow two-way flow of electricity and include an optional inverter. This will allow TMA's, UTMA's or trilers to provide electricity to the residence in which the charging point is installed. This could be for emergency purposes when mains electricity is not available. Or, this could be a way to shift the load on the electricity grid. The battery packs could be charged during off-peak periods and/or by residential solar electricity. The battery packs could then provide all or some of the power used by the residence during peak periods. This also provides a way to improve electricity infrastructure in developing countries. Battery packs could be charged at central service stations, collected by a customer in their vehicle and driven home where they plug their vehicle into the charging point at their home and use the electricity available in the vehicle to power their home. The vehicle's battery control system would reserve enough power to return to the service centre. The customer could also specify a larger reserve if they intended to do more driving than normal before returning to the service centre.

Some Battery packs will have a fast charge capability (FCBP) which has a special slot in the car/bike or vehicle to accommodate it (an FCS or fast charge slot) which can only take FCBP's which will have a slightly different shape and plug connections so other BP's cannot be installed in these slots. This type of charging will be done through a separate plug a fast-charge EVR plug (FEVR) with its own unique shape. (With many battery technologies fast charging reduces the lifespan of the battery. FCBP's are designed to take fast charging and may utilize super capacitor technology and/or battery technology that can handle fast charging. This system will ensure that users consciously choose to fast charge with the recognition of the issues associated with this.) The computing systems in the battery pack and charging point will manage the fast charge to minimise the damage caused by doing this. The charging point user interface will allow users to select the extent of fast charge. The charging point will recognise when fast charge is being used and will reflect this in the data it returns to the control system and to the electricity supplier. This will allow a premium to be charged for the fast charge feature. This premium could be used to cover the cost of replacing battery packs earlier than their normal lifespan.

Charging cradles at triler parks or service centres will be simplified charging points. They will not require the full billing logic, user interface or monitoring for fire or dangerous fumes. These will be handled by the warehouse system. They will also not have a flexible plug as the TMA or UTMA will slide onto a fixed plug.

The vehicle battery system encompasses the computing systems that manage battery pack usage in trilers and on-board vehicles, as well as the interface the driver interacts with in the vehicle and the integration into the vehicle's energy management system. The vehicle battery system manages discharging of battery packs to power the vehicle or to charge built-in batteries. (A triler may also charge batteries in UTMA's on-board a vehicle.) When entering a triler park or service centre the vehicle battery system will communicate with the service centre's management system to indicate how many TMA's/UTMA's should be swapped. This ensures that the TDS servicing the vehicle has the necessary number of UTMA's.

The vehicle battery system's user interface is provided through a touch screen in the vehicle and/or a smartphone application. (Small scooters may only have a smartphone interface.) The user interface provides the driver with information about current battery usage, estimated remaining travel distance and time, details of charge remaining and number of UTMA slots filled. It is through this user interface that the driver is able to indicate how many UTMA's they want to have replaced, removed or added to the vehicle. This can be done prior to or after entering a triler park or service centre. Once TMA's/UTMA's are added to the vehicle, or a triler is attached, the driver enters the payment confirmation code in through the vehicle battery system's user interface to authorize their usage of the new battery packs. The payment confirmation code may be entered by typing it into the user interface. It could also be loaded onto a smartphone application when payment is made with the smartphone application communicating the confirmation code to the vehicle battery system.

Triler parks or service centres will have a central management system and two subsystems. One sub-system will manage the warehouse and the other will handle billing. The central management system will handle inventory control, communication with the central ITS control system for the region and communication with vehicle battery systems. It will indicate to trilers where they should go to be charged and release a charged triler to go to a vehicle. It will store a map of the environment that it communicates to trilers, TDS's and TMA's when they enter the service centre. It will manage charging of trilers. It will also manage energy usage for the entire site, cooperating with the warehouse sub-system. An important part of this energy management is to ensure the site does not draw more than its allowed maximum current and to optimise battery charging to take the best advantage of off-peak periods of electricity supply. This system will use learning algorithms to optimise the availability of battery packs to suit demand at the location. The central management system will be able to automatically lock down all trilers in charging or storage locations in the event of severe storms.

The warehouse sub-system manages charging, storage and delivery of TMA's and UTMA's. It will collaborate with the central management system to optimise charging of battery packs. It will make use of a distribution system such as conveyor belts, fixed robotic arms and service centre robots to move TMA's and UTMA's around the warehouse. The charging cradles in the warehouse will monitor the charging process to optimise battery life and to prevent batteries overheating while charging. The warehouse itself will be fitted with multiple sensors to detect fires, dangerous fumes or unauthorized intrusion. Detection of a fire will trigger a fire suppression system and visual and audible alarms. Detection of dangerous fumes will turn on exhaust fans and trigger alarms. Detection of intruders will trigger alarms and a message warning intruders of the dangers in the warehouse.

The billing sub-system determines the correct amount to charge a customer when they swap TMA's, UTMA's or trilers. Customer billing will be based on the cost of providing the energy needed to fully charge the battery packs or a fixed price for exchanging a specific type of battery pack. The billing sub-system will integrate with payment gateways to allow the customer to pay for their bill and will provide the payment confirmation code that the customer will use to authorize their use of the new battery packs they've received. The billing sub-system will provide an application program interface to allow it to integrate with a triler park or service centre operator's accounting system. The billing sub-system will report billing details to the central control system for the region.

Small recharging centres will be designed to provide users of the system the ability to recharge their vehicles while travelling. The primary target market would be small vehicles such as motorcycles and scooters. The recharging centres would include multiple charging points where customers could connect their vehicle to recharge. It is expected that this would primarily be used for fast charging but regular charging would also be allowed. Small UTMA's as used in motorcycles and scooters would be available at these recharging centres. Customers would be able to manually swap UTMA's. These recharging centres would incorporate the service centre billing system to allow customers to pay for their recharge or UTMA swap. When swapping UTMA's the same payment confirmation system would be used as at a service centre. It is expected that customers would be charged a premium for charging at these centres. The premium would be for both fast and normal charging, it could be different for each type of charging. The premium could cover the cost of replacing battery packs that had reduced lifespans due to fast charging and to cover the opportunity cost of having a vehicle occupying space at a charging centre for a long period of time while performing a regular charge.

Each licensed region will have a central control system. All of the other components of the system are able to operate independently of this central system. This means temporary communication problems will not disrupt the overall system. The central control system manages the accounting for the overall system, coordination of all the triler parks and service centres in the region and analysis of the data collected throughout the system. Billing data will be collected from charging points, triler parks and service centres. This will allow the accounting sub-system to generate the accounts for the license holders in the region. This central control system will collect inventory data from every triler park and service centre in the region. It will determine if battery packs need to be transferred between centres, for example if some centres are running low and others have excess. The central control system will schedule the transfers as needed. There will be a data analytics package that collects data from charging points, triler parks and service centres. This will include usage data and conditions of battery packs. The data analytics package will be used to optimise the overall functionality of the system.

Regional central control systems will communicate with a global control system. This system will be used to generate auditable accounts for all international operations. It will also have a data analytics package that collects the data from each region for global optimisation of the system.

The business process described in this patent can be extended to include any devices that could be electrically powered, providing a battery swap facility. Vending machines could provide small battery packs for power tools or mobile devices. A robotic arm in a vending machine or in a kiosk in a store could open sealed devices and replace the battery in devices which do not have user replaceable batteries (e.g. the iPhone 6).

Key to triler and UTMA/TMA architecture is the concept of separate battery packages. Packages are partitioned into charging blocks so that as one section of the battery pack runs down another section can be used to provide charge while the run down section is replaced or recharged. This means fuel powered trilers which have a motor driven generator for recharging can have that motor operate at its optimal speed for the whole time it is in use. The generator does not provide power directly to the power train, so it does not have to vary its revolutions according to the amount of power that the car requires. The electric car will run purely off the power from the batteries and generator will simply recharge any empty/rundown battery packages.

This means that the engine can operate at the best speed/revolutions for optimal energy efficiency. Any suitable high efficiency electricity generating system can be used including diesel, petrol, LNG, gas or hydrogen. The other feature of importance in this respect is that the engine is charging one battery package at a time. So it doesn't need to be a very high capacity unit. The generating system will (for small cars) need to provide 10-15 KW per hour. A small, high efficiency engine and generating pack would suit.

Triler capable vehicles, particularly cars, would have a spare wheel for breakdown purposes (along with the jack and tool kit) stored in a compartment under the front or rear of the vehicle. This could be lowered using and electrically powered jacks/screw devices so the spare wheel can be raised or lowered electrically and then swung out to the rear or side to allow easy access to the wheel, jack and tool kit. Car trilers have dual wheels but can travel on one or two wheels and so don't need a spare. Larger trilers have the spare mounted on the rear (end away from the draw pins).

The triler and TMA can be used together with a vehicle being fitted with TMA's and having a triler attached at the front and/or rear and the Triler being replenished with TMA's. Large trilers and particularly those for mining, earthmoving and agriculatural operations could have a triler which has positions for 5-8 TDS supplied TMA's that can be replaced the same time as TMA's in compartments in the vehicle/machinery. Tractors would have positions for side trilers and 5-7×50 KWH units could be stored where the engine & fuel tanks used to be. These would be designed for easy access, for example facing forwards in order that a TDS can come to the front of the tractor and quickly/easily swap over the TMA's. TMA's on the sides of these machines could be in compartments that are built onto extendable arm shaped apparatus/assemblies that pop out or extend when the TDS comes near to allow easy swaps. (The TDS and extended arm apparatus communicate wirelessly).

The standard car shape with a front bonnet provides a location to place U/TMA carriers in the ex-engine bay. Electric vehicle engines are most efficiently located at the drive wheels and not in a central engine bay. The areas over the car's front wheel arches could have 2×3-5 KWH onboard residential batteries/capacitors fitted one over each wheel/side. The space between the wheels where the engine used to be has a TMA holder. This has the capacity to hold 10×2-3 KWH TMA's in stacks in a TMA carrier. This is mounted on a lift system (hydraulic or electric) with the bonnet attached to the top of it. At a command the bonnet unlatches and the carrier (complete with bonnet on top) rises up from the engine bay exposing the TMA's for easy replacement.

The concept of using the passenger vehicle engine bay as a storage position for Unwheeled TMA's (UTMA's) means that a standardized TMA of say 2.5-3 KWH could be produced. These would then fit into any car which has any UTMA or ex-engine bay carriers (EBC). Cars fitted with the system have 2-3 resident battery systems (two of these could be positioned over the front wheel arches) plus an EBC. The EBC would comprise of 10-12×UTMA compartments/slots mounted on a lift system. They are in two rows of 5-6 slots/places. The slots and all the UTMA's that fit into them are standardized (all the same). At the press of a button inside the vehicle the bonnet unlatches, the front section of the car folds out and the EBC (with the bonnet attached to the top) rises up out of the engine bay. The TDS can then service the EBC remove any used UTMA's and replace them with fresh ones. Because these are of a standard type and size they will fit in any car thereby reducing production cost. The can also fit into a standardized model triler. So the triler can have carrier positions for 6-7×UTMA's. This means that even before cars are built to use UTMA's they can be in use on trilers.

The front of the car has an air vent/grill to allow cooling air to flow over the system and to provide cooling air for the air conditioning condensers (these will be located behind the EBC). The EBC battery compartments have vents to allow cooling air to circulate. The electrical connection in each compartment is equipped with a cover to protect it from the elements. This cover has a top spring loaded arm that extends into the battery compartment. As the UTMA comes close to the cover it pushes against the arm pushing it against the top of the cover causing it to rotate up on its hinge and lift the cover. Once the cover is lifted the arm continues to slide over the top of it without effect. When the TMA is removed the cover which is spring activated closes and seals the connection slot.

The concept of standardized (unwheeled) TMA's for use by passenger vehicles can greatly extend the concept of using a triler as a base for TMA's (especially for cars) by using trilers to carry them.

The UTMA's would load from the side into the triler. It would be equipped with an electric system to drop the sides and open the compartments and a lift system (using hydraulic or electric worm drive) which lifts the battery compartments up as required so the TDS can service them. The sides fold down; the battery compartment lifts; it then opens so the TDS can remove and replace used UTMA's. After both compartments have their UTMA's replaced the doors on the compartments close and it returns to its usual position. This does not in any way effect the collision minimization system. This uplift mechanism can still be employed and utilized to protect battery compartments/UTMA's.

In respect to technical requirements for trilers in this application. These triler could be freewheeling (so they do not need to be powered and could be moved by TDS's with tow hitches to their hook-up/park positions. They will not need to dock as the batteries in them are charged in UTMA ports. Thus the triler in this application is simply a battery carriage. It does not need steering hubs; electric hub motors; computers for guidance systems; video cameras for collision avoidance and parking systems. It will need to link in to the vehicle monitoring systems to monitor the charge in UTMA's plus other normal triler features. This is a fast, easy way to promote the adoption of trilers and UTMA's into the market place and conventional electric vehicles can switch to this aftermarket triler and UTMA(s) immediately.

The UTMA's used in this application can still be unlocked using activation codes and the electrical harness linking the triler to the car's computer carries orders to and monitors the individual UTMA's.

Farmers could use solar panels to generate the energy to power their systems but given the large draws of electric tractors (250-350 KW/hour) the better approach is to be attached to the grid. This enables any solar power produced to be used or pumped into the grid. This also enables solar power developed elsewhere to be used and finally allows the use of off peak load from generation stations that have surplus power. The loads required are high but for short periods. Farmers with different crops and in different regions plant, plough, etc. at different times, meaning solar power can be used by various farmers over different sites.

Unique plugs (for example possibly square) will be used if power is from EVRE supply and system licensee so customers can easily recognise supplies that can charge all electrical batteries—trilers, wheeled and unwheeled TMA's and on-board built-in systems as opposed to just resident built-in systems if regular power is used.

There will be licensees for supplying electricity to mining, in-office networks, accommodation providers, in home EVRE recharge supplies and agriculture, as well as service stations/triler park suppliers.

Plugs linking the Triler and TMA's to the vehicle can be either from the triler/TMA to the vehicle or vice versa. Triler plugs may initially be plugged in by hand and have a power cord to carry the power. It is envisaged that eventually automated plugin systems will be used on all trilers/TMA's and be plugged in from either the vehicle/host to triler/TMA or from the triler/TMA to the host. The host carrying plugin system reduces plug costs as a single plug that can then plug into a hundred TMA's. The rear number plate projectors can have the old plastic shapes system to form number, letters, etc.

The bearing service on the pin that has the motorcycle triler lower arm assembly attach to it (i.e. the lower arm support pin or LAS pin) has or can have a nylon/plastic or synthetic cover on it to reduce friction of the lower arm support assembly on the LAS pin.

TDS's will eventually be able to carry 10-12 TMA's. Most wheeled TMA's will become obsolete as TDS's take over. Trucks and articulated vehicle will probably be equipped with slots for multiple TDS delivered TMA's and/or with articulated arms/carriages that fold out to receive multiple TMA's from the TDS and then load them into the vehicle themselves. The carriage would fold out collect/pick up the TMAs then fold in and plug them in.

Another key feature of the triler, TDS and TMA systems is robotic handling of the charging process. This means that robots whether they be trilers, wheeled TMA's or TMA's carried/moved by TDS's, carry the battery package to the charging point, and then take it to the vehicle to replace the used/spent batteries. Any battery that is suitable for this work can be used including sealed lead acid and lithium ion batteries, or supercapacitors. Service stations can have boom gates to allow access in and out of transfer sites and use card systems—swipe and preloaded charge/credit cards and access accounts so a customer can enter the swap area, change TMA's, possibly pay automatically at the exit boom gate that then opens automatically after the bill is paid. They can also preload debit cards so the deposit for TMA's and trilers they need to hire is available. People can also have TMA/triler activation codes loaded directly to their smartphones by wireless technologies such as near field communications (NFC), Bluetooth or wi-fi. Hire fees also cover maintenance.

Motorcycle trailers with 2 wheels could be converted into a form of triler for people who want to carry luggage. They could hook onto the triler pins or the triler support arm axle pins.

SUTMA's (UTMA's built in a standardized format) would have the same external dimensions. They would have a handle so a person or TDS can latch onto them and remove/replace/insert them. They have a strong plastic/metal outer casing to protect the batteries inside and air vents and active cooling, if necessary, to cool the batteries and have a plug fitting point at the rear end to automatically fit onto a plug which they slot onto when they slide inside the carrier. They SUTMA has small runners/wheels at the bottom and/or sides to slide them over the floor/sides of the carrier slot. It would have a computer system to communicate with the other computers in the system; to monitor the remaining charge and a switch system to use/activate the activation codes supplied by the charge site suppliers/service station/triler park. There would be a locking catch/point on the plugin end of the UTMA and a lock release mechanism so the carrier, UTMA and TDS can all release the lock.

SUTMA's would come in standard models so for example Model 1 is 2.5 KWH; Model 3 is 3 KWH etc.

Removable boot/trunk mounted UTMA carriers could be built and fitted (with electrical connections) for these standardized UTMA's (SUTMA). Boot Mounted Carriers (BMC's) could have a bracket and a standard connection fitting to connect them with the car's electrical system which is bolted into the boot for the BMC to mount into. If the car has a lip on the trunk that impedes access they would be fitted with a lever (or alternatively an electric tilt/lift/extend device) to lift them/tilt them upwards so UTMA's can be fitted. (An electric worm drive could push a bar that pushes UTMA carrier section forward (the carrier would have runners under it) so the front section of carrier with small wheels under it goes up a ramp and its front lifts and tilts at the same time. A manual lever would do the same thing. Pulling it would pull the carrier forward, part of the lever would have an L-shaped on the end to lift the carrier and once lifted the lever would lock in place while the UTMA's are replaced. The carrier part of the BMC would able to be removed when not in used and fitted into its bracket again when required.

Trucks and Vans can have UTMA carriers fitted in their engine front/rear areas.

EVRE Plugs—Computer/Electric Requirements

The EVRE plug requires a few additional features. The EVRE plug for trilers or vehicles has the ability to charge the on board systems plus any swappable exchange system. Therefore it may have/require more than twice the capacity of recharge than if it was just charging the on board systems.

This means it must be able to access, and the wiring must have capacity to draw, sufficient power to charge all the batteries simultaneously. The computer control system will distribute the charge to the different battery blocks. The switching gear and cabling will need to be able to draw large amounts of current and direct it to each battery requiring charge.

This means that if the power is coming from the triler plug to the vehicle this connection needs to have the ability to carry this power. The power being supplied to the triler EVRE plug to fully recharge the triler, car supplies and if it has a EBC or RTC to charge it as well. The triler computer system is able to communicate with other computer systems in the car to distribute the power to the different charging blocks and electrical cabling must be in place for this to happen.

Every triler, TMA, UTMA and battery carrier system will have a computer system and a unique identifier/number. All UTMA computer systems will know their ID and notify this ID to the charging station when they start to charge (if in a triler it does the notifying for all UTMA's on board). The charging station will know if it is charging a UTMA for a car, for an agricultural triler, mining equipment or transport UTMA's. This will enable charge backs of unauthorized hook-ups to licensed providers. So, for example, if an agricultural operator charges a transport TMA on his farm. If the agricultural license is with Co A and the transport license is Co B then Co A will pay a makeup payment to Co B (e.g. 10% of the bill and the customer probably won't even know it is happening).

Similarly if the power is coming in to the EVRE plug on the vehicle it needs to be distributed to the triler and other systems and the computer systems on all systems need to be able to communicate with each other.

As a theft deterrent a system where the customer pays before supply could be instituted. TDS's on the tarmac could be locked on rails with an intermediary system collecting UTMA's from charge sites and loading them into the TDS in the warehouse which then drives out onto the tarmac. UTMA's would all be locked in the TDS. An activation code would be issued to the driver and the TDS would come alongside their vehicle. The driver would take out the first UTMA to be replaced from his car and insert it into an empty slot on the TDS. It would then release the first UTMA. It would have lights at the top of the slots so the light for the slot being released would glow. The UTMA would be removed and put into the vehicle and so on. The replacement would all be activated by using the activation provided to the driver.

Trilers and TMA's are wired in such a way as to prevent them shorting at any time or in an accident to prevent explosions. They can use any battery type provided it is safe for use in a transport environment. Battery partitioning means that a person can run down their resident supply and then recharge it at night or using solar panels attached to their roof. Triler mounts for attachment of aftermarket systems will be made with two receptacle cylinder assemblies attached to a metal frame which bolts to the frame of the car underneath/in front of the front/rear bumper and has cables that plug into the triler and link/connect it into electrical system, the resident car batteries and comes with an in-cockpit (in the car) control panel and monitors.

Normally, in the TMA charging system, a locking and unlocking system may be provided such that in only one battery can be removed and that battery will normally require replacement into the system before another (normally and adjacent battery) will be unlocked for removal.

The Stepped Rollout Process

Step 1. Vehicles have aftermarket RCHA brackets fitted to allow them to pull trilers. At the same time trilers with attached generators, built in resident batteries and carrier positions for standardised TMA's appear.

Step 2. A group of service stations starts to stock standardised UTMA's (which are light and easily inserted manually into UTMA carriers on trilers) and charging systems even before TDS's arrive.

Step 3. TDS's start to arrive at service stations with automated warehouse facilities to charge and store UTMA's; dealers/manufacturers start to mount RCHA brackets/triler points as standard equipment on electric vehicles; the first triler parks start establishing.

Preferably, there are a minimum of two hard wired ways of communication with a battery pack one at the ends and one at the sides (2 long metal strips which brush a contacts) so if the battery is not properly inserted, it can advise the host slot. There may be three contacts on the end indent with transport slot; charging slot or host/car slot.

Clearly the present invention is not limited to the use of wheels and other transport systems such as tracks or the like may be used.

FIG. 1 shows a car triler 101 of a preferred embodiment (not connected to a vehicle) with the park wheels 102 extended and the park wheel assembly 103 locked down. The front has the triler draw pins 104 and brackets 105; rest pads 106 behind the pins 104 and on the front of the breaker/spacer unit 107; plug in port 108 for the connection plug from the vehicle to the triler 101 and the breaker space unit 107 to allow the triler to survive sharp impact in the event of an accident. The up-down hinge 109 is behind that for allowing the triler to flex up and down and move if it goes over rough terrain and then the basic double battery compartment with two sections that are hinged using hinges 110 with the frame at each end and to each other via hinges 111 in the middle to allow the two compartments to rise in the event of an accident with the leaf springs 112 (shown) to return them to the standard position. (Some suppliers may choose to use a single compartment without the accident and pressure reduction system). The leaf springs 112 have expansion/compression slots 113 to allow them to slide freely relative to the bolts holding them to the battery compartments. The bolts are self-locking and a space is left between the bolthead and the spring for free movement. The front bolts 114 are of the style so that the boltheads break off when their maximum load capacity/pressure point is reached.

The battery compartments are covered in plastic to weather proof them and have plastic covers. The triler has a strong rear frame 115 (which contains the controller/chip/computer controlling it) with a remote plug in wand 116 (if required as the triler can also be plugged in with the square plug 117) for plugging into the power source in the triler park and the digital camera assembly 118 (visible in retracted mode) that lifts up out of its storage space for navigating the triler when free from the vehicle. This rear frame 115 can slide inside the side walls 119 in the event of an accident and the side walls 119 can open to allow delivery systems access. The rear frame 115 is hinged to the pipe chassis 120 it can slide/concertina together at the bottom with the floor on top of it. Shown along the side walls 119 is the control and monitoring panel 121 and the 7 pin square plug 117 that plugs the triler into a controlled electric vehicle range extender (EVRE) home or office power source (which can charge any trilers, TMA's and all electrical systems on a vehicle). Underneath the triler is the wheel assembly 122 with a central swivel/pivot point 123 that contains hydraulic or electric motor steering system that can steer the triler when free of the vehicle or work in conjunction with the electrically controlled steering of the vehicle. The wheels have electric hub motors 124 for powering the triler in forward/reverse in the system shown.

Figure 2:
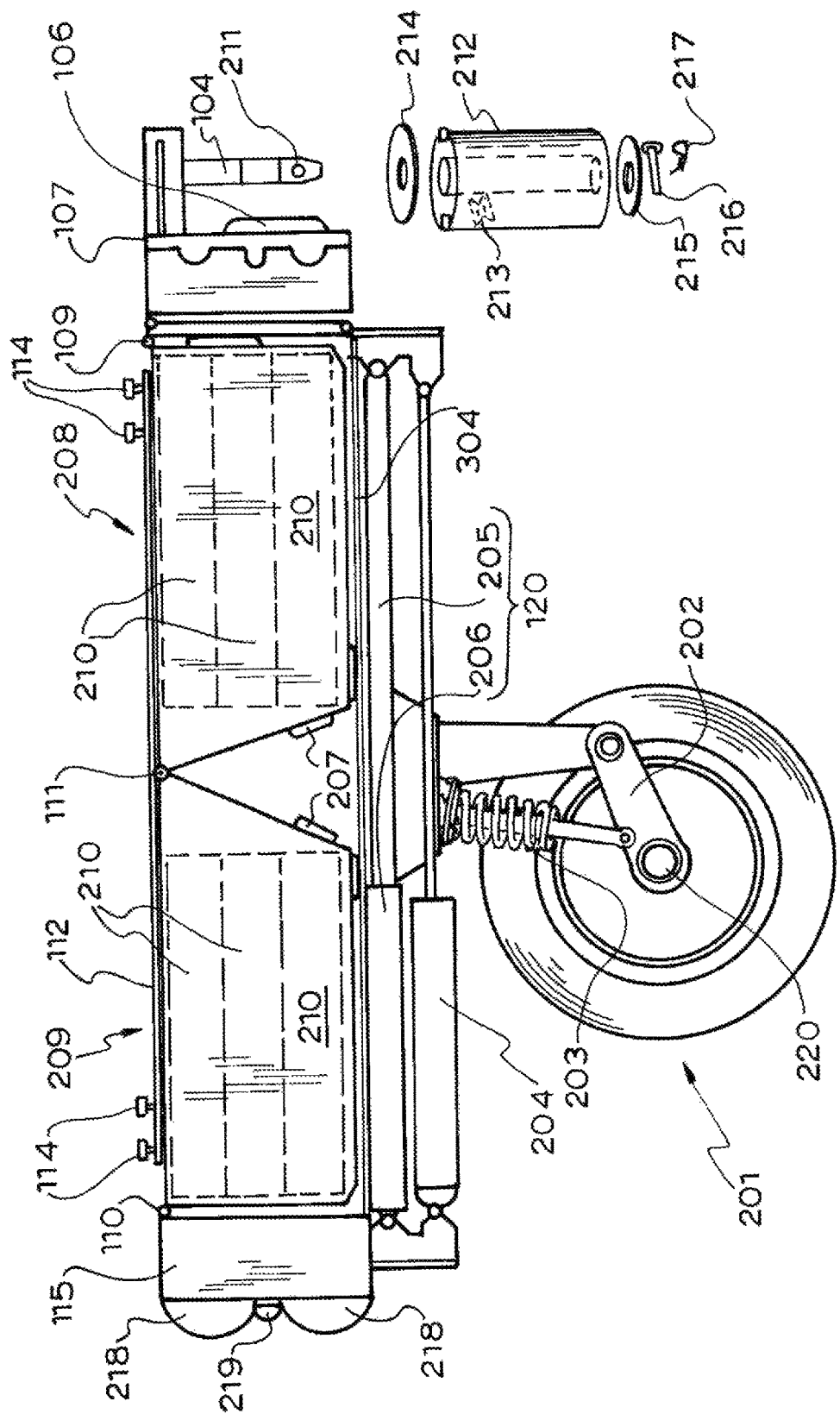
FIG. 2 shows a version of the triler illustrated in FIG. 1 in drive mode with the wheel assembly clearly visible (and the park wheels not shown).

FIG. 2 shows a version of the same triler in drive mode with the wheel assembly 201 clearly visible (and the park wheels not shown). It shows the pivot arm 202; McPherson strut 203 with a shock absorber 204 and spring; wheel with axle 220; under floor pipe chassis 120 with inner front pipe 205 and rear outer pipe 206 and the shock absorber 204 (one is positioned on either side of the Central Wheel assembly (CWA 201). Also shown are the leaf springs 112; rear frame 115; bumpers 106, resilient pads 207 between the forward battery compartment 208 and the rear battery compartment 209 containing batteries 210; up-down hinge 109; breaker spacer unit 107; draw pins 104 with transverse opening 211; and compartment floors (front and rear). The receptacle cylinder assembly 212 and the bolt bracket 213 that bolts it to the vehicle frame along with plastic top washer 214 and bottom metal washer 215 and locking pin 216 with spring clip 217 can be seen. The two compartments 208, 209 for batteries 210 which also function as slots for UTMA's.

The front up/down hinge 109; the breaker spacer 107; the draw pin bracket 105 and draw pin 104 and a receptacle cylinder/assembly 212 that accepts the pin 104 has a plastic washer 214 that fits on between the bottom of the pin bracket 105 and the top of the pin receptacle. It also shows the rear frame and padded bumper 218, rear parking camera 219 and the shock absorber(s) 204 that lessen the impact of collisions and the front 205 and rear 206 pipe frames of the floor assembly that concertinas each other as floor absorbs accident pressures.

Figure 3:
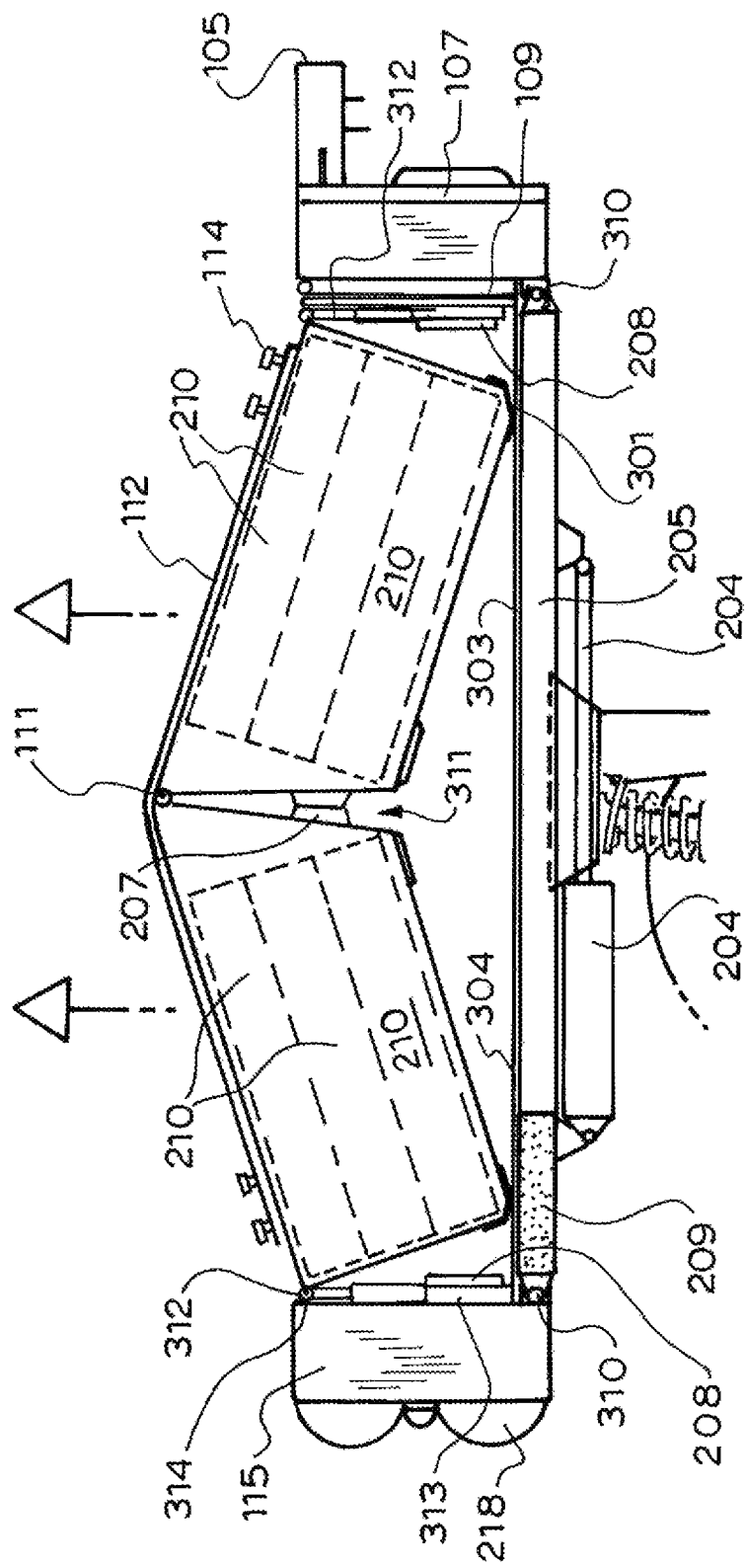
FIG. 3 shows the action of the Triler illustrated in FIG. 1 in a collision.

FIG. 3 shows the function of the Triler compartments in a collision. First the bumpers collapse. The strong rear frame 115 of the triler is pushed forwards causing the skids 301 on corners of the battery compartments to slide along the floor plates as the compartments are forced upwards by the pressure. The floor plates 302 are shown as the front floor plate 303 slides over the top of the rear floor plate 304 in an accident. The UTMA carrier slots 210 are shown in each battery compartment (one may be kept as spare for a resident battery), 3× standardized 2-3 KWH UTMA slots in each compartment (5 working in total on a triler).

There are rubber pads 207 between the inner sides of the battery compartments to ease stress between the compartments in the event of an accident and rubber pads 208 between the ends of the compartment and the sides/ends of the triler for the same reason.

The rear 206 and front pipe 205 of the pipe chassis is shown where the front pipe 205 can slide inside the rear pipe 206 in an accident and wadding 209 (sawdust/paper pulp) is placed in the end of the rear pipe 206 to absorb shock. There is a shock absorber 204 under the chassis to reduce the impact. The CWA 201, wheel and the hinges 310 at the ends of the pipe where the pipe hinges with the rest of the chassis is also shown.

The leaf spring 112 is shown on top of the triler as are the front spring bolts 114 which lose their heads if the pressure becomes too great allowing the front of the leaf spring 112 to flap free. The PFA point 311 where the maximum allowable amount of safe movement of compartments is reached and they touch is indicated. The front section of the triler and the sprung sliding hinges 312 (with the springs 313 and the slots 314 that they slide in) at each end of the compartments is shown. In a collision they rise under pressure which allows the compartments to rise with them.

Arrows are also shown to indicate where the compartments can continue to rise after the PFA point has been passed further ensuring the safety of batteries/UTMA's in the compartments.

Figure 4:
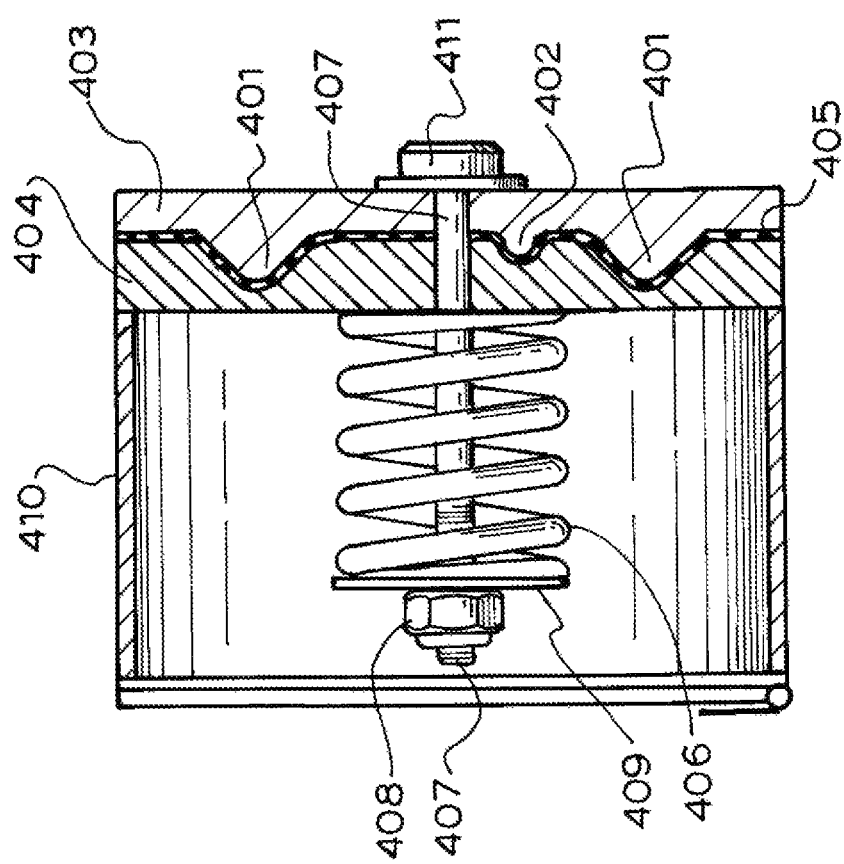

FIG. 4 shows a cross sectional view of the Breaker Spacer Unit 107 according to a preferred embodiment. This normally fits between the triler draw pin brackets 105 and the Up-down hinge 109. It transmits the force of the vehicle though the triler so the brackets, case 410 and plates are of strong/solid construction. It shows the cones 401 and knobs 402 in Plate 1 403 which have corresponding indentations in the facing Plate 2 404 with glue/epoxy 405 binding the two plates 403, 404 together. There is also a heavy spring 406 (shown) that keeps the plates 403, 404 together in normal circumstances but releases them in an accident allowing the vehicle to be protected and the plates to sustain damage. The spring 406 is mounted about a bolt 407 having a head 411 at a forward side of the unit 107 and a locking nut 408 with spring plate 409 at the other end.

FIGS. 5 to 7 shows the Pin Receptacle Cylinder Assembly (PRCA) 212 in more detail. This consists of the Receptacle Cylinder (RC) 501 shown in FIG. 5 and the Receptacle Cylinder Holder 502 (RCH) in FIGS. 6 and 7 that will be attached/bolted to the chassis of the vehicle with the vehicle attachment brackets or to the RCH attachment bracket (towbar apparatus) which is fitted as an aftermarket item for existing electric vehicles.

FIG. 7 shows the metal case 701 with a recessed lip 703 defined by an upstanding perimeter wall 704; the threaded holes 702 for bolts to hold the RC 501 in place and a clear view of the slots 503 on the inside of RCH 502 also shown in FIG. 6. The slots 503 are to allow the bolt brackets 503 on the bottom of the (RC) to slide through the inside of the RCH 502 when the RC 501 is being placed inside it.

The RC 501 is a consumable item so it wears and can be replaced. The bolts to hold the RC 501 in place pass through holes 511 the RC bolt brackets 503 and screw into threaded bolt holes 702 in the RCH 502 and use spring washers or self-locking bolts to secure them. The RC 501 has rubber fill 510 shown that allows the pin pipe 512 defining the bore 513 which goes all the way through the RC 501 to move under pressure. A flange 515 shown at the top but there is also one on the RCH bottom keeps the rubberized fill 510 in position. The RCH 502 has a lip 517 indented into a recess at its top. This recess allows the bolts in the brackets on the top of the RC to stay below the top of the assembled PRCA thereby allowing a plastic washer 516 (shown) to sit on top of the assembled PRCA and prevent any friction between the bottom of triler pin bracket at the front of the Triler and the PRCA.

FIG. 8 shows the up-down Hinge spring (UDHS) system according to a preferred embodiment (without the breaker spacer present). The UDHS hinge allows the triler to move up and down in relation to the hitch bracket while the triler draw pins 104 remain firmly in the RCH slots. It also allows limited side to side movement. The UDHS consists of a double hinge system with one arm of the upper, forward hinge 801 hinged on the next arm of the lower rearward hinge 802 beside it. There are rubber pads 803 between each of the leaves/arms of the hinge spring and each side is attached to its respective side of the triler.

A spring 804 behind the hinges 801, 802 pulls them together. A bolt 805 goes through the spring 804. At one end of the spring 804 is a base plate 806 for the spring 804 and at the other end the frame of the triler (or Breaker Spacer Unit frame if present), the bolt 805 and plates are secured with a lock nut 807, rubber washer 809 and spring washer 810 system. There is a spring on either lateral side of the UHAS and a shock absorber 811 mounted to a mounting arm 812 in the middle between them. If required more shock absorbers (and/or springs) can be fitted. The Triler frame 813; draw pin 104 and hole 211 in the draw pin 104 for the locking pin (not shown) can also be seen.

FIG. 9 shows the cover lift system for lifting a plug-in cover so a TMA or UTMA can form an electrical connection. The cover lifter (CL) 901 has an extension arm 902 which can be on the triler, TMA or UTMA which pushes against the Cover lever 903 at the top of the cover causing it to hinge upwards about the hinge 906. The extension arm 902 could be mounted on the triler, TMA or UTMA or inside the UTMA slot so that as the UTMA slides into the slot it pushes against side arm 910 of the cover lifter pin 902 causing it to push the cover lever 903. In this case the cover lifter pin 902 would be sprung using a spring 907 so that once the pressure is released it withdraws, stops pushing the cover lever 903 and the cover 904 then closes. The cover protector 905 protects the cover 904 from damage while it is open. The Cover lift system works if the plug is on the TMA/UTMA or if the plug in in the slot it goes into and plugs into the TMA/UTMA. The cover 904 is provided with a sealing plug 908 and drain ports 909 to allow water to drain. Assemblies 911 are separated by a distance corresponding to separation of the cover 904 and the plug cavity 912. The plug cavity 912 is adapted to receive the electrical plug 915 such that the electrical contacts 913 on the plug 915 contact the electrical contacts 916 in the cavity 912. A seal 914 is provided with the cavity 912 to seal the plug 915 to the cavity 912.

Diagram 10 shows an electrically activated pin locking fork (EADPLF) of a preferred embodiment for locking a triler draw pin 104 into the receptacle cylinder 212. The electrically activated draw pin locking fork EADPLF 1001 is in-built in systems and comes from the car side of the RCH onto either side of the draw pin 104 into slots 150 in the draw pin 104. A small electric motor 1002 pushes the fork into position and pulls it out again as required via a connection rod 1003. A side electric motor 1004 pushes the locking pin 1005 through the holes 1006 in the end of the tines 1007 of the fork 1001 after it is in the lock position. This stops the fork 1001 coming out and locks the triler Draw pin 104 in place. The figure shows a pair of fork guides 1008 on the drive side and a pair of fork guide/pin support arm bracket 1009 that guides the fork 1001 into position as it slides in and also through which the locking pin 1005 slides (securing the fork 1001). It shows the support guides 1008 on the vehicle side of the assembly. This guide fits over a fork guide lug 1010 on the RCH that ensures the fork guides and RCH are correctly positioned in relation to each other. The figure also shows cutaway versions of the RCH 502, RC 501, the filler on the inside of the RC 501 and pin pipe 512 and hole 513 that the draw pin 104 slots through.

FIG. 11 shows a manual version of the fork locking system according to a preferred embodiment. In this case, the system is part of an aftermarket RCH Triler towbar hitch system which bolts on to the frame of the vehicle like an aftermarket towbar system under the back of the car. This has electrical connectors for the triler to plug into the vehicle's electrical system. The fork 1101 in this system needs to be manually inserted across the pin hole 1102 with the lever 1103 into the RCH/Pin assembly. So after the pin 104 has been inserted into the pin hole 1102, the lever handle 1104 is pushed causing the fork 1101 to be forced into the slots prepared for it in the RCH. A wheel 1105 on the corner of the lever 1103 allows the lever 1103 to slide along the base plate 1106 (a channel/guide 1110 along the side of wheel or the wheel's extended axle keeps the lever in position against the base plate). A swivel 1107 linking the fork 1101 to the lever 1103 allows them movement in relation to each other. Once the fork 1101 is inserted and the lever 1103 lies against the base plate 1106, a pin can be inserted through the hole 1109 for the locking pin in the lever locking bracket 1108, locking the fork 1101 into position. Again, guides 1111 are provided to guide the movement of the fork 1101 and the fork is biased into the free condition by a spring 1112 attached at point 1113 to the fork 1101.

FIG. 12 shows the triler pin an attachment system for the Mining Equipment Triler according to a preferred embodiment of the present invention. The triler is similar to the vehicle triler except that instead of an up-down hinge it has simply a hinge 1201 supported by a spring 1202 for upwards movement and a compression spring 1203 for downwards movement along with a lug 1204 and pin 1206 in addition to the triler pin which attaches the triler pin and backing plate assembly 1205 to the vehicle. Both the lug 1204 and triler pins have locking pins that secure them in position after they have gone into their respective receptacle hole. Shock absorbers 1207 mounted to a mounting plate 1208 are also used to minimize shocks. The draw pin support arm 1210 has a brace 1209. There is a gap 1212 into which the brace 1209 extends between the triler and the backing plate 1213 which is closely spaced from the mining truck frame 1211. The Triler, RCH units, pins, pin receptacles, braces and other equipment is appropriately engineered for mine work. (Like all trilers truck van and mining equipment trilers can be used as carrier systems for UTMA's). An access port 1214 is provided to access the lug 1204 and pin 1206.

FIGS. 13 and 14 show a van triler wheel extender for van, truck, bus and prime mover trilers according to a preferred embodiment. These vehicles, because of their configuration, may require front mounted trilers that are more vertical rather than horizontal. This means that when they are disconnected from the vehicle they may be unstable. The van wheel extension systems (VWES) simple allows the triler wheel on a van triler to extend outwards prior to unleashing the triler from the vehicle. So the central wheel assembly 1301 as illustrated in FIG. 13 has an extension arm housing 1302 underneath it which the triler wheel frame 1303 is attached to. (No details of suspension and/or other systems are shown). Inside the extension arm housing 1302 is the extension arm 1304. When activated firstly the housing then the extension arm extends pushing the wheel 1305 out in front of the triler. At the same time the kark wheel assembly (not shown) is locked down into position at the rear so that it too extends beyond the back of the triler at the rear. The triler is now stable and can then move away from the vehicle. Runner/wheels 1306 inside the extension arm housing 1302 ensure that the arm 1304 can extend smoothly. An extension arm support bracket 1401 folds down from the front of the triler as the extension arm 1304 is extended to support the extension arm 1304 and carry some of the load. Stop lugs 1307 are provided in the extension arm housing 1302 to abut the end of the extension arm 1304.

FIG. 15 show a spare wheel bracket for triler enabled vehicles according to a preferred embodiment of the present invention. Trilers 101 will mainly be attached to the back of vehicles via a triler hitch 1515. In passenger cars, this will probably impede on boot space which, if people are travelling will be used. Manufacturers fitting vehicles with triler mounts may therefore like to have the spare wheel stored under the vehicle. As there is going to be a triler 101 there when traveling, it would be better if this can be accessed from the side of the vehicle. Hence the spare wheel swing out compartment illustrated in FIG. 15.

The compartment illustrated has a pole hinge 1501 at one end (this is a hinge where the wrap around part of the hinge can slide up and down on the pole. The system is electrically controlled. When required electric motor controlled jacks 1502 at either end of the spare wheel assembly lower it from the vehicle. A spring mounted runner support frame 1503 is pushed down with the compartment onto two runner support brackets 1504. Preferably the runner support frame is hinged on the curb side of the vehicle and attached by springs to the bottom of the vehicle and the bottom of the spare wheel compartment. The support wheel 1505 under the compartment runs on the runner track 1509 as the compartment is swung out (using the handle 1506) by the owner. A tool box 1507 is mounted on the rear of the spare wheel assembly and as only the rear main wheel of the triler is down (the park wheels are still locked up) the compartment is designed to swing past the triler wheel between position 1 and position 2. The driver can then access both the tool box 1507 and spare wheel 1508. The compartment locks out if required and is unlatched to return it to position. Depending on country road regulations it will always swing out to the side facing the curb. When the job is finished, the jacks 1502 return the compartment to its travel position and the runner frame 1503 is pulled up by the spring under the vehicle.

FIG. 16 shows the elasticized locking pin system according to a preferred embodiment. This has a washer 1601 with an elastic band 1602 attached with a metal coupling at one end (similar to the metal clasp use in women's hair ties) and at the other end is the pin/bolt head 1603 again attached by a metal swivel clasp 1604. As illustrated in FIG. 17, the pin goes through the locking hole to lock the draw pin 104. The washer 1601 has a key 1605 on it that matches a slot 1606 in the draw pin it so it will only slot onto the draw pin in one position and the locking pin goes into the hole from the other direction. This as long at the band 1602 puts pressure on it the pin will stay locked into the hole 1701. The locking pin/bolt can be a universal diameter or the locking hole can be engineered to be smaller at one end 1607 than the normal diameter 1608 (in which case the pin has a smaller end and fits in with the smaller end first.

FIG. 18 shows and underside view of a wheeled Truck Mounted Apparatus (TMA) 1801 of a type suitable for cars/trucks/articulated vehicles. The TMA 1802 has small freewheeling "donkey' or castor wheels 1802 on the drag end (the end pulled along by the drive end). The drive end has a wheel assembly consisting of the steering/drive wheels 1803 (these are electrically driven/powered and steered); the steering mechanism 1804 and storage wheel cavity 1805 (when the TMA is on the vehicle or on charge the wheels can retract into the wheel cavity 1805 for storage.

Also shown are the power outlet point 1806; control and monitoring panel 1807 on the side and the clamping positions 1808 where roll clamps (not shown) hold/secure the TMA to the underside of a truck is shown. Also the clamp lock 1809 is shown where a locking pin from inside the TMA extends into the space provided to lock the locking bar which is on the roll over clamp arm into position preventing the clamp from releasing.

On top of the TMA is the digital camera assembly 1810. This consists of two cameras 1811 mounted on a frame and a lift system to lift it out of/above the TMA when in use. There is also an upward pointing point laser and detection system which is used for positioning the TMA precisely under the vehicle for lifting into position. Also shown are three of the 4 electric lift jacks 1812 that lift the TMA into position under the car/bus/truck. (The 4th is hidden by the wheels). They have small wheels/rollers 1814 on them allowing micro movement as the TMA positions itself while the jack 1812 raises it onto the securing pins from the truck. It then raises itself up onto the pins (securing pins) that go through holes 1813 in the TMA to hold it in the right position. Once in position the operator can put a washer over and bolts/lock pins as illustrated in FIGS. 16 and 17 through holes in the sides of the securing pins to lock the TMA in place.

FIG. 19 shows the roll clamp system (RCS) that holds TMA's under a vehicle according to a preferred embodiment. (The diagram looks upwards from under the vehicle) The clamp 1901 has an axle 1902 that is turned by an electric step motor 1903 via a worm drive 1905 so it can precisely position the roll clamps 1904. The RCS is mounted on a bracket 1906 at each end. The bracket 1906 has a rubber mount 1907 between the axle housing 1911 (which is greased and has bearings inside) and the bracket 1906. This is to minimize shocks on the TMA in travel over rough roads. The bracket 1906 is mounted/bolted on the underside of the truck bed. When the TMA is in position up under the truck, the RCS motor 1903 is activated causing it to rotate so that the clamps 1904 rotate upwards into slots in the TMA (shown in FIG. 18) holding it against the underside of the truck. Once the clamps 1904 are in position the pin 1907 mounted on a bar 1913 from the pin locking system 1908 on the inside of the TMA slides out and through the opening 1910 in the lock bar 1909 locking it in place/position.

FIG. 20 shows a top view of the TMA illustrated in FIG. 18. This time the Digital camera assembly 1810 is easily visible as are the covers 2001 which fold down to cover it when not in use. The clamping positions 1808 can easily be seen and the pin hole aperture 2002 that the sliding locking pin comes out of can be seen in the back locking aperture 2003. The electric steering mechanism 1804 is visible as are the funnel shaped tops 2004 of the securing pin holes (the securing pin holes go all the way through the TMA). The plug in wand 2005 is seen which plugs the TMA into the charging source in the triler park and the flashing light 2006 to provide visibility in the triler park. The TMA outlet (plug) point 2007 and cover 2008 can also be seen as can the front (drive) wheels 1803 with electric hub motors for powering the TMA around the triler park/tarmac. An EVRE connection point 2009 is also shown.

FIG. 21 shows the TMA illustrated in FIG. 20 from the side showing the mounting process using the jacks 1812 to the underside of the truck. The electric jacks 1812 are operating lifting the TMA up the securing pins 2101 which slide through holes 2102 in the TMA.

The rollers 2103 visible on the bottom of the jack feet 2104 allow to TMA to move slightly as it fits onto the securing pins 2101. The clamp ports 1808 and holes 1809 for the locking bars are clearly visible as are the funnels shaped entrances 2004 of the securing pin holes 2102; the wheel cavity 1805 for the drive wheel; the drive wheels 1803; "donkey wheels" 1802; the control panel 2105 and the pin support brackets 2106 on the bed 2107 of the truck; the truck bed 2107 and the foam rubber mat/cushion 2108 that separates the underside of the truck bed 2107 from the TMA (and provides cushioning for it).

FIG. 22 shows the Agricultural (Ag) TMA delivery system according to a preferred embodiment. The components are basically the same for all vehicle TDS's and comprise a sliding platform or housing 2201 on a wheeled transport system. The transport system can vary depending on application. In metropolitan use and in service stations/triler parks, the suspension and wheel assemblies may not need to be as robust as those for 4WD mining and agricultural triler operating in rough terrain. The TDS has a UTMA carrier/delivery pack (CP) situated on a sliding frame 2202 with a lifting system, the illustrated version of which is a hydraulically lifted X-Frame/scissor system 2299 which lifts the pack to the correct position in respect to the battery slot on the vehicle. A laser point source 2203 and sensor allows the TDS to reflect a laser beam off mirrors situated on the top/side of the vehicle carrier to locate the correct position for delivering the TMA. The TDS also has a camera 2204 for capturing digital images for navigation purposes; a computer 2205 for processing that information; a flashing light 2206 to warn people of its presence and aerials for receiving GPS 2207/Wi-Fi 2208 signals and large all terrain tyres 2209; the electric hub motors 2210 on the front wheels and the sliding bed which slides from side to side on wheels 2215 as the computer 2205 dictates to position delivery CP in the right position for inserting each and every UTMA 2211. (The carrier bed can also slide forwards and extend out towards the vehicle) The Plug points 2212 for the UTMA's are shown as is the conveyor system 2213 (there is one in each UTMA slot). Its role is to push the TMA into position in its slot in the vehicle carrier and also to remove used/empty TMA's from the vehicle which it inserts or receives in a space 2217. Insertion of a spent UTMA releases the adjacent new UTMA. For this purpose it has a push/pull hook 2214 on the front of it. The hook 2214 latches on to UTMA's in the vehicle to pull them out of their carrier and then pushes a new one into the carrier slot. The X-Frame electric powered hydraulic ram 2216 actuated scissor lift mechanism 2299 is shown which lifts the pack to the correct position for insertion. TMA insertion is computer controlled and uses a laser feedback loops for positioning a UTMA. (The Scissor lift system is a standard off the shelf purchasable item). Ag TDS's can be 4-8WD if required.

FIG. 23 shows the TMA suspension system for wheeled TMA's according to a preferred embodiment. This is comprised of a frame 2301 pressed out of 1-3 mm sheet sprung steel. The sprung steel frame 2301 forms part of the shock absorbing and spring system as it can in itself flex. The top of the frame 2301 has an indent/crease 2308 around the bolt holes 2302 to strengthen them and around the frame support of the shock absorber 2302 which is attached in the middle via a nut 2309. The frame 2301 has arms 2304 which reach down to where the leaf spring couplings 2305 mount a leaf spring 2317. The arms 2304 have a bend in them to form a foot 2306 and the sides of the foot 2306 are bent to form coupling brackets 2307 with holes in them to support the leaf spring couplings 2305. A bolt is passed through the bolt holes and coupling and secured with a spring washer, washer and nut (or washer & self-locking nut). The frame has small indents/creases 2311 in each arm to strengthen them and top around the site for the shock absorber. The shock absorber 2303 is bolted through a hole in middle of the top of the frame 2301 and the shock absorber foot 2313 is bonded/welded at the other end to the axle cover. The axle cover/plate 2312 rests and is bolted on top of the axle with U-bolts 2314 when the suspension unit is fitted. The axle washer 2315 fitted on the U-Bolt is bent to allow better attachment to the axle. 1×U-bolt 2314 (two in total) is fitted either side of the shock absorber with a lock nut 2316.

The Motorcycle TDS 2401 illustrated in FIG. 24 is designed for ferrying UTMA's from the charge/storage area to motorcycles. The one shown is for delivering manually inserted TMA's to motorcycle riders. Most motorcycle riders can insert TMA's themselves. Small 1-1.5 KWH systems are small and easily maneuverable and hence should not need to be inserted automatically. However if required systems to insert TMA's into the compartments on motorcycles can be produced. This system has 7×UTMA containers 2402. The containers 2402 can rotate on a central yoke 2404 around the central axle 2403 and individually tilt to allow the TDS to insert them into their charging ports in the Triler Park. The Carrier head can also slide up and down on the central axle 2403. The camera assembly 2405 is located on the top of the central axle 2403 and a chip is located in the base 2406 of the unit provided with electric powered wheels 2408. In each slot has a locking system to lock the UTMA in position until the one it is replacing has been inserted into another slot and there is a light 2407 on top of the slots to show which one is being released.

As illustrated in FIG. 25, the lower attachment arm 2501 on motorcycle trilers fit over pins/axles 2502 on either side of the motorcycle. These axles 2502 have a hole 2503 through them to take a locking pin with an enlarged head 2510 and bearing surface 2511 similar to that used on triler draw pins. The metal housing 2504 at the end of the lower attachment arm 2501 slots over the axle 2502. The housing 2504 is lined with plastic/nylon material 2505 to reduce friction on the axle 2502 and suitably greased. A Washer 2506 then goes over the axle pin 2502 and the locking pin 2507 is inserted through the hole 2503. Locking pin 2507 shown is the spring clip variety which is readily available in the market so the spring clips up or down. It is up for the pin 2507 to be inserted then the ring 2507 clips down over the end of the axle 2502 locking the pin in place (as the spring clip going over the axle stops the pin from getting free from the hole). The head 2512 of the locking pin 2507 is flattened on one side to abut the washer 2506.

FIG. 26 shows the front of a car 2601 with an EBC system installed. It appears as normal with a grill/air vent 2602 beneath a front panel 2608; bonnet 2603; bonnet flap 2604; Wheels 2605; wheel arches 2606 and over the top of each of the wheel arches 2606 it has a residential battery package 2607. The frame 2609 for the windshield is also illustrated.

FIG. 27 shows the same car front as that illustrated in FIG. 26 with the concealed UTMA carrier 2701 visible in dashed outline behind the front. It has UTMA compartments/slots 2702 for each of the TMA's and a lift mechanism 2703 at the bottom for lifting the whole carrier 2701 and bonnet system out of the car.

FIG. 28 shows the same car as that illustrated in FIGS. 26 and 27, with the UTMA carrier 2701 extended. The bonnet flap 2604 folds upwards and the front panel 2608 folds downwards. The lift arms 2801 then lift/extend the carrier unit 2701 with the bonnet 2603 sitting on top of it up out of the car allowing the TDS bringing the replacement SUTMA's to access the carrier slots 2702 in the EBC. The car body 2802 and the compartment opening 2803 are also visible.

The advent of standardized UTMA's means that a system of roof rack TMA carriers (RTC) can be built such as that illustrated in FIG. 29. The carrier 2901 can carry 5-7 SUTMA's in slots for the purpose. UTMA's because they are only 2-3 KWH can be manually/hand loaded or a TDS can be built to insert/slot them in. The roof rack carrier 2901 is fitted as an aftermarket item to a car 2902. Initially a customer will take their car 2902 back to the manufacturer to purchase a roof rack RTC 2901 attached using mounting brackets 2903 and have the connection lead plugin point (CLPP) 2904 which is under the back of the car fitted. The connection lead 2905 from the RTC 2901 to the CLPP 2904 is held to the side of the vehicle with suction caps 2906 that are made with a lead clip 2907 which fits over the lead 2905 and then is connected at either side to the suction caps which stick to the car. FIG. 29 shows the car 2902; the connection lead 2905 with suction cap connectors/holders 2906; the plug in point 2904; the RTC 2901 which is open on the roof with the cover 2910 up about a hinge 2911. Slots 2912 for SUTMA's 2913 with removal handles 2914 are provided also so a person/TDS can pull them in/out of their slots.

FIG. 30 shows the Motorcycle Triler 3001 of an alternative embodiment. It attaches to the motorcycle frame at four points, namely at the triler pins 3002 at the top near the motorcycle saddle/seat 3003 (which is basically similar to the embodiment illustrated in FIG. 8) and at the axle pins 3004 that are down near the rear wheel axle 3005. The axle pins 3004 are on an extension bracket 3006 which is attached to the bike frame. The bracket 3006 has a support brace 3007. The bike Triler has a single fixed wheel 3008 that has no steering capabilities.

Steering is by tilting the bike. The wheel 3008 has a spring 3009/strut/shock absorber 3010 system and the combination of triler pin, pivot arm 3014 and side attachment arms 3011 ensures the triler is fixed firmly with very little sideways or lateral movement to the motorcycle. The side attachment arm 3011 also has a spring/strut/shock absorber 3012 system. This ensures stability of the bike system. The pin/axles and attachment arm housing 3013 are also shown.

FIG. 31 shows a "sidecar" triler with draw pins 3101 that are in line with the triler wheels 3102. The wheels 3102 are fixed in position with no steering capability and freewheel in the direction of the vehicle. There can be more than one wheel (3 are shown) each wheel has an axle, a pivot arm 3103 mounted to the axle and a mounting arm 3105 and suspension system 3104 with shock absorbers and springs. The can carry considerable weight as side trilers normally carry industrial size 30-50 KWH UTMA's and fit on earth-moving machines and tractors. The UTMA slots 3106 with cover 3107 can be accessed by Ag TDS carriers.

FIG. 32 shows a front and side view of a triler draw pin 104 according to a preferred embodiment. The front view shows the slots 150 for the locking fork 1001 to slot into and the draw pin bracket 105 which holds the draw pin 104. The side view shows the pin hole 211 for the locking pin 216 and a side view of the rest pad 106 with a rest pad cover 3201.

FIG. 33 shows TMA/UTMA powered rickshaw (and the system will work for Tuk Tuks and other carrying systems in Indonesia and Asia). The vehicle has hub motors 3301 in the Front/rear wheels 3302 mounted on a common axle 3311 with mudguards 3308, side shades 2209 and a rear window 3310. UTMA's are loaded into compartments in the rear covered by doors 3304 mounted on hinges 3306; there is a fold down luggage rack 3305 on the rear which can fold up to allow access to the TMA/UTMA compartments 3304 when they are being swapped. Large spring suspension assemblies 3307 are provided for weight distribution.

Early adopters—the 5 KWH swap system. In some parts of the world lead acid batteries are in usage. Partitioning on battery packages means that in something like a cab if it had a 5-7 KWH on-board residential system (and the taxi could be a hybrid vehicle) and that system was partitioned into 2-3 packages then if the taxi was designed to take a 10 KWH TMA the taxi could be set up to do rapid recharges at the taxi rank. So when it is sitting at the rank if one of its 2.5 KWH packages has run down the driver simply hits button and the hybrid goes into rapid recharge mode on that package taking the power from the TMA and transferring it to the empty package.

For early adopters for things like taxicabs this could also be accomplished as a electrolyte transfer system so if the 3 KWH batteries is run down and it is for example lead acid the electrolyte (the acid) from one section of the TMA could be swapped with that of the package. The cells in the TMA could also be partitioned so that 1×TMA would allow 4-5 electrolyte swaps. Each section would be fully drained in a swap. The TMA can then be swapped or removed and sent for recharging. As the system advances charge stations will be set up for taxis where a 10 liter container that is made up of 5 sections would be filled with charged electrolyte and swapped instead of the whole battery.

The partitions would have a feed tube going into them so that an inert gas (it doesn't have to be helium, just a gas that is inert in this circumstance and to the electrolyte) is pumped into the partition chamber forcing the electrolyte out. The procedure would be that the partitioned container would have a number of partitions for fluid and one empty partition. The fill procedure would be for the inert gas to be pumped into the battery package that is to be emptied. This forces the fluid out of the battery which goes into the empty chamber. Fluid is then pumped from a full chamber back into the empty battery. The battery and chamber ports are sealed and the procedure is finished. The whole process should take less than 3 minutes while the taxi is in a rank. If a charge for a battery is 2 liters then 5 charges of 10 liters is easily handled by a person at the rank/taxi station.

One example of a Carrier Unit (CU) 3450 is contained within a Carry Case 3401 and is illustrated in FIG. 34. Inside the case 3401 are 6×pressurised containers 3402 (5 plus an empty). The containers 3402 are pressure bottles made of strong heavy, inert plastic or metal capable of withstanding pressure. They stand upright in the CU Carry Case 3401 and are linked across the top and bottom with pipes. There is a pipe 3403 for gas in (the pressurized inert gas from a gas bottle 3408 could be nitrogen); a pipe 3404 running along the bottom of the bottles for fluid out and a pipe 3405 along the top for fluid in. This could be old used fluid from the battery being replaced and new fluid coming in from the recharge/replenishment station when fluid is being changed and the two functions may be combined to just one fluid pipe (or may need 2×pipes).

The fluid is pushed out under pressure to the out pipe 3404 which runs along the bottom of the container. The sides and bottom of the containers slope down to a point so that all the fluid flowing out comes down to the exit valve 3406. Fluid out valves in the stems along the bottom connecting to the out pipe 3404 could be electronically controlled or they could just activate after a certain pressure inside the container is reached. Alternatively placed alongside the exit ports, could be light based video/visual monitoring systems that detects the fluid levels/amount inside the port and when ordered open and when it has run out close the valve. There are also valves in each stem 3407 connecting each cylinder to pipe 3403 for gas in.

No pumps are used in the system. Pressurised gas is stored in a cylinder that is replaced at intervals. Pressurized gas is released into a cylinder that is to be emptied and the fluid in the cylinder runs to a point at the bottom and is forced out through exit valve. There is no fluid left in the bottom when the container is emptied. The pipe from the exit valves runs downwards with non-return valves at intervals to the CU fluid capture chamber 3409 where it is then pumped up by gas pressure to the fluid out line through the outlet port 3410.

The fluid going into the compartments on batteries goes in at the top of the battery compartment and again all the fluid is forced out of the compartment (through a valve at the bottom) before the fresh fluid is pumped in all the fluid is forced out of the lines carrying it to the battery compartment by gas. Fluid out lines have one way valves. Valves in the battery compartment allow any gas which is surplus to escape through the vent system and also cut off the flow of gas to the container once the last fluid has reached the battery compartment. The same system is used to replace fluid in each battery container (outlet valves are at the bottom of battery compartments and the pipe they run into runs down to the exit point on the battery) and causes the fluid to be forced out and into the CU. Once the last of the fluid has exited a battery compartment line to the exit point the gas flowing into the battery compartment ceases. The valves are closed and gas is then released into the exit point chamber to push the fluid through the exit line from the battery to the CU.

Plastic or metal heavy duty containers would be used for the electrolyte. They would be manufactured as single bottles to withstand the pressures of the inert gas and also any possible trauma. The complete unit would consist of an outer fluid proof case with a handle as illustrated in FIG. 34; there would be 5 bottles/chambers for electrolyte; 1 chamber for empty plus lines to carry the fluid out of the CU to the battery and vice versa and a pump chamber. The pump chamber is a small chamber into which the electrolyte coming from a container runs into. It is empty at all times except when pumping is occurring. It has sides that slope to a point at the bottom. The fluid runs to the bottom of the chamber and is by gas pressure is pumped through a tube (wand) from the carrier unit (CU) to the battery. The CU would be positioned in a special carrier in the vehicle where there is the least possibility of trauma present.

In many cases such electrolyte is corrosive. It is imperative therefore that any parts of the connector that attach's the CU to the battery be drip free. The wand therefore needs to be totally dry when it is being removed and inserted into the CU. Therefore the pump chamber is empty most of the time to allow the wand time to dry out. Air is pumped in through the vent into the pump chamber to dry the wand; any drip that falls off the wand is sucked out into the used chamber. Fluid tubes after the last fluid has been pumped through them i.e. after the last chamber has emptied are air dried with air through the venting system. The connection system has 3 tubes coming in/out of it plus an in/out venting system. The first is for used electrolyte; the second is for fresh electrolyte; the third is for gas that acts as the pump. The CU is connected to a vent outlet positioned on the outside of the vehicle with a stainless steel tray surround so that vapour from electrolyte condensing on the tray can be washed off or if it rains drips off the tray away from the vehicle so that dilute electrolyte will not impede the vehicle. The connection system is a sealed complete unit which is simply released by a catch so that it can be removed and replaced into the next CU and relatched/reattached. The taxi's electrolyte recharge E-Recharge batteries are set up in the same way so gas is pumped into them from the top to cause the used electrolyte to be forced out from the bottom of each battery compartment and when empty the fresh electrolyte is pumped in from the top to replace it.

The system is designed for trained operators. The stainless steel vent tray is covered so that if it is touched or brushed against it won't transfer electrolyte to people's clothes. A trained operator will run water over it at regular intervals 3-4 times a day. If taxis have 10-15 KWH of resident battery and a single CU unit they would have a range of 200-300 km to start out a shift.

Air to vent the system is sucked in from the CU surroundings. As the air is just air and is being put into the system there is no threat to people around it. Therefore air from the cabin/boot is suitable. The used air is of course expelled though the vent.

At the recharge station trained people would take the CU's full of used electrolyte and put them on a connection which imitates that empty and fill procedure done in the vehicle but in reverse. Used electrolyte can then be placed in large battery units for recharge. The system is suitable for any large scale transport (e.g. taxis, couriers, and the like).

Vehicles could be equipped with 2 CU's each of which recharges a set group of battery packages. The system is set up so a CU feeds a select set of battery packs that it is linked to. There is no cross feeds from one CU set to another as it could lead to leakage. Vehicles can be fitted with aftermarket systems. This requires a special CU holder/carrier to be fitted; a venting system and tray; a control mechanism and a separate CU style battery package that is linked into the vehicles electrical system. A factory aftermarket kit could be fitted as requested as part of the taxi package car manufacturer's supply.

FIG. 30 shows the Carrier Unit which has a handle to carry it to/from the taxi. The connector is not shown but it links the CU to the Fluid Out Line; the Fluid In line and the Gas line/bottle (which is separately stored in the vehicle). The connector links the CU to the venting system and has an inlet vent to allow air into the bottles. The Fluid Out line is sloping at the bottom of the bottles to allow fluid to run down into the Fluid Capture Cylinder. The Outlet Port then has a pipe carrying the fluid from the capture chamber to the fluid out line. The fluid IN pipe carries fluid to the top of the chambers. Valves in the stems at the top and bottom of the bottles control the flow of air/gas/fluid in and out of the chambers. The whole unit is enclosed in a sealed carry case to allow movement. Valves supplying fluid to the Fluid Out line are one way valves and do not allow backflows.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment.

Furthermore, the particular features, structures, or characteristics may be combined in any suitable manner in one or more combinations.

The invention claimed is:

1. A system for providing a secondary power source for an electric vehicle having a primary power source, the system comprising an apparatus attachable to the electric vehicle and having at least one secondary electrical power storage unit including a battery for storing electrical energy for delivery to the electric vehicle as required to replace the primary power source, and at least one proprietary plug associated with the apparatus, a power connection assembly to connect the apparatus to the electric vehicle, and a battery control system embedded in each storage unit and adapted to control supply to the electric vehicle, and an authorisation system to authorize delivery of the electrical energy from the storage unit, at least one communication pathway associated with the apparatus, wherein the control system undertakes an authorisation process utilising the authorisation system remotely through the at least one communication pathway before electrical energy is delivered from the storage unit, wherein the control system identies each storage unit and each proprietary plug to charge/connect each storage unit within the system in order to track the use of each storage unit for access, restricting or denial of access and billing, the apparatus being configured as a modified wheeled platform or the battery attached to the vehicle and wherein the system controls the input of power or energy into the battery and prevents unauthorized charging of the battery.

2. The system as claimed in claim 1 wherein the vehicle is a car or truck.

3. The system as claimed in claim 1 wherein the secondary power source includes a location receiver and a wireless communication device to allow the location of the secondary power source to be identified, substantially in real-time.

4. The system as claimed in claim 1 wherein the apparatus is configured as a towable trailer to be towed by the electric vehicle.

5. The system as claimed in claim 4 wherein the apparatus includes a breaker or spacer assembly at a forward end of the trailer defining a volume extending across a forward end of the trailer in order to provide a buffer space in case of accidents or similar.

6. The system as claimed in claim 4 wherein the trailer is length adjustable, provided in a pair of portions, namely a front portion and a rear portion which slide relative to one another.

7. The system as claimed in claim 4 wherein the trailer includes a forward wall assembly provided with a draw assembly in order to attach the trailer to the electric vehicle and the electric vehicle is provided with a corresponding assembly to attach.

8. The system as claimed in claim 1 wherein the apparatus is configured as a self-propelled, wheeled platform a removably mounted relative to a larger vehicle and to be off the ground when mounted to the larger vehicle.

9. The system as claimed in claim 1 further including at least one mounting assembly to mount the apparatus relative to the electric vehicle and to allow the electric vehicle to operate using electrical energy stored in the at least one secondary electrical power storage unit or an electric vehicle primary electrical power storage unit.

10. The system as claimed in claim 1 wherein the control system allows selection of the at least one secondary electrical power storage unit or the electric vehicle primary electrical power storage unit.

11. The system as claimed in any one of the preceding claims 1 to 10 wherein the apparatus includes a number of swappable battery systems which can attach to and/or fit into enclosed or open compartments on vehicles.

12. The system as claimed in claim 1 wherein the apparatus is configured as a self-propelled, wheeled platform for delivery of the at least one secondary electrical power storage unit to the electric vehicle.

13. The system as claimed in claim 1 wherein the apparatus has an internal unit in order to bold or contain the secondary power source.

14. The system as claimed in claim 13 wherein the internal unit is removable and replaceable from the apparatus.

15. The system as claimed in claim 13 wherein the secondary power source is removable and replaceable from the internal unit.

16. The system as claimed in claim 13 wherein the internal unit has a number of subunits and wherein each subunit contains one or more batteries.

17. The system of claim 1 wherein the secondary power source includes one or more batteries and the one or more batteries are removable and/or loadable into the vehicle.

18. The system as claimed in claim 1 wherein the at least one secondary electrical power storage unit comprises one or more batteries and wherein the electric vehicle draws electrical energy from the one or more batteries whilst the apparatus is mounted relative to the vehicle.

19. The system as claimed in claim 1 wherein the secondary power is connected in a grid within the apparatus and then the grid is connected to the electric vehicle.

20. The system of claim 1 wherein the control system is provided in or on the apparatus or in the electric vehicle or partially in both.

21. The system as claimed in claim 1 wherein the control system allows monitoring of the status of the secondary power source.

22. The system as claimed in claim 1 wherein a wireless connection is provided to a vehicle display to convey information about status and operation of the secondary power source to a driver of the electric vehicle.

23. The system as claimed in claim 1 wherein the apparatus is configured as a wheeled apparatus for transport and/or delivery of the at least one secondary electrical power storage unit to the electric vehicle.

24. The system as claimed in claim 1 wherein the apparatus includes one or more deployable wheel assemblies for at least temporary support of the apparatus either in conjunction with a rear support wheel assembly or for temporary support in the absence of a rear support wheel assembly.

25. The system of claim 1 wherein the apparatus is configured as an unwheeled unit which has an associated mobile delivery vehicle for delivery of the at least one secondary electrical power storage unit to the electric vehicle.

26. The system according to claim 1 wherein the control system controls, enables and authorizes access to the input of power into the battery and controls and monitors the amount of power entering the battery for accounting, charging and billing purposes.

27. The system according to claim 1 wherein the control system controls, enables and authorizes access to and monitors the output and the amount of power from the battery for charging and billing purposes.

28. The system of claim 1 wherein in the battery is a swap battery.

* * * * *